(12) United States Patent
El-Siblani et al.

(10) Patent No.: US 10,011,076 B2
(45) Date of Patent: Jul. 3, 2018

(54) APPARATUS AND METHOD FOR FORMING THREE-DIMENSIONAL OBJECTS USING A TILTING SOLIDIFICATION SUBSTRATE

(71) Applicant: Global Filtration Systems, Dearborn Heights, MI (US)

(72) Inventors: Ali El-Siblani, Dearborn Heights, MI (US); Alexandr Shkolnik, Los Angeles, CA (US)

(73) Assignee: Global Filtration Systems, Dearborn Heights, MI (US)

( * ) Notice: Subject to any disclaimer, the term of this patent is extended or adjusted under 35 U.S.C. 154(b) by 649 days.

(21) Appl. No.: 14/506,751

(22) Filed: Oct. 6, 2014

(65) Prior Publication Data

US 2015/0231828 A1 Aug. 20, 2015

Related U.S. Application Data

(60) Provisional application No. 61/942,226, filed on Feb. 20, 2014.

(51) Int. Cl.
*B29C 64/124* (2017.01)
*B29C 67/00* (2017.01)
(Continued)

(52) U.S. Cl.
CPC ...... *B29C 67/0088* (2013.01); *B29C 67/0077* (2013.01); *B33Y 10/00* (2014.12);
(Continued)

(58) Field of Classification Search
CPC .............................. B29C 64/124; B29C 64/245
See application file for complete search history.

(56) References Cited

U.S. PATENT DOCUMENTS

| 4,849,910 A | 7/1989 | Jacobs et al. |
| 5,049,901 A | 9/1991 | Gelbart |

(Continued)

FOREIGN PATENT DOCUMENTS

| DE | 19929199 A1 | 1/2001 |
| DE | 10256672 A1 | 6/2004 |

(Continued)

OTHER PUBLICATIONS

Fielder, Harvey; "The Characterisation of Casting Wax Rheology"; 53rd Annual Technical Conference & Expo, Investment Casting Institute, 2005; accessed online at https://www.paramelt.com/files/Pdf/casting-wax/Rheology-Technical-publication-Paramelt-Argueso-Kindt.pdf on Jun. 1, 2017.*

(Continued)

*Primary Examiner* — Alison L Hindenlang
(74) *Attorney, Agent, or Firm* — Hansen IP Law PLLC

(57) ABSTRACT

An apparatus and method for making a three-dimensional object from a solidifiable material using a linear solidification device is shown and described. The apparatus includes a solidification substrate assembly that is tiltable about a tilting axis to peel a solidification substrate from a recently formed object surface and to level the solidification substrate assembly and squeeze out accumulated solidifiable material between the solidification substrate and the recently formed object surface. Intelligent peeling and leveling may also be provided by providing a tilting parameter database that is used to adjust tilting parameters based on object geometry and/or solidifiable material properties.

29 Claims, 29 Drawing Sheets

(51) Int. Cl.
*B33Y 10/00* (2015.01)
*B33Y 30/00* (2015.01)
*B33Y 50/02* (2015.01)
*B33Y 70/00* (2015.01)

(52) U.S. Cl.
CPC .............. *B33Y 30/00* (2014.12); *B33Y 50/02* (2014.12); *B29C 67/0092* (2013.01); *B29K 2827/12* (2013.01); *B29K 2883/005* (2013.01); *B29K 2995/0026* (2013.01); *B29K 2995/0029* (2013.01); *B33Y 70/00* (2014.12)

(56) References Cited

U.S. PATENT DOCUMENTS

| | | | |
|---|---|---|---|
| 5,089,184 A * | 2/1992 | Hirano | B29C 67/0066 264/308 |
| 5,104,592 A | 4/1992 | Hull et al. | |
| 5,447,822 A | 9/1995 | Hull et al. | |
| 5,521,748 A | 5/1996 | Sarraf | |
| 5,631,763 A | 5/1997 | Park | |
| 5,753,171 A | 5/1998 | Serbin et al. | |
| 5,780,070 A | 7/1998 | Yamazawa et al. | |
| 5,876,550 A | 3/1999 | Feygin et al. | |
| 5,885,511 A | 3/1999 | Heller et al. | |
| 5,991,102 A | 11/1999 | Oono et al. | |
| 6,030,199 A | 2/2000 | Tseng | |
| 6,180,050 B1 | 1/2001 | Arai et al. | |
| 6,267,919 B1 | 7/2001 | Tanaka et al. | |
| 6,372,178 B1 | 4/2002 | Tseng | |
| 6,406,658 B1 | 6/2002 | Manners et al. | |
| 6,560,248 B1 | 5/2003 | Vernact | |
| 6,821,473 B2 | 11/2004 | Hiizumi et al. | |
| 7,006,887 B2 | 2/2006 | Nagano et al. | |
| 7,048,528 B2 | 5/2006 | Ishikawa et al. | |
| 7,158,849 B2 | 1/2007 | Huang et al. | |
| 7,460,159 B2 | 12/2008 | Ohkawara et al. | |
| 7,759,230 B2 | 7/2010 | Im | |
| 7,906,414 B2 | 3/2011 | Im | |
| 9,452,567 B2 * | 9/2016 | Syao | B29C 67/0062 |
| 2002/0011693 A1 | 1/2002 | Leyden et al. | |
| 2002/0153640 A1 | 10/2002 | John | |
| 2004/0118309 A1 | 6/2004 | Fedor et al. | |
| 2005/0208168 A1 | 9/2005 | Hickerson et al. | |
| 2008/0259228 A1 | 10/2008 | Henningsen | |
| 2009/0091732 A1 | 4/2009 | Kato | |
| 2010/0232835 A1 | 9/2010 | Ku | |
| 2010/0262272 A1 * | 10/2010 | Shkolnik | B29C 67/0088 700/120 |
| 2011/0009992 A1 | 1/2011 | Shkolnik et al. | |
| 2011/0089610 A1 | 4/2011 | El-Siblani et al. | |
| 2012/0165969 A1 | 6/2012 | Elsey | |
| 2012/0195994 A1 | 8/2012 | El-Siblani et al. | |
| 2013/0001834 A1 | 1/2013 | El-Siblani et al. | |
| 2013/0140741 A1 | 6/2013 | El-Siblani et al. | |
| 2015/0102531 A1 | 4/2015 | El-Siblani et al. | |
| 2015/0165687 A1 | 6/2015 | Ho et al. | |
| 2015/0231831 A1 | 8/2015 | El-Siblani | |
| 2016/0046080 A1 | 2/2016 | Thomas et al. | |
| 2016/0297141 A1 | 10/2016 | El-Siblani | |

FOREIGN PATENT DOCUMENTS

| | | |
|---|---|---|
| EP | 0467100 A1 | 1/1992 |
| EP | 0790119 B1 | 5/2003 |
| EP | 1674243 A2 | 6/2006 |
| EP | 1876012 A1 | 1/2008 |
| EP | 2011631 B1 | 4/2012 |
| JP | 08150662 | 6/1996 |
| WO | 2012021940 A1 | 2/2012 |
| WO | 2013026087 A1 | 2/2013 |

OTHER PUBLICATIONS

International Search Report and Written Opinion for PCT/US2012/044398, dated Oct. 26, 2012.
Yamazawa, Kenji, et al., "High Speed UV Laser Beam Scanning by Polygon Mirror," pp. 223-230, The Institute Physical and Chemical Research (Riken), (1997).
Patent Abstracts of Japan, English Translation of JP 08-150662, from http://www19.ipdl.inpit.go.jp/PA1/resultmainwoYeaMaDA408150662P1.htm2011/07/15.
Opposition to EP 2 011 631, dated Jan. 14, 2013.
European Patent Office (EPO) Notice of Opposition, dated Feb. 25, 2013.
Huang, et al., "Computer Supported Force Analysis and Layer Imagine for Masked Rapid Prototyping System" Department of Mechanical Engineering, National Taiwan University of Science and technology, Taipei, Taiwan.
Huang, et al., "On-line force monitoring of platform ascending rapid prototyping system" Journal of Materials Processing Technology 159 (2005) 257-264.
English translation of DE 10256672 from Lexis Nexis Total Patent.
English translation of DE 19929199 from Lexis Nexis Total Patent.
"Neutral Density Filter", Wikipedia, Dec. 2010, accessed at http://en.wikipedia.org/w/index.php?title=Neutral_density_filter&oldid=402599066 on Aug. 28, 2014.
Paschotta; Rudiger, "Beam Divergence", Encyclopedia of Laser Physics and Technology, Jun. 2008, accessed at http://web.archive.org/web/20090131224642/http://www.rp-photonics.com/beam_divergence.html on Aug. 27, 2014.
"Photodiode", Wikipedia, Feb. 10, 2010, accessed at http://web.archive.org/web/201 0021 0073314/http://en.wikipedia.org/wiki/Photodiode on Aug. 29, 2014.
Non-Final Office Action for U.S. Appl. No. 14/329,153 dated, Sep. 3, 2014.
Non-Final Office Action for U.S. Appl. No. 14/328,955 dated, Sep. 3, 2014.
International Search Report and Written Opinion for PCT/US2014/059222 dated, Jan. 2, 2015.
Extended European Search Report for EP 15751601.4 dated Oct. 26, 2017.
International Search Report and Written Opinion for PCT/US2017/063375 dated Feb. 15, 2018.

* cited by examiner

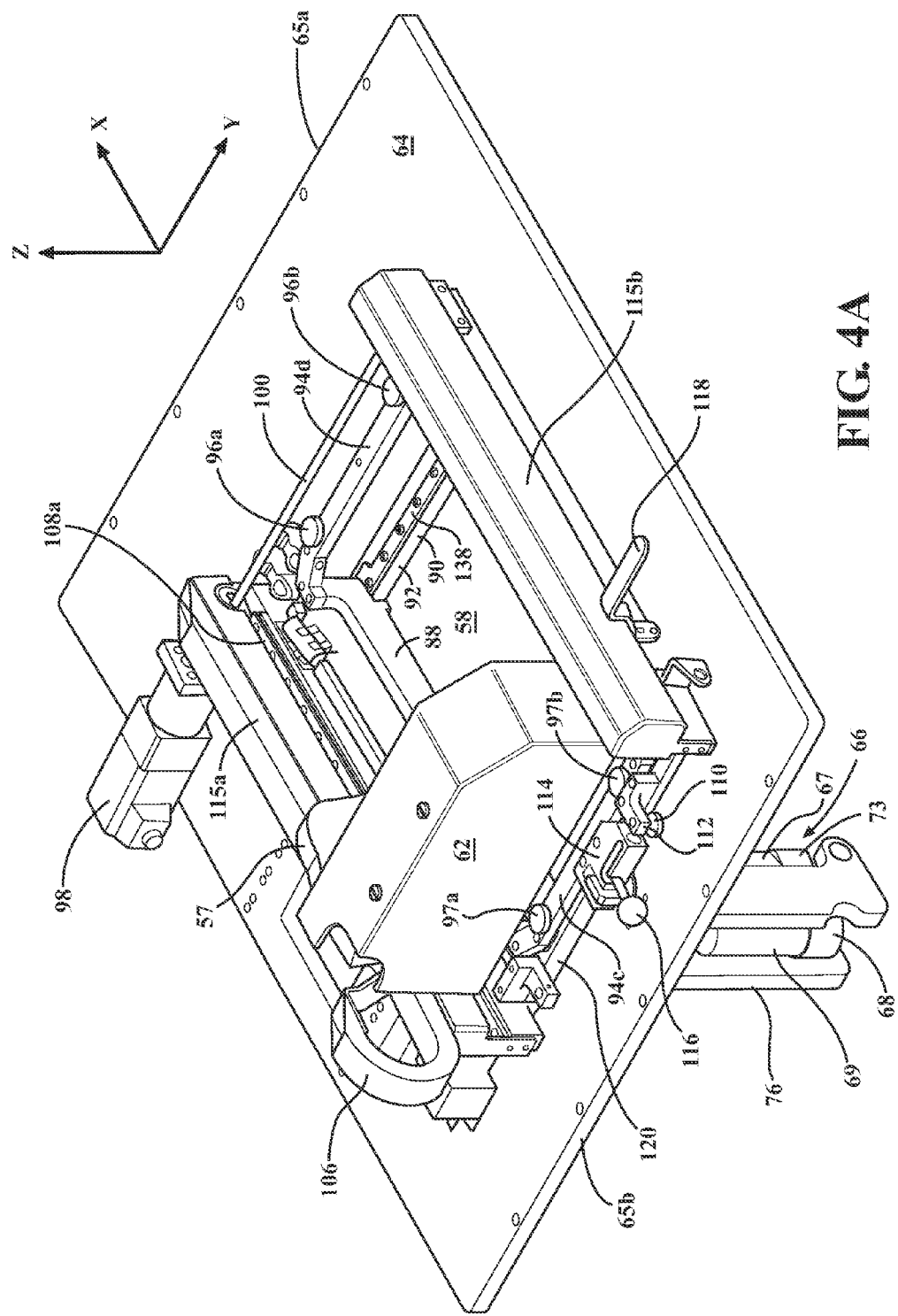

FIG. 5A

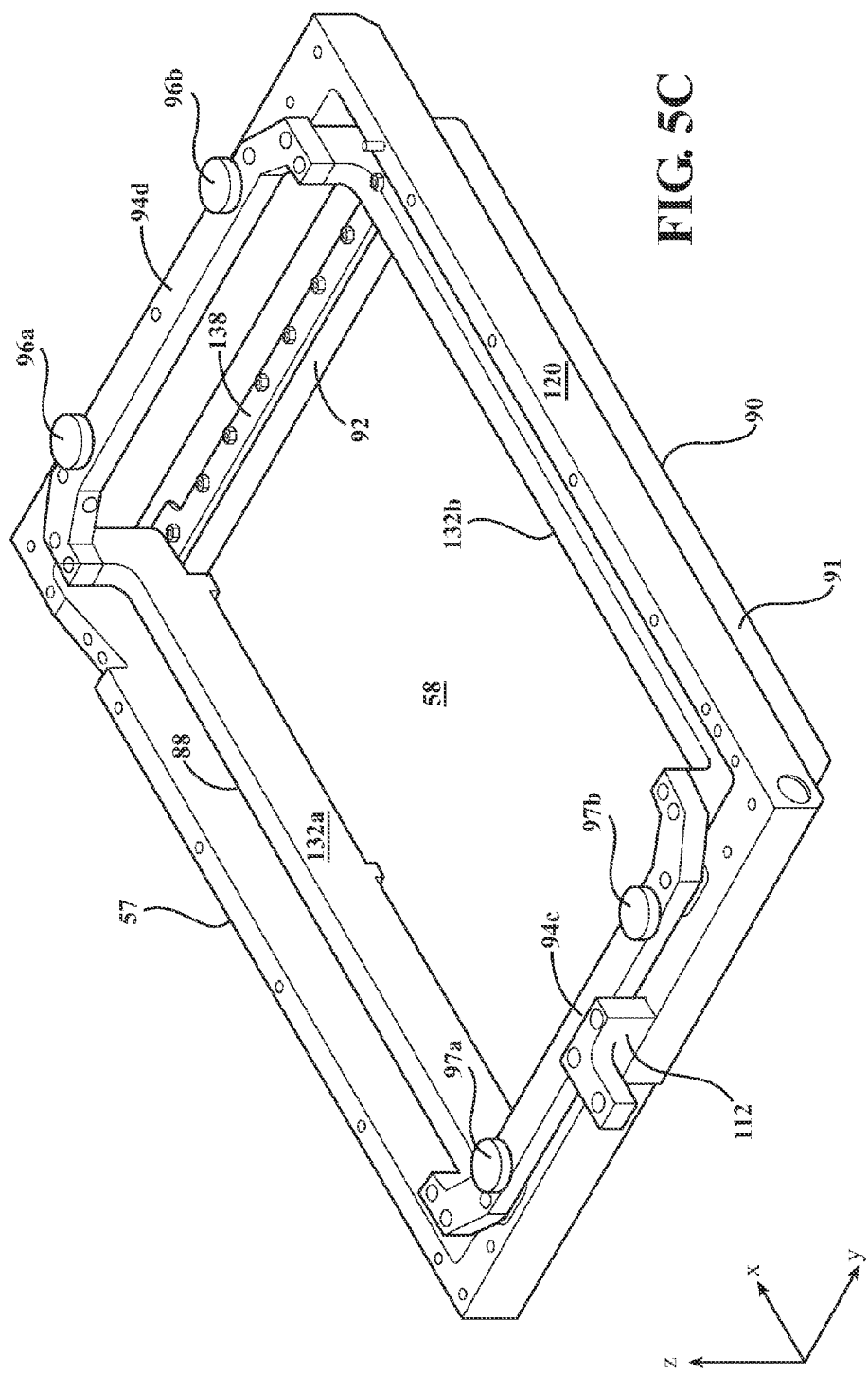

| Material | Minium object peeling travel distance (mm) | Peeling velocity (mm/sec) | Leveling velocity (mm/sec) | Leveling wait time (seconds) | Reference squeezing pressure (psi) |
|---|---|---|---|---|---|
| Envisiontec E-Denstone | 2.4 | 12.7 | 12.7 | 10 | 80 |
| Envisiontec Clear Guide | 3.0 | 10.2 | 10.2 | 8 | 80 |
| Envisiontec E-Dent | 3.5 | 8 | 6 | 11 | 75 |

FIG. 9

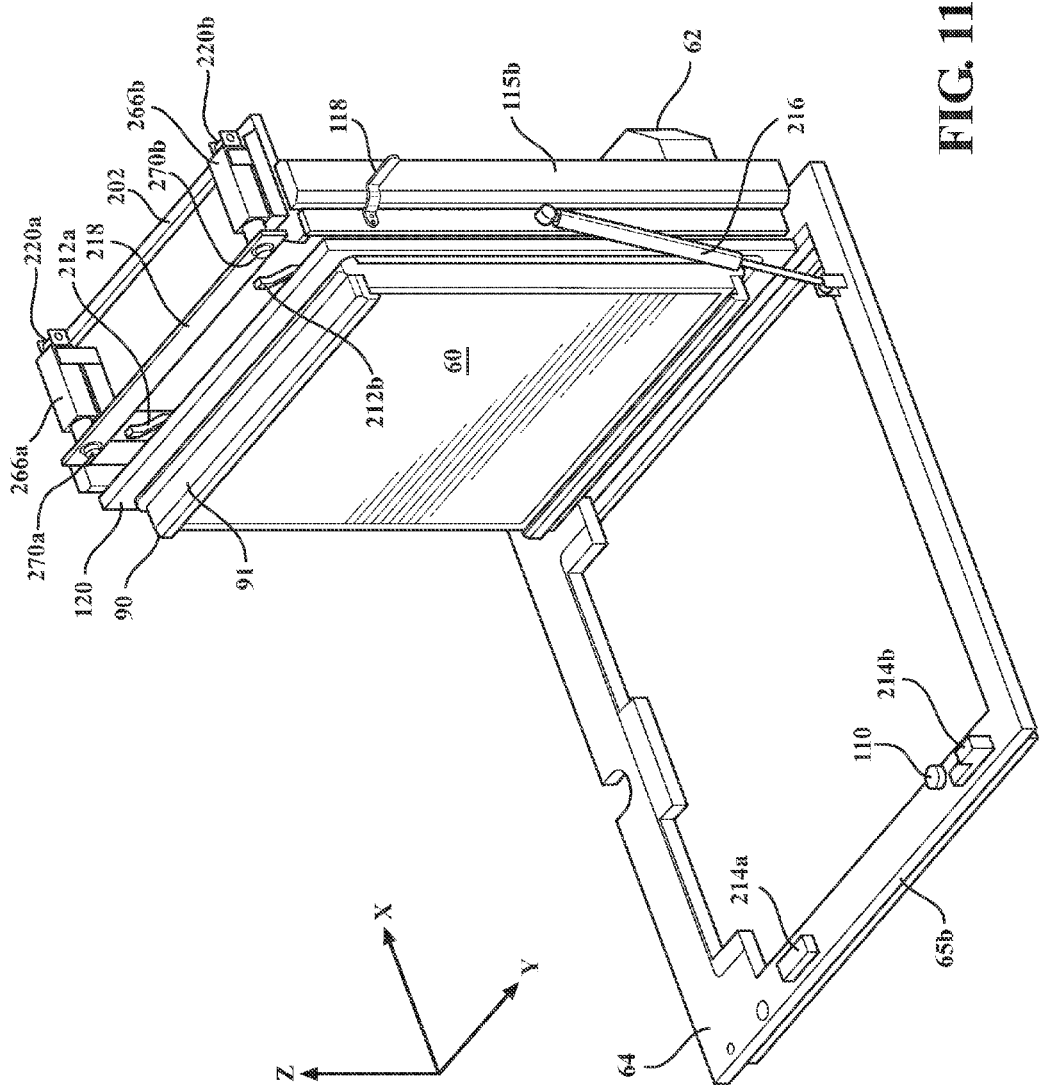

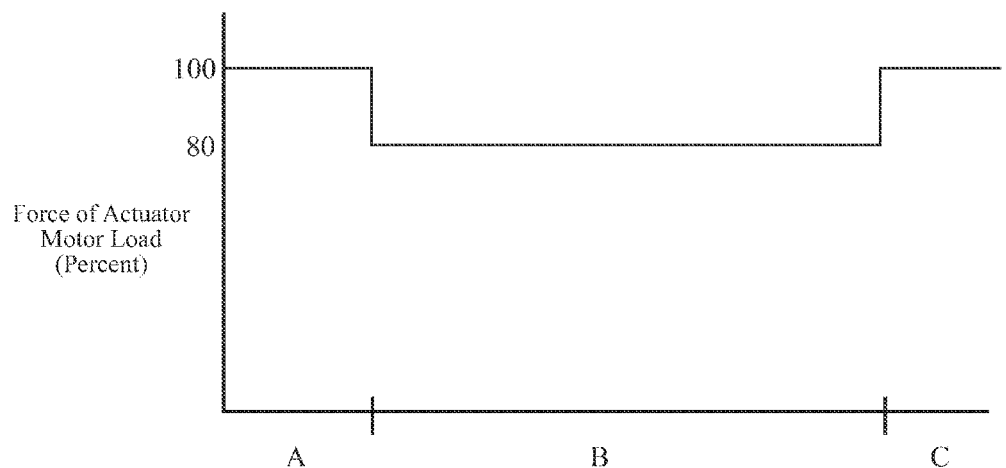
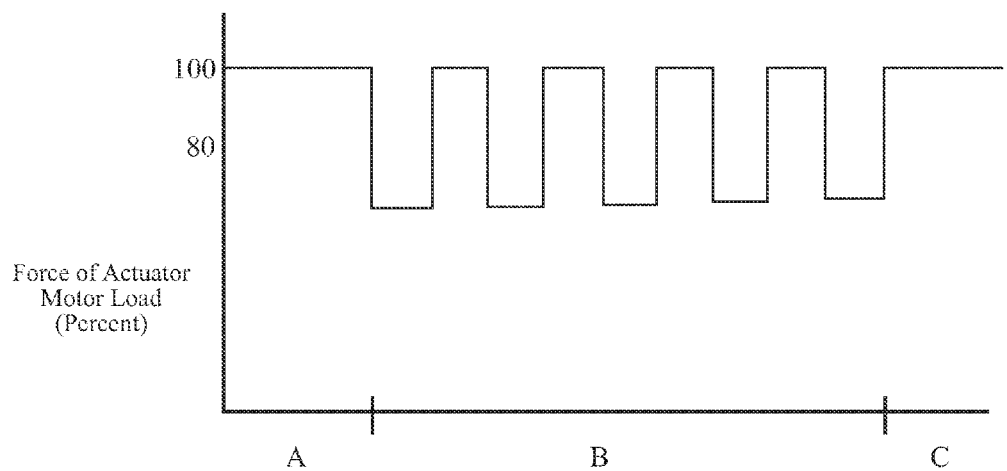

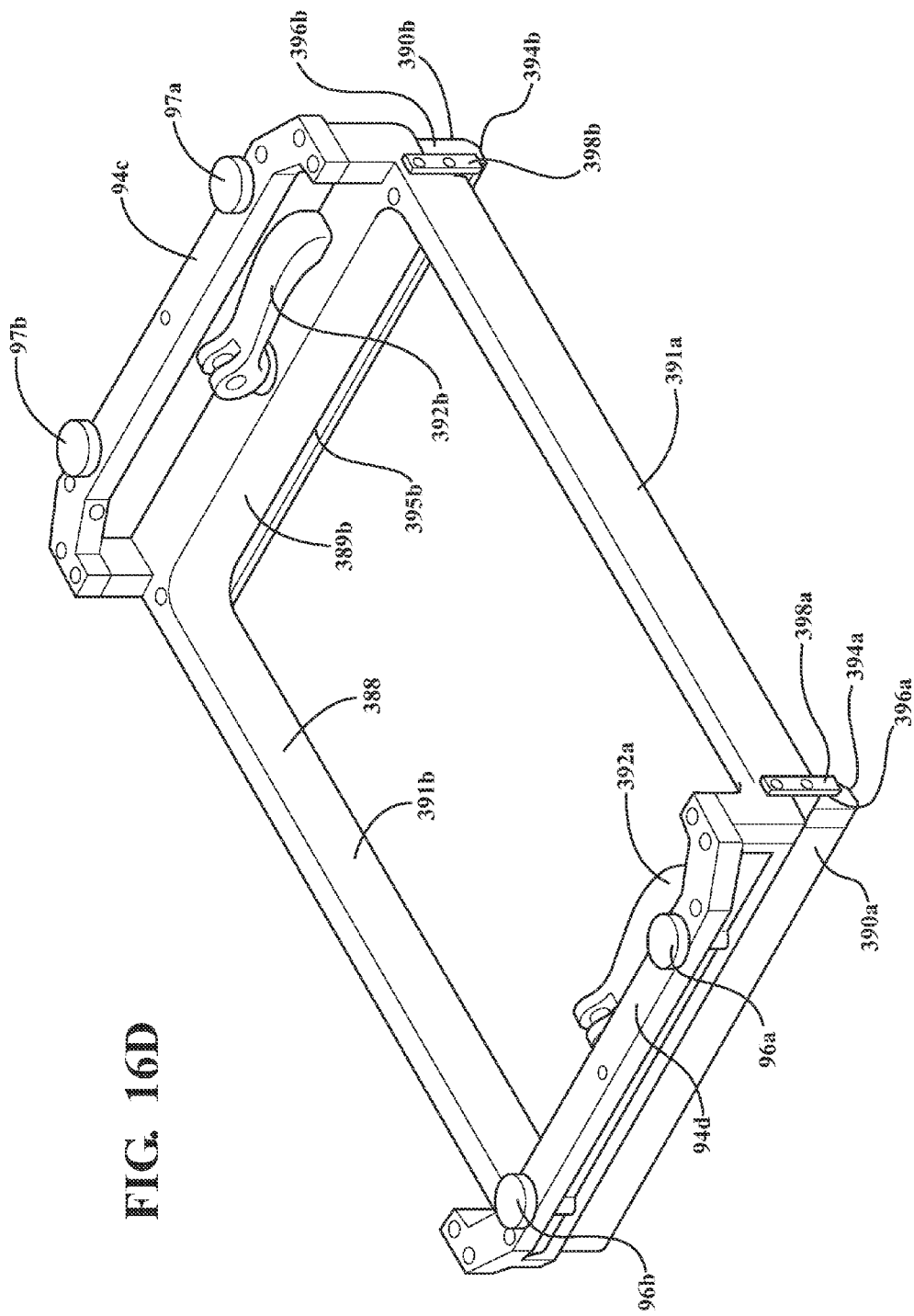

APPARATUS AND METHOD FOR FORMING THREE-DIMENSIONAL OBJECTS USING A TILTING SOLIDIFICATION SUBSTRATE

CROSS-REFERENCE TO RELATED APPLICATIONS

This application claims the benefit of U.S. Provisional Patent Application No. 61/942,226, filed on Feb. 20, 2014, the entirety of which is hereby incorporated by reference.

FIELD

The disclosure relates to an apparatus and method for manufacturing three-dimensional objects, and more specifically, to an apparatus and method that forms such objects using a tilting solidification substrate.

DESCRIPTION OF THE RELATED ART

Three-dimensional rapid prototyping and manufacturing allows for quick and accurate production of components at high accuracy. Machining steps may be reduced or eliminated using such techniques and certain components may be functionally equivalent to their regular production counterparts depending on the materials used for production.

The components produced may range in size from small to large parts. The manufacture of parts may be based on various technologies including photo-polymer hardening using light or laser curing methods. Secondary curing may take place with exposure to, for example, ultraviolet (UV) light. A process to convert a computer aided design (CAD) data to a data model suitable for rapid manufacturing may be used to produce data suitable for constructing the component. Then, a pattern generator may be used to construct the part. An example of a pattern generator may include the use of DLP (Digital Light Processing technology) from Texas Instruments®, SXRD™ (Silicon X-tal Reflective Display), LCD (Liquid Crystal Display), LCOS (Liquid Crystal on Silicon), DMD (digital mirror device), J-ILA from JVC, SLM (Spatial light modulator) or any type of selective light modulation system. Other examples of pattern generators include linear solidification devices that project solidification energy in a plurality of adjacent linear patterns, such as linear solidification devices that include a laser diode in optical communication with a rotating polygonal mirror. Further examples of pattern generators include systems with a laser in optical communication with galvanometer mirrors that draw linear or non-linear patterns of solidification energy on the exposed surface of solidifiable material.

In many known techniques of making a three-dimensional object from a solidifiable resin, such as a photocurable or photopolymerizable material, it is necessary to create a substantially planar exposed surface of the solidifiable resin in order to regulate the depth to which the solidification energy penetrates and solidifies the resin. One method involves placing a solidification substrate such as a plastic or glass that is translucent and/or transparent on the exposed surface of the resin and projecting solidification energy through the plastic or glass and into the resin. In a modified implementation, the solidification substrate comprises a film that is either coated on the plastic or glass or is stretched over the glass or plastic without adhering to it. While such systems create a planar exposed resin surface, they often also result in a bond forming between the newly exposed surface of the object and the solidification substrate which must be broken prior to forming a new object layer. These systems typically require some method or apparatus for separating the recently formed exposed object surface from the solidification substrate and for subsequently introducing fresh resin between the newly formed exposed object surface and the solidification substrate. Known techniques often introduce undesirable delays in the production of objects and/or increase the susceptibility of the part to damage, such as damage caused by forces from the surrounding resin applied against the part. Thus, a need has arisen for an apparatus and method for making three-dimensional objects which addresses the foregoing issues.

BRIEF DESCRIPTION OF THE DRAWINGS

The disclosure will now be described, by way of example, with reference to the accompanying drawings, in which:

FIG. 4A is a detailed first perspective view of an exemplary solidification substrate assembly and a work table used in an apparatus for making a three-dimensional object from a solidifiable material with the solidification substrate assembly in a level configuration;

FIG. 5A is an exploded perspective view of a solidification substrate frame, a load frame, and a film assembly in an unassembled condition;

FIG. 5C is a perspective view of the solidification substrate frame, load frame, and film assembly of FIGS. 5A and 5B in an assembled condition;

FIG. 9 is an exemplary depiction of data records from the tilting parameter database of FIG. 3;

FIG. 11 is a view of the apparatus of FIG. 10, with the solidification substrate assembly in an open configuration in which the tilting actuators are disconnected from the work table latches;

FIG. 14A is a graph depicting one exemplary profile of the force applied by a motor-driven actuator to a solidification substrate assembly and the motor load during three phases of a method of making a three-dimensional object from a solidifiable material;

FIG. 14B is a graph depicting another exemplary profile of the force applied by a motor-driven actuator to a solidification substrate assembly and the motor load during three phases of a method of making a three-dimensional object from a solidifiable material;

FIG. 16D is a perspective view of the solidification substrate laminate frame of FIG. 16C in an assembled condition;

Like numerals refer to like parts in the drawings.

DETAILED DESCRIPTION

Figure 1A:
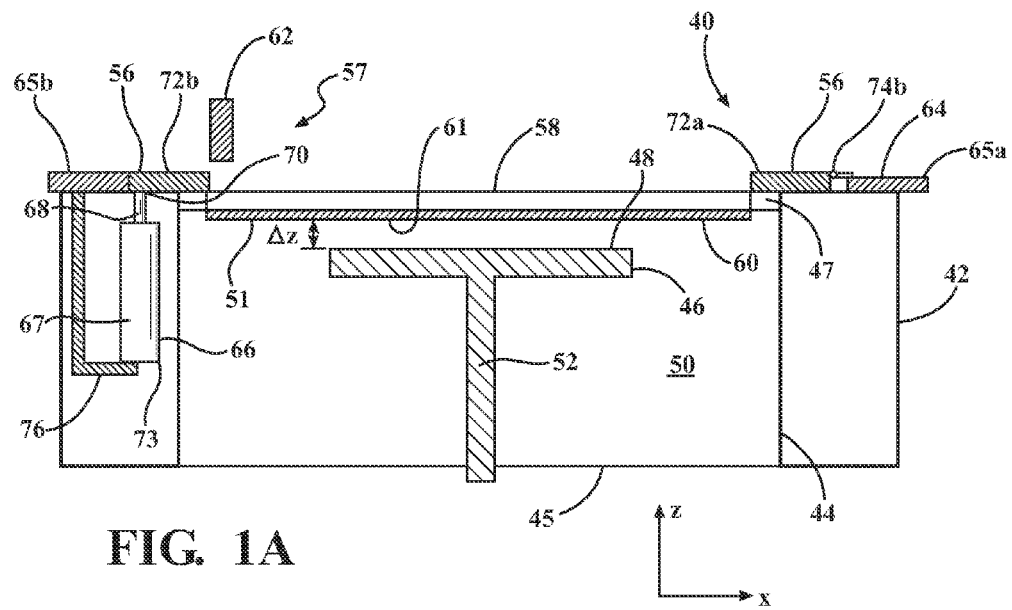
FIG. 1A is a schematic view of an apparatus for making a three-dimensional object from a solidifiable material that comprises a tiltable solidification substrate assembly with the solidification substrate assembly in a level configuration prior to the solidification of the first layer of an object.

The Figures illustrate examples of an apparatus and method for manufacturing a three-dimensional object from a solidifiable material. Based on the foregoing, it is to be generally understood that the nomenclature used herein is simply for convenience and the terms used to describe the invention should be given the broadest meaning by one of ordinary skill in the art.

The apparatuses and methods described herein are generally applicable to additive manufacturing of three-dimensional objects, such as components or parts (discussed herein generally as objects), but may be used beyond that scope for alternative applications. The system and methods generally include a pattern generator that applies solidification energy to a solidifiable material, such as a photohardenable resin. The photohardenable resin solidifies in contact with a solidification substrate, i.e., a surface against which solidification occurs. The solidification substrate may be a rigid or semi-rigid solidification substrate and/or a film.

In one aspect of the present disclosure, an apparatus for making a three-dimensional object is provided which includes a build platform that moves along a first axis, a solidification substrate assembly, an actuator operatively connected to the solidification substrate assembly, and at least one controller operatively connected to the actuator. The solidification substrate assembly includes a solidification energy source, a rigid or semi-rigid solidification substrate that is transparent and/or translucent, and a film assembly. When it receives an actuator activation signal from the at least one controller, the actuator tilts the solidification substrate assembly about a second axis. In a first optional modification, the apparatus includes a tilting parameter database comprising a plurality of solidifiable material identifiers, and a set of tilting parameters corresponding to each solidifiable material, wherein the set of tilting parameters includes at least one tilting parameter. In certain optional and preferred embodiments, the apparatus does not include a peeling member that contacts the solidification substrate to peel it from the exposed object surface.

The term "tilting parameter" refers to a variable that is used to control the tilting of a solidification substrate assembly. Exemplary tilting parameters include an actuator peeling distance, a minimum object peeling travel distance, a peeling velocity, a leveling velocity, a leveling wait time, and a leveling pressure controller set point. In a further variation of the first optional modification, at least one of the tilting parameters is determined based on the particular solidifiable material from which the three-dimensional object is made and/or object data representative of the three-dimensional object. In one example of this variation, the at least one tilting parameter is calculated for a plurality of layers or for each layer of the object based on the object data for the layer. As used herein, the phrase "minimum object peeling travel distance" refers to a minimum desired linear distance traveled during a tilting operation by a point of a solidification substrate that is initially in contact with a region of an exposed object surface that is closest to the axis of tilting. The phrase "actuator peeling distance" refers to a linear elongation of an actuator during a tilting operation. In certain examples herein, the actuator peeling distance will be a distance of travel of an actuator shaft (either a distal end or a proximal end of the shaft) during a tilting operation. In other examples, the actuator peeling distance refers to a distance of travel of an actuator proximal housing end during a tilting operation. The terms "peeling velocity" and "leveling velocity" refer to the linear speed of travel of an actuator shaft (or the speed of travel of the actuator housing) during tilting operations conducted to peel a solidified object from a solidification substrate and to return the solidification substrate to a level configuration, respectively.

In another aspect of the present disclosure, an apparatus for making a three-dimensional object from a solidifiable material is provided which comprises a linear solidification device that is movable along a first axis while progressively supplying solidification energy along a second axis. The apparatus further comprises a rigid or semi-rigid solidification substrate that is transparent and/or translucent, an actuator operatively connected to the rigid or semi-rigid solidification substrate and operable to tilt the substrate about the second axis, and a build platform movable along a third axis. In an optional modification, the solidification substrate assembly also includes a film assembly, and the actuator is operatively connected to the film assembly and is operable to tilt the film assembly about the second axis. In the same optional modification or in a different one, the linear solidification device and the rigid or semi-rigid solidification substrate comprise a solidification substrate assembly, and the actuator is operatively connected to the solidification substrate assembly and operable to tilt the solidification substrate assembly about the second axis. In certain optional and preferred examples, the apparatus does not include a peeling member that contacts the solidification substrate to peel it from the exposed object surface.

In a further optional modification, at least one controller is operatively connected to the actuator. The at least one controller comprises a processor and a non-transitory computer readable medium having computer executable instructions stored thereon. When the computer executable instructions are executed by the processor, the at least one controller generates an actuator activation signal, and the actuator tilts the solidification substrate in response to the actuator activation signal. In the same or in another optional modification, the apparatus includes a tilting parameter database comprising a plurality of solidifiable material identifiers, and a plurality of sets of tilting parameters, each set corresponding to a solidifiable material identifier, wherein each set of tilting parameters includes at least one tilting parameter. In a further variation of the first optional modification, at least one of the tilting parameters is determined based on the particular solidifiable material from which the three-dimensional object is made and/or object data representative of the three-dimensional object. In one example of this variation, the at least one tilting parameter is calculated for a plurality of layers or for each layer of the object based on the object data for the layer.

In a further aspect of the present disclosure, a method of making a three-dimensional object from a solidifiable material is provided which comprises providing a layer of the solidifiable material having an exposed surface adjacent a rigid or semi-rigid solidification substrate, wherein the rigid or semi-rigid solidification substrate is transparent and/or translucent. The method further comprises moving a linear solidification device along a first axis, progressively exposing portions of the layer of solidifiable material to solidification energy from the linear solidification device along a second axis as the linear solidification device moves along the first axis, and tilting the solidification substrate about the second axis. In one optional modification, the step of tilting the solidification substrate about the second axis comprises tilting the solidification substrate away from the build platform about the second axis, and moving the build platform in a direction away from the solidification substrate by a desired layer thickness. In the same or another optional modification, the step of tilting the solidification substrate about the second axis comprises selecting at least one tilting parameter based on the solidifiable material and tilting the solidification substrate about the second axis in accordance with the at least one tilting parameter. The tilting parameter may also be selected based on the object data in addition to or instead of selecting it based on the solidifiable material. In one example of this variation, the at least one tilting parameter is calculated for a plurality of layers or for each layer of the object based on the object data for the layer. In certain optional and preferred examples, the method does not comprise traversing a peeling member to contact the solidification substrate and peel it from the exposed object surface.

In yet another aspect of the present disclosure, a method of making a three-dimensional object from a solidifiable material is provided which comprises solidifying a portion of the solidifiable material to create an exposed solidified object surface in contact with a solidification substrate, and tilting the solidification substrate about a first axis in accordance with at least one tilting parameter, wherein the at least one tilting parameter is based on at least one of object data representative of the three-dimensional object and the solidifiable material. In a first optional variation, the at least one tilting parameter is based on both object data representative of the object and the solidifiable material. In one example, the at least one tilting parameter for a given layer is determined based on the exposed object area defined by the object data for the layer. In another example, a first tilting parameter is provided which comprises a minimum object peeling travel distance, and a second tilting parameter which comprises an actuator peeling distance (i.e., a distance of extension or retraction by a tilting actuator used to carry out the tilting operation) is determined based on object data and/or the minimum object peeling travel distance. In certain optional and preferred examples, the method does not comprise traversing a peeling member to contact the solidification substrate and peel it from the exposed object surface. In other optional and preferred examples, the solidification substrate is rigid or semi-rigid and is transparent and/or translucent. In optional and preferred embodiments, the solidification substrate is a transparent and/or translucent resilient layer or protective film.

In an additional aspect of the present disclosure, a method of making a three-dimensional object from a solidifiable material is provided which comprises solidifying a first layer of the solidifiable material in a first pattern corresponding to a first portion of the three-dimensional object to form a first solidified exposed object surface in contact with a solidification substrate, wherein the first layer of the solidifiable material is located between a build platform and the solidification substrate along a build axis. The method also comprises first tilting the solidification substrate about a tilting axis in a direction away from the build platform, moving the build platform away from the solidification substrate within a volume of the solidifiable material to provide a second layer of solidifiable material between the solidified exposed object surface and the solidification substrate, second tilting the solidification substrate about the tilting axis in a direction toward the build platform; and solidifying the second layer of the solidifiable material in a second pattern corresponding to a second portion of the three-dimensional object. In certain optional and preferred examples, the solidification substrate is transparent and/or translucent and is a resilient layer, a film, or is rigid or semi-rigid. In other optional and preferred examples, a tilting parameter database comprising sets of tilting parameters stored in association with solidifiable material identifiers is provided, and a tilting operation is carried out based on a tilting parameter from the tilting parameter database. In further optional and preferred examples, the solidification substrate assembly includes a source of solidification energy. In additional optional and preferred examples, the method does not comprise traversing a peeling member to contact the solidification substrate and peel it from the exposed object surface.

In certain examples, the apparatuses and methods described herein beneficially increase the speed of a method of making a three-dimensional object while preserving the integrity of the object. As described further below, in certain examples, the tilting apparatuses and methods also tailor the tilting process to object properties, such as exposed surface area and/or the location of the object relative to the axis of tilting, which may vary on a layer by layer basis so that only the required amount of tilting to affect part separation or to provide a stable layer of solidifiable material is performed.

In still another aspect of the present disclosure, a method of making a three-dimensional object is provided which comprises solidifying a layer of solidifiable material in contact with a solidification substrate laminate to create a portion of a three-dimensional object having an exposed object surface adhered to an object-contacting surface of the solidification substrate laminate. The three-dimensional object is disposed on a build platform, and the step of solidifying the solidifiable material comprises projecting solidification energy through an open top of a solidifiable material container that contains the layer of solidifiable material and which has a closed bottom. The method further comprises tilting the solidification substrate laminate about a tilting axis in a direction away from the build platform to separate the three-dimensional object from the solidification substrate laminate, lowering the build platform such that a next layer of solidifiable material flows over the exposed object surface, and tilting the solidification substrate laminate about the tilting axis in a direction toward the build platform. In certain examples, the solidification substrate laminate comprises a rigid or semi-rigid solidification substrate that is transparent and/or translucent and either or both of a resilient layer and a protective film.

In a further aspect of the present disclosure, an apparatus is provided which comprises a source of solidification energy, a solidifiable material container having a closed bottom and an open top, a build platform movable along a build axis and having an object build surface that faces the open top and the source of solidification energy, a solidification substrate assembly comprising one selected from a film assembly and a solidification substrate laminate, an at least one actuator operatively connected to the solidification substrate assembly which is operable to tilt the solidification substrate assembly about a tilting axis. In certain examples, the solidification substrate assembly comprises the solidification substrate laminate, and the solidification substrate laminate comprises a rigid or semi-rigid solidification substrate that is transparent and/or translucent, and either or both of a resilient layer and a protective film.

As discussed herein, a solidifiable material is a material that when subjected to energy, wholly or partially hardens. This reaction to solidification or partial solidification may be used as the basis for constructing the three-dimensional object. Examples of a solidifiable material may include a polymerizable or cross-linkable material, a photopolymer, a photo powder, a photo paste, or a photosensitive composite that contains any kind of ceramic based powder such as aluminum oxide or zirconium oxide or yttria stabilized zirconium oxide, a curable silicone composition, silica based nano-particles or nano-composites. The solidifiable material may further include fillers. Moreover, the solidifiable material my take on a final form (e.g., after exposure to the electromagnetic radiation) that may vary from semi-solids, solids, waxes, and crystalline solids. In one embodiment of a photopolymer paste solidifiable material, a viscosity of between 10000 cP (centipoises) and 150000 cp is preferred.

When discussing a photopolymerizable, photocurable, or solidifiable material, any material is meant, possibly comprising a resin and optionally further components, which is solidifiable by means of supply of stimulating energy such as electromagnetic radiation. Suitably, a material that is polymerizable and/or cross-linkable (i.e., curable) by electromagnetic radiation (common wavelengths in use today include UV radiation and/or visible light) can be used as such material. In an example, a material comprising a resin formed from at least one ethylenically unsaturated compound (including but not limited to (meth)acrylate monomers and polymers) and/or at least one epoxy group-containing compound may be used. Suitable other components of the solidifiable material include, for example, inorganic and/or organic fillers, coloring substances, viscose-controlling agents, etc., but are not limited thereto.

When photopolymers are used as the solidifiable material, a photoinitiator is typically provided. The photoinitiator absorbs light and generates free radicals which start the polymerization and/or crosslinking process. Suitable types of photoinitiators include metallocenes, 1,2 di-ketones, acylphosphine oxides, benzyldimethyl-ketals, α-amino ketones, and α-hydroxy ketones. Examples of suitable metallocenes include Bis (eta 5-2, 4-cyclopenadien-1-yl) Bis[2,6-difluoro-3-(1H-pyrrol-1-yl) phenyl] titanium, such as Irgacure 784, which is supplied by Ciba Specialty chemicals. Examples of suitable 1,2 di-ketones include quinones such as camphorquinone. Examples of suitable acylphosphine oxides include bis acyl phosphine oxide (BAPO), which is supplied under the name Irgacure 819, and mono acyl phosphine oxide (MAPO) which is supplied under the name Darocur® TPO. Both Irgacure 819 and Darocur® TPO are supplied by Ciba Specialty Chemicals. Examples of suitable benzyldimethyl ketals include alpha, alpha-dimethoxy-alpha-phenylacetophenone, which is supplied under the name Irgacure 651. Suitable α-amino ketones include 2-benzyl-2-(dimethylamino)-1-[4-(4-morpholinyl) phenyl]-1-butanone, which is supplied under the name Irgacure 369. Suitable α-hydroxy ketones include 1-hydroxy-cyclohexyl-phenyl-ketone, which is supplied under the name Irgacure 184 and a 50-50 (by weight) mixture of 1-hydroxy-cyclohexyl-phenyl-ketone and benzophenone, which is supplied under the name Irgacure 500.

Referring now to FIGS. 1A-1E, an apparatus 40 for making a three-dimensional object from a solidifiable material is depicted. The apparatus 40 includes a housing 42 in which a container 44 is disposed. The container 44 has a closed bottom 45 and an open top 47 and holds a volume of solidifiable material 50, which is preferably a photohardenable liquid or paste that solidifies upon exposure to solidification energy of an appropriate wavelength and intensity for a sufficient period of time. A three-dimensional object 78 (FIG. 1B) is progressively built upward on build platform 46 in the positive build (z) axis direction by supplying solidification energy from the linear solidification device 62 to the solidifiable material 50 during an object solidification operation. The solidification energy is supplied in geometric patterns that correspond to object data, causing the solidifiable material to solidify in a shape corresponding to the object data.

At least one controller (not shown in FIGS. 1A-1E) is provided to selectively activate a solidification energy source in the linear solidification device 62 and to selectively energize a linear solidification device motor (not shown) that is operable to traverse the linear solidification device 62 along a travel (x) axis. Examples of linear solidification devices are described in FIGS. 3, 4, and 5A-5D of Applicant's co-pending U.S. patent application Ser. No. 13/534,638, filed on Jun. 27, 2012 and the corresponding text, including at paragraphs 60-79 and 86-104, the contents of which are hereby incorporated by reference. Exemplary pattern generators other than linear solidification devices which may be used include DLP (Digital Light Processing technology) from Texas Instruments®, SXRD™ (Silicon X-tal Reflective Display), LCD (Liquid Crystal Display), LCOS (Liquid Crystal on Silicon), DMD (digital mirror device), J-ILA from JVC, SLM (Spatial light modulator) or any type of selective light modulation system. Pattern generators that "draw" laser energy in two-dimensionally varying patterns across an exposed surface of solidifiable material may also be used, such as those that comprise a laser in optical communication with x-y galvanometer mirrors. The linear solidification device 62 projects solidification energy through the open top 47 of solidifiable material container 44 as well as through rigid or semi-rigid solidification substrate 58 and film 60.

The object 78 is built on an upward facing surface (or object build surface) 48 of the build platform 46. Object 78 includes a build platform contacting surface 80 that rests on (and typically is adhered to) the object build surface 48 of build platform 46. The build platform contacting surface 80 typically comprises discrete, removable supports. The object build surface 48 faces the open top 47 of solidifiable material container 44 and linear solidification device 62. A vertically-movable shaft 52 is movable within the housing 42 to adjust the build (z) axis position of the build platform 46 relative to the work table 64. The bottom of the vertically-movable shaft 52 is contained within a bottom portion of the housing 42 which is not shown for ease of illustration. A build platform motor (not shown) is provided and is operable to move the build platform 46 along the build (z) axis. At least one controller (not shown) is operatively connected to the build platform motor to selectively operate it in accordance with computer executable instructions stored in the non-transitory memory of the at least one controller and executed by the processor of the at least one controller. In certain examples herein, when executed by the processor, the computer executable instructions cause the build platform 46 to move downward along the build (z) axis by a defined layer thickness Δz following the solidification of a layer of the solidifiable material.

The apparatus 40 also includes a solidification substrate assembly 57, which in the depicted embodiment includes a rigid or semi-rigid solidification substrate 58, a film 60, and a load frame 56. The film 60 has an object-contacting surface 61 which faces the closed bottom 45 of solidifiable material container 44. In the example of FIGS. 1A-1E, the solidification substrate assembly 57 also comprises the linear solidification device 62. The rigid or semi-rigid solidification substrate 58 is preferably transparent and/or translucent to solidification energy supplied by a source of solidification energy. In the example of FIGS. 1A-1E, the source of solidification energy is provided in a linear solidification device 62. Although not depicted in FIGS. 1A-1E, the linear solidification device 62 is attached to the load frame 56 via a pair of linear rails spaced apart from one another in the y-axis direction and along which a support member attached to the linear solidification device 62 slidably translates in the x-axis direction. As further illustrated in the examples of FIGS. 4A-6, the rigid or semi-rigid solidification substrate 58 may be provided in a separate frame that attaches to the load frame 56, and the film 60 may be provided in a film assembly that attaches to the load frame 56 or to a frame holding the rigid or semi-rigid solidification substrate 58. In either event, the rigid or semi-rigid solidification substrate 58 and film 60 are directly or indirectly attached to the load frame 56 and movable therewith. In the example of FIGS. 1A-1E, film 60 is not bonded or adhered to the rigid or semi-rigid solidification substrate 58 but may closely contact the substrate 58. However, in other examples, and as described below with reference to FIGS. 16A-16F and 17A-17C, instead of using a rigid or semi-rigid solidification substrate 58 and a separate film 60, a solidification substrate laminate 298 may be used. The solidification substrate laminate 298 may comprise a resilient layer and/or a protective film bonded to rigid or semi-rigid solidification substrate 58 to define an integral, layered structure. In that case, solidification substrate laminate 298 includes an object contacting surface 301 that faces the closed bottom 45 of solidifiable material container 44.

As indicated previously, solidifiable material 50, such as a photohardenable resin, is provided under substantially rigid or semi-rigid substrate 58 to receive solidification energy transmitted through substrate 58. Solidification substrate 58 is generally rigid or semi-rigid and substantially permeable to the energy supplied by linear solidification device 62. In certain examples, it is preferred that the energy from linear solidification device 62 pass through solidification substrate 58 without a significant diminution in transmitted energy or a significant alteration of the energy spectrum transmitted to the solidification material 50 relative to the spectrum that is incident to the upper surface of solidification substrate 58. In the case where the energy from linear solidification device 62 is light (including non-visible light such as UV light), solidification substrate 58 is preferably substantially transparent and/or translucent to the wavelength(s) of light supplied by linear solidification device 62.

One example of a rigid or semi-rigid solidification substrate 58 is a translucent float glass. Another example is a translucent plastic. A variety of different float glasses and plastics may be used. Exemplary plastics that may be used include transparent and/or translucent acrylic plastics supplied by Evonik under the name Acrylite®. The term "translucent" is meant to indicate that substrate 58 is capable of transmitting the light wavelengths (including non-visible light such as UV light) necessary to solidify the solidifiable material and that the intensity of such wavelengths is not significantly altered as the light passes through substrate 58. In the case of photopolymer solidifiable materials, a photoinitiator is commonly provided to start the polymerization/cross-linking process. Photoinitiators will have an absorption spectrum based on their concentration in the photopolymer. That spectrum corresponds to the wavelengths that must pass through solidification substrate 58 and which must be absorbed by the photoinitiator to initiate solidification. In one example wherein solidification energy source in the linear solidification device 62 is a blue laser light diode, Irgacure 819 and Irgacure 714 photoinitiators may preferably be used.

Film 60 is preferably transparent and/or translucent and is a homopolymer or copolymer formed from ethylenically unsaturated, halogenated monomers. Fluoropolymers are preferred. Examples of suitable materials for protective film 60 include polyvinylidene fluoride (PVDF), ethylenchlorotrifluoroethylene (ECTFE), ethylenetetrafluoroethylene (ETFE), polytetrafluoroethylene (PTFE), perfluoroalkoxy (PFA), and modified fluoroalkoxy (a copolymer of tetrafluoroethylene and perfluoromethylvinylether, also known as MFA). Examples of suitable film 60 materials include PVDF films sold under the Kynar® name by Arkema, ECTFE films sold under the Halar® name by SolvaySolexis, ETFE films sold under the Tefzel® name by DuPont, PFA films sold under the Teflon®-PFA name by DuPont, and MFA films sold under the name Nowofol. MFA and Teflon® films are preferred The solidification substrate assembly 57 is attached to a work table 64 via a pair of hinges 74a and 74b (only hinge 74b is visible in FIGS. 1A-1E) which are both located on a first side 72a of the load frame 56 and spaced apart from one another along the y-axis. The hinges 74a and 74b are also attached to the work table 64 at a first side 65a of the work table 64. The hinges 74a and 74b define an axis of tilting or rotation for the solidification substrate assembly 57. Thus, during a tilting operation, the solidification substrate assembly 57 tilts about the axis defined by hinges 74a and 74b, which is parallel to the y-axis in the figures. In the example of FIGS. 4A-4E, solidification substrate assembly 57 also comprises linear solidification device 62.

Figure 1B:
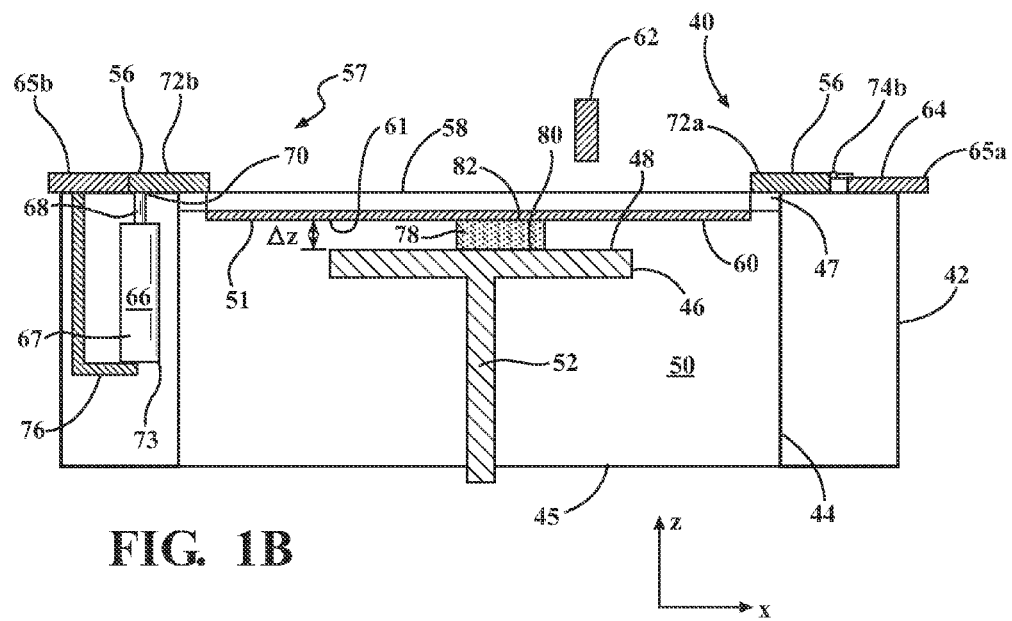
FIG. 1B is a schematic view of the apparatus of FIG. 1A in which a first layer of the three-dimensional object is formed on the build platform, and the solidification substrate assembly is in the level configuration of FIG. 1A.

The apparatus 40 includes a tilting actuator 66 that is operatively connected to the solidification substrate assembly 57. Actuator 66 has a housing 67 with a proximal end 73 and a shaft 68 with a distal end 70. The shaft 68 has a proximal end that is located in the housing 67 and which is not visible in the figures. In FIGS. 1A-1E the distal end 70 of actuator shaft 68 is connected to the left-side 72b of load frame 56 of the solidification substrate assembly 57. Right-side 72a of load frame 56 is spaced apart from left-side 72b along the x-axis. A bracket 76 is provided to connect the actuator 66 to the left-side 65b of the work table 64. Right-side 65a of work table 64 is spaced apart from left-hand side 65b along the x-axis. The position of actuator housing 67 is fixed relative to bracket 76 and the work table 64. However, the actuator shaft distal end 70 is movable relative to the work table 64 and the actuator housing 67 along the build (z) axis. The actuator 66 has an extended configuration (FIGS. 1C and 1D) and a retracted configuration (FIGS. 1A-B, and 1E). The length of actuator 66—as defined by the distance between the proximal actuator end 73 and the distal shaft end 70 along an axis defined by the actuator shaft 68 length—is longer in the extended configuration than in the retracted configuration. The length axis of actuator shaft 68 is generally parallel to the build (z) axis and is substantially parallel to the build (z) axis when the solidification substrate assembly 57 is in a level configuration (FIGS. 1A-1B, and 1E). However, the actuator shaft 68 length axis will tilt relative to the build (z) axis during a solidification substrate assembly 57 tilting operation because the solidification substrate assembly 57 traverses a circular path when viewed along the y-axis during a tilting operation. The actuator shaft 68 will exhibit its maximum degree of tilt relative to the build (z) axis when the shaft distal end 70 reaches its fully extended position.

Suitable actuators 66 include pneumatic actuators and linear actuators that are electromechanical. One suitable electromechanical linear actuator is a 100 pound maximum lift linear actuator supplied by Ezzy Lift. The actuator has a two inch (2) stroke (i.e., the maximum displacement of the distal end 70 from a fully refracted to a fully extended configuration is two (2) inches (50.8 mm)). The Ezzy Lift actuator has a maximum actuator travel speed (which is equivalent to a peeling velocity tilting parameter described below) of 12.8 mm/sec.

The actuator 66 is adjustable from the retracted configuration to the extended configuration to tilt the solidification substrate assembly 57 about the tilting axis defined by hinges 74a and 74b (not shown). In the example of FIGS. 1A-1E, the actuator 66 is positioned with its shaft 68 underneath the load frame 56 along the build (z) axis. In FIG. 1A, the actuator 66 is in the retracted configuration in which distal shaft end 70 is in a first refracted position along the build (z) axis that is relatively closer to the build platform 46 and to the proximal actuator end 73 along the build (z) axis than when the actuator 66 is in the extended configuration (FIGS. 1C-1D) in which distal shaft end 70 is in a second extended position along the build (z) axis. Thus, in the example of FIGS. 1A-1E, the distal shaft end 70 has an extended position in which it is spaced apart farther from both build platform 46 and actuator 66 along the build (z) axis.

Figure 1C:
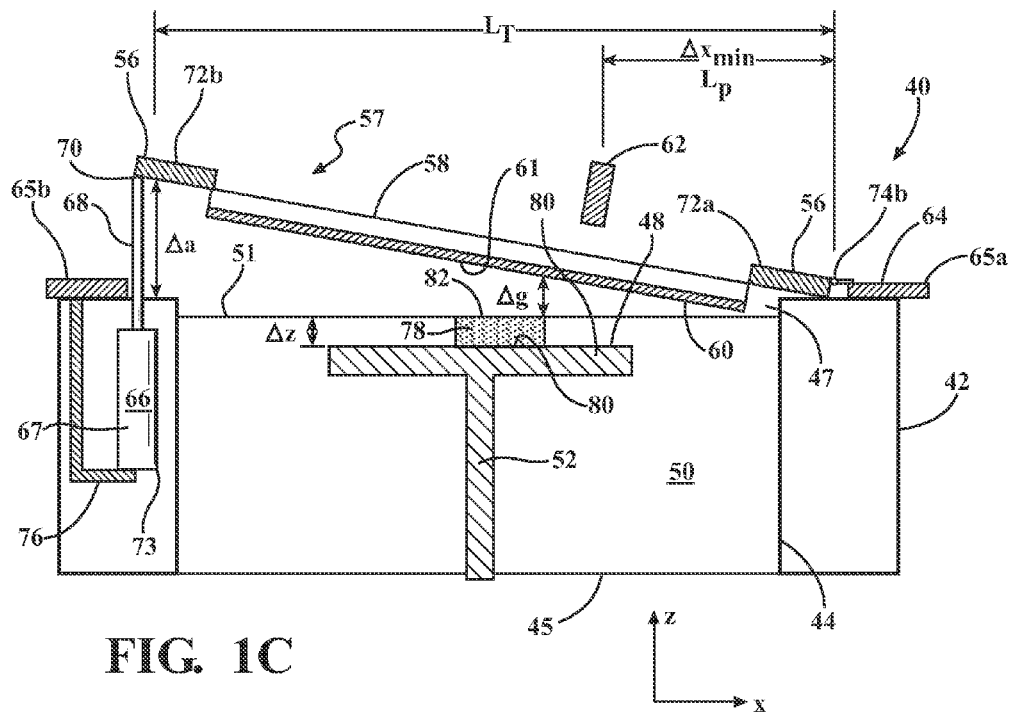
FIG. 1C is a schematic view of the apparatus of FIG. 1A with the solidification substrate assembly in a tilted configuration relative to a work table and the build platform following an object peeling operation.
Figure 1D:
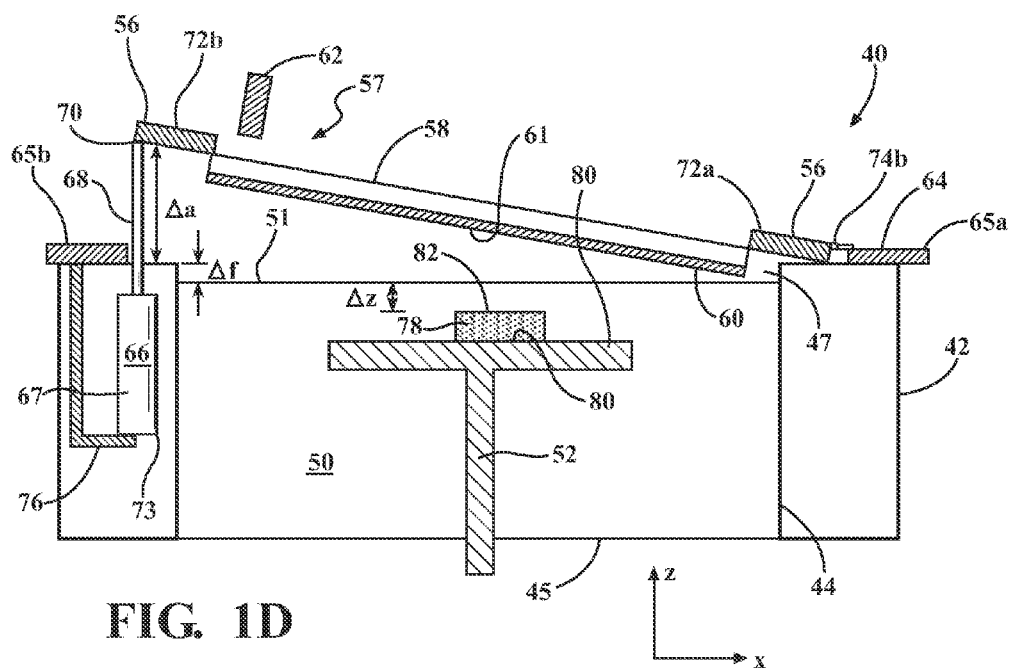
FIG. 1D is a schematic view of the apparatus of FIG. 1A with the solidification substrate assembly in the tilted configuration of FIG. 1C after the build platform has moved away from the solidification substrate assembly by one layer thickness to introduce unsolidified resin between the exposed object surface and the solidification substrate.
Figure 1E:
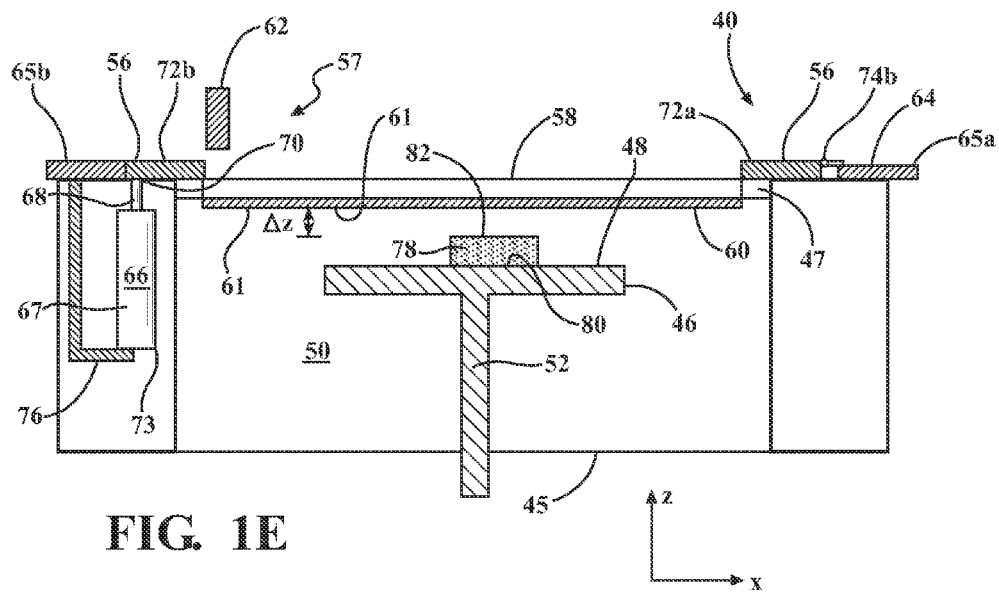
FIG. 1E is a schematic view of the apparatus of FIG. 1A with the solidification substrate assembly in the level configuration of FIG. 1A depicting the squeezing out of resin from the space between the exposed object surface and the solidification substrate.

The actuator 66 is adjustable from the retracted configuration of FIGS. 1A-1B to the extended configuration of FIGS. 1C and 1D to cause the solidification substrate assembly 57 to tilt about the tilting axis in a direction away from the build platform 46. The tilting of the solidification substrate assembly 57 away from build platform 46 may be used to carry out an object peeling operation as will be described further herein.

As FIGS. 1C and 1D indicate, the extension of the actuator shaft 68 from a retracted configuration to an extended configuration causes the solidification substrate assembly 57, including linear solidification device, the load frame 56, rigid or semi-rigid solidification substrate 58 and film 60, to tilt about the tilting axis defined by the hinges 74a (not shown) and 74b. However, as discussed further below with reference to the apparatus of FIG. 6, the actuator 66 may be configured differently so that the retraction of shaft 68 causes the solidification substrate assembly 57 to tilt away from the build platform 46. In that case, when the actuator shaft distal end 70 is in a first fully retracted position, the distal end 70 is spaced apart from the build platform 46 along the build (z) axis by a distance that is greater than the build (z) axis distance by which the distal shaft end 70 is spaced apart from the build platform 46 when actuator shaft distal end 70 is in a second fully extended position. In yet another alternative, and as discussed further below with respect to the example of FIGS. 10-13, the distal end 70 of the actuator 66 may be connected to a stationary surface such as work table 64 such that when the actuator 66 is in an extended configuration, the proximal end 73 moves away from the distal shaft end 70 and the build platform 46 and when the actuator 66 is a retracted configuration, the proximal end 73 moves toward the distal shaft end 70 and the build platform 46. In this configuration, the position of the proximal actuator end 73 relative to the tiltable solidification substrate assembly 57 remains fixed but is movable relative to the work table 64.

In certain known systems, following the solidification of a layer of solidifiable material, as depicted in FIG. 1B, the build platform 46 will descend by whatever distance is required to separate the exposed object surface 82 from the film 60 or rigid or semi-rigid solidification substrate 58 if no film is present. In such systems, the full peeling force is applied simultaneously across the entire exposed object surface 82 area of the object 78. The object 78 tends to become susceptible to breakage if the force per unit area of the exposed object surface 82 increases beyond a certain threshold. Therefore, in many known systems, the build platform 46 must be pulled away from the film 60 at a reduced speed to reduce the force per unit area and preserve the integrity of the object 78. In contrast, the peeling process carried out by the apparatus of FIGS. 1A-1E and the other apparatuses described herein yields a dynamically varying force profile along the x-axis and reduces the force per unit area during peeling operations relative to processes in which an entire layer is separated by a vertical force. Also, in preferred implementations of the apparatus 40 of FIGS. 1A-1E, peeling may be completed before the build platform 46 moves. Thus, the peeling process is not dependent on the build platform 46 movement and does not limit the speed of build platform 46 movement.

FIG. 1C depicts the apparatus 40 with the solidification substrate assembly 57 in a peeled and tilted configuration in which the rigid or semi-rigid solidification substrate 58 and film 60 have fully separated from the exposed object surface 82. In FIG. 1C, actuator 66 is in an extended configuration. In some implementations, peeling operations may be carried out by extending the actuator shaft 68 by a fixed amount (the actuator peeling distance, which is shown as Δa in FIGS. 1A-1E) following the formation of each object layer. However, in other implementations, the actuator peeling distance may be varied based on the object data for the just-solidified layer. The location of the exposed object surface 82 along the x-axis for any given object layer will generally dictate the extent to which the actuator shaft 68 must be extended to fully peel the exposed object surface 82 from the film 60. Thus, in these other implementations, the actuator peeling distance Δa is adjusted for one or more layers of the three-dimensional object to effect the minimum degree of peeling required given the x-axis dimensions of the most recently formed object layer. Because of the hinged connection between the solidification substrate assembly's load frame 56 and the work table 64, the solidification substrate assembly 57 undergoes a circular motion (when viewed along the y-axis) during a peeling operation. As a result, those points of film 60 or substrate 58 which are in contact with locations on the exposed object surface 82 that are relatively farther (along the x-axis) from the tilting axis (defined by hinges 74a and 74b) will travel a greater distance during a tilting operation than will points of film 60 or substrate 58 that are in contact with locations on the exposed object surface 82 that are relatively closer (along the x-axis) to the tilting axis. Therefore, in certain implementations, the actuator peeling distance Δa is adjusted so that a portion on the exposed object surface 82 that is in contact with film 60 and which is closest (along the x-axis) to the tilting axis (i.e., closest to the hinges 74a and 74b) will travel during an object peeling operation from a starting location to an ending location that defines a linear travel vector having a length equal to the minimum object peeling travel distance Δg. In such implementations, as the x-axis location of the portion of the exposed object surface 82 that is closest to the tilting axis varies, so will the actuator peeling distance Δa. This technique helps ensure that only the necessary amount of peeling is performed, which in turn reduces the time required to build three-dimensional parts. In FIG. 1C, the minimum object peeling distance Δg is shown as being a vertical spacing. However, in practice it is a vector with a variable direction which may or may not be parallel to the build (z) axis. Also, the actuator shaft 68 is shown as extending in a direction parallel to the build (z) axis. However, due to the hinged connection of the load frame 56 to the work table 64, the actuator distal end 70 will traverse a generally circular path during tilting operations, and thus, the shaft 68 may tilt away from the build (z) axis.

In the example of FIG. 1C, the exposed surface 51 of the solidifiable material 50 is beneath the fully retracted position of the actuator distal end 70 and the hinges 74a and 74b along the build (z) axis. In the figures, the difference between the vertical (z-axis) spacing between the actuator shaft distal end 70 and the exposed solidifiable material surface 51 on the one hand and the actuator shaft distal end 70 and hinges 74a and 74b on the one hand is identified as Δf. With this configuration, the rigid or semi-rigid solidification substrate 58 may be positioned beneath the open top of the solidifiable material container 44. In certain examples, the actuator peeling distance Δa may be calculated from the minimum object peeling travel distance Δg, using the following relationship:

$$\Delta a = \frac{(Lt \times \Delta g)}{\sqrt{(Lp^2 + \Delta f^2)}} \quad (1)$$

wherein, Δa=actuator peeling distance (mm);
Lt=distance along the x-axis from actuator to hinges (mm);
Lp=shortest distance along the x-axis from exposed object surface to hinges (mm);
Δf=difference between (1) the z-axis distance between the actuator shaft distal end 70 and the exposed solidifiable material surface 51 and (2) the z-axis distance between the actuator shaft distal end and hinges 74a and 74b (mm).

Sensors may be provided to indicate the completion of an object peeling operation. In one example, a limit switch may be provided which generates a signal when the actuator distal end 70 reaches its fully-extended, end of travel position along the build (z) axis. When fixed actuator peeling distances Δa are used carry out object peeling operations, the limit switch may be operatively connected to a controller and used by the controller to sequence subsequent operations following the completion of an object peeling operation.

Following the solidification of an object layer, the build platform 46 descends by a desired layer thickness Δz as shown in FIG. 1D. The build platform 46 may descend during the object peeling operation or following it. In preferred examples, the build platform 46 descends following the completion of the object peeling operation. The movement of the build platform 46 allows unsolidified solidifiable material 50 to flow into the region above the exposed object surface 82 and create a new exposed solidifiable material surface 51. In FIG. 1D, the exposed object surface 82 is spaced apart from the exposed solidifiable material surface 51 by the desired layer thickness Δz.

Prior to solidifying a new layer of solidifiable material 50, the solidification substrate assembly 57 is tilted into a level configuration by carrying out a leveling operation as shown in FIGS. 1D to 1E. To carry out the leveling operation, the distal end 70 of the actuator shaft 68 is retracted along the build (z) axis to its fully-retracted position, as shown in FIG. 1E. During the leveling operation, the rigid or semi-rigid solidification substrate 58 and film 60 apply a pressure in the negative build (z) axis direction against the solidifiable material 50 that is located in the region between the exposed object surface 82 and the film 60. This pressure has the effect of "squeezing" out material trapped in this region as shown by the curved arrows in FIG. 1E.

During the squeezing process, the solidifiable material experiences small localized waves and other transient hydrodynamic phenomena. Thus, in general, it is desirable to ensure that the squeezing operation is complete before the linear solidification device 62 begins solidifying the next layer to avoid distortions in the resulting three-dimensional object. One technique of ensuring that squeezing is complete is to wait until the expiration of a "leveling wait time" after the solidification substrate assembly 57 is in the level configuration of FIG. 1E. In certain examples herein, leveling wait times of no more than about 60 seconds are preferred, and leveling wait times of no more than about 45 seconds, and no more than about 35 seconds, are more preferred and even more preferred respectively. At the same time, leveling wait times of at least about 2 seconds, at least about 5 seconds, and at least about 8 seconds are preferred, more preferred, and especially preferred, respectively. In one example, a leveling wait time of about 10 seconds is used.

Figure 2:
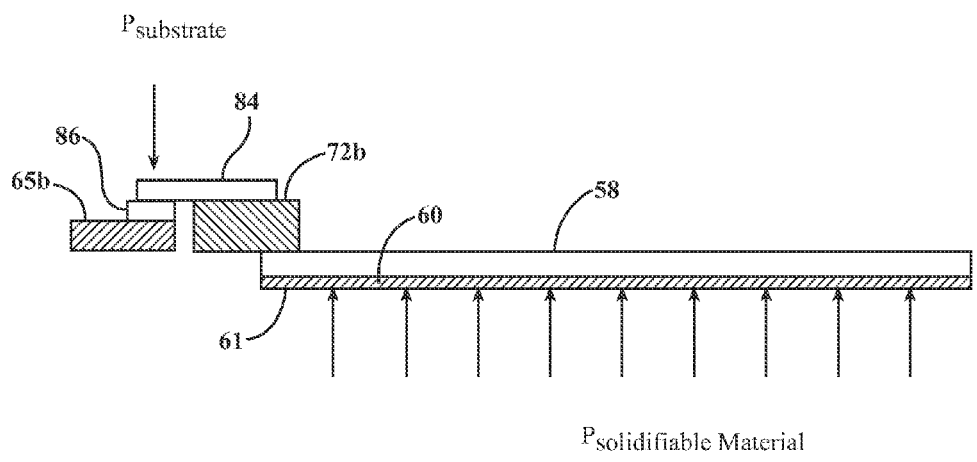
FIG. 2 is a close-up schematic view of the apparatus of FIGS. 1A-1E depicting the pressure forces applied on a pressure sensor placed on a work table.

As an alternative to using a leveling wait time, a pressure or force sensor may also be provided and used to determine when a squeezing operation is complete. The pressure sensor is preferably directly or indirectly indicative of the fluid pressure exerted by solidifiable material 50 against the film 60 and rigid or semi-rigid solidification substrate 58. During a squeezing operation, this pressure (which has a direction in the positive or upward build (z) axis direction) will decrease until squeezing is complete. An exaggerated schematic view of one possible pressure sensor configuration is depicted in FIG. 2. Pressure sensor 86 comprises a load cell attached to the left-hand side 65b of work table 64 so as to be spaced apart from the hinges 74a and 74b along the x-axis. A load bracket 84 is attached to the load frame 56 at the load frame left hand side 72b and overlaps with the pressure sensor 86 along the x-axis. The load bracket 84 applies a negative (downward) build (z) axis force against the pressure sensor 86. At equilibrium (i.e., when no squeezing is occurring) the weight of the solidification substrate assembly 57 will exert a non-zero reference force in the negative build (z) axis direction against the load cell which will be offset to some extent by the pressure exerted by the solidifiable material 50 against the film 60 and rigid or semi-rigid solidification substrate 58. Thus, the sensor 86 will produce a non-zero, equilibrium pressure reading when no squeezing is occurring.

With the pressure sensor 86 configured as shown, during a squeezing operation, the positive build (z) axis force applied by the solidifiable material 50 against the film 60 and rigid or semi-rigid solidification substrate 58 will provide a net force exerted against the pressure sensor 86 that is lower than the equilibrium force exerted against the sensor 86 when no squeezing is occurring. As squeezing continues, the positive build (z) axis force applied by the solidifiable material 50 will decrease, causing the pressure sensor 86 reading to increase toward the equilibrium, non-zero reference pressure, which indicates that squeezing is complete. In addition to using the pressure value itself, the change in the pressure value with respect to time (dP/dt) may be used as an indication that squeezing is complete by comparing the change with a specified threshold change. In certain examples, the non-zero reference pressure (or reference value of dP/dt) is a tilting parameter and may be varied based on the particular solidifiable material 50 that is used. In general, more highly viscous solidifiable materials will exert a greater upward force against the film 60 and rigid or semi-rigid solidification substrate 58 at equilibrium, and for such materials are relatively higher non-zero reference pressure is selected as compared to lower viscosity materials.

In certain exemplary implementations, the actuator 66 applies a constant force against the solidification substrate assembly 57 during an object peeling operation. In other exemplary implementations, the actuator 66 applies a constant force against the solidification substrate assembly 57 during a leveling operation. In further exemplary implementations, the actuator 66 applies a constant force against the solidification substrate assembly 57 during both an object peeling operation and a leveling operation (albeit in opposite directions). In a preferred method, the same constant force is applied during an object peeling and a leveling operation (albeit in opposite directions), and the constant force (in the negative build (z) axis direction) remains after the solidification substrate assembly 57 is level, which stabilizes the assembly against the upward pressure of the solidifiable material 50.

In certain implementations of the apparatus 40 of FIGS. 1A-1E, it has been found that during the first several layers of an object solidification operation, it may not be possible to obtain sufficient solidifiable material 50 above the exposed object surface 82 to develop a new layer of solidifiable material 50 of the desired layer thickness Δz. Without wishing to be bound by any theory, it is believed that insufficient material is available above the upward facing surface 48 of the build platform 46 during the formation of the first several object layers to sufficiently cover the build platform 46 and the object 78 because of the close proximity of build platform 46 to the exposed surface 51 of the solidifiable material 50. Thus, in a "deep dipping" variation of the technique described in the preceding paragraph, during the formation of an initial set of object layers, the build platform 46 is dipped in the negative build (z) axis direction by an amount greater than the desired layer thickness Δz and is subsequently elevated in the positive build (z) axis direction until the exposed object surface 82 is spaced apart from the exposed solidifiable material surface 51 by the desired layer thickness Δz. In preferred implementations of this variation, the deep dipping step is carried out during the formation of at least layer 2, more preferably during layers 2-3, still more preferably during layers 2-4, even more preferably during layers 2-5, still more preferably during layers 2-6, yet more preferably during layers 2-7, even more preferably during layers 2-8, and still more preferably during layers 2-9, and yet more preferably during layers 2-10. The deep dipping process is preferably carried out for no more than the first 30 layers, even more preferably no more than the first 20 layers, and still more preferably no more than the first 15 layers. When this deep dipping variation is used, the depth of the deep dipping is preferably at least about 2×, more preferably at least about 10×, more preferably at least about 40×, still more preferably at least about 50×, and yet more preferably at least about 100× the desired layer thickness $\Delta z$. At the same time, the depth of the deep dipping is preferably no more than about 400×, still more preferably no more than about 350×, even more preferably no more than about 300×, and even more preferably no more than about 200× the desired layer thickness $\Delta z$. Thus, in one example using a desired layer thickness $\Delta z$ of 50 microns, the deep dipping depth ranges from 5-10 mm, which is 100-200 times the layer thickness. In preferred examples, when deep dipping is used, solidification of the next object layer is deferred until the leveling wait time expires starting from the time when the solidification substrate assembly 57 is in the level configuration and the build platform 46 has been elevated so that the exposed object surface 82 is spaced apart from the solidification substrate assembly 57 by a distance along the build (z) axis equal to the desired layer thickness $\Delta z$.

In accordance with the deep dipping variation, there is preferably a waiting period between the completion of the deep dipping step and the elevation of the build platform 46 to a build (z) axis location at which the exposed object surface 82 is spaced apart from the exposed solidifiable material surface 51 by the desired layer thickness $\Delta z$. In preferred examples, the waiting period is preferably at least about one (1) second, more preferably at least about 1.5 seconds, and still more preferably at least about 2 seconds. At the same time, the waiting period is preferably no more than about 10 seconds, still more preferably no more than about 8 seconds, and even more preferably no more than about 5 seconds. The deep dipping variation can be performed with or without tilting the solidification substrate assembly 57 or performing the leveling operation described above. However, if tilting is not used to perform an object peeling operation, the speed of descent of the build platform 46 in the negative build (z) axis direction must be reduced because object separation from the film 60 will occur during the descent and without tilting, the separation forces per unit area will generally be higher across the exposed object surface 82.

Figure 3:
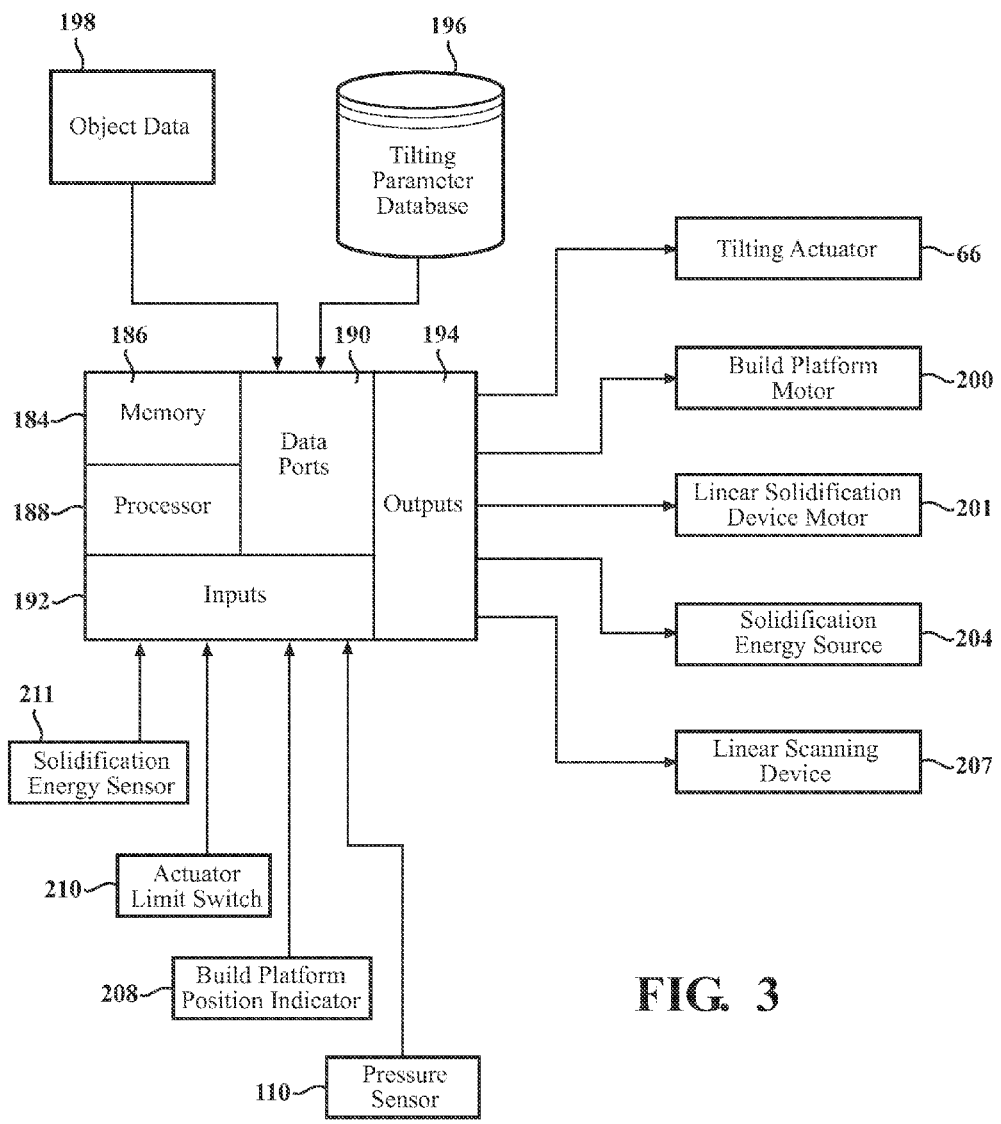
FIG. 3 is a block diagram used to depict a controller suitable for use in the apparatus of FIGS. 1A-1E in addition to various inputs to and outputs from the controller.

As indicated previously, the apparatus 40 of FIGS. 1A-1E preferably includes at least one controller that is operatively connected to the actuator 66. The at least one controller may comprise multiple controllers that are respectively used to control the actuator 66, the build platform motor (not shown), a linear solidification device motor (not shown) and internal components of the linear solidification device 62, such as a source of solidification energy and a linear scanning device. Alternatively, these functions may be provided in a single controller that includes the requisite inputs and outputs. A schematic illustration of a controller 184 that controls the linear solidification device 62, tilting actuator 66, and build platform 46 is shown in FIG. 3. Controller 184 includes a microprocessor 188 such as a central processing unit (CPU). Controller 184 also includes a non-transitory memory 186 that stores one or more programs (i.e., sets of computer executable instructions) which when executed by the processor 188 cause the controller 184 to perform various calculations and determinations and to generate various output signals from outputs 194 to connected devices.

Controller 184 includes a variety of inputs 192 for receiving sensor or other instrument signals used to carry out control functions. In the example of FIG. 3, controller 184 is connected to a pressure (or force) sensor 110, a build platform position indicator 208 (which may comprise a signal from a build platform motor that is indicative of the build platform 46 position along the build (z) axis), an actuator limit switch 210, and a solidification energy sensor 211. Solidification energy sensors are described in Applicant's co-pending U.S. patent application Ser. No. 13/534,638, including in FIGS. 5C and 5D and corresponding text including at paragraphs 102-110, 191-196, and 209-212, the contents of which are hereby incorporated by reference.

Controller 184 also includes a variety of outputs 194 for transmitting various actuation signals to different devices. In the example of FIG. 3, controller outputs 194 are connected (either directly or indirectly by way of intervening devices) to tilting actuator 66, build platform motor 200, linear solidification device motor 201, solidification energy source 204, and linear scanning device 207. Controller 184 also includes data ports 190 for receiving data from other devices. For example, controller 184 receives object data 198 that is representative of the three-dimensional object and which dictates the pattern of solidification energy projected through the rigid or semi-rigid solidification substrate 58 and film 60 and onto the exposed surface 51 of the solidifiable material 50. In certain examples, a computer (not shown) processes object data received in a first format and transmits it in a second format to data ports 190. For example, a host computer may receive CAD/CAM data or other object data and convert it into string data comprising a plurality of time values at which a solidification energy source is toggled on and off as linear solidification device 62 moves along the x-axis. Examples of string data are provided in Applicant's co-pending U.S. patent application Ser. No. 13/534,638, including in FIGS. 16(d), 16(f), and 16(g) and the corresponding text at paragraphs 167-170, and 176-181, the contents of which are hereby incorporated by reference.

Controller 184 is also operatively connected to a tilting parameter database 196. The tilting parameter database 196 comprises a non-transitory, computer readable medium having tilting parameter data stored on it. The tilting parameter database 196 may be provided as internal component in controller 184 or it may be a separate component from which controller 184 receives necessary tilting parameter data. In preferred examples, the tilting parameter database 196 includes names or other identifiers for a plurality of different solidifiable materials and a set of tilting parameters stored in association with each solidifiable material identifier. The set of tilting parameters for any given solidifiable material may comprise one or more tilting parameters. The tilting parameters may be selected from the group consisting of actuator peeling distance $\Delta a$, peeling velocity, leveling velocity, leveling wait time, pressure (or force) sensor reference pressure, pressure (or force) sensor reference change with respect to time (dP/dt), and minimum object peeling travel distance $\Delta g$, and any and all combinations thereof. In one exemplary implementation, controller 184 includes a program comprising a set of computer executable instructions stored in memory 186 and when executed by processor 188, the computer executable instructions determine an actuator peeling distance $\Delta a$ from a minimum object peeling travel distance $\Delta g$ (FIG. 1C) and an x-axis location on the exposed object surface 82 that is closest to hinges 74a and 74b (i.e., the tilting axis) along the x-axis. The computer executable instructions then cause the controller 184 to generate an appropriate output signal (actuator activation signal) which is transmitted to the actuator 66 and which causes the actuator 66 to extend the distal shaft end 70 from the fully retracted position of FIGS. 1A and 1B to the desired actuator peeling distance $\Delta a$. In a further example, the computer executable instructions cause controller 184 to generate an appropriate actuator activation signal to retract the actuator distal shaft end 70 to the fully retracted position of FIG. 1E. Further examples of suitable computer executable instructions are described below with respect to FIGS. 7 and 8A-8B.

Referring to FIGS. 4A-4E, a detailed perspective view of an apparatus for making a three-dimensional object is described. The apparatus includes a solidification substrate assembly 57 and a work table 64. The apparatus also comprises a housing 42, build platform 46 (and shaft 52) and solidifiable material container 44 which are not shown for ease of illustration.

Figure 4B:
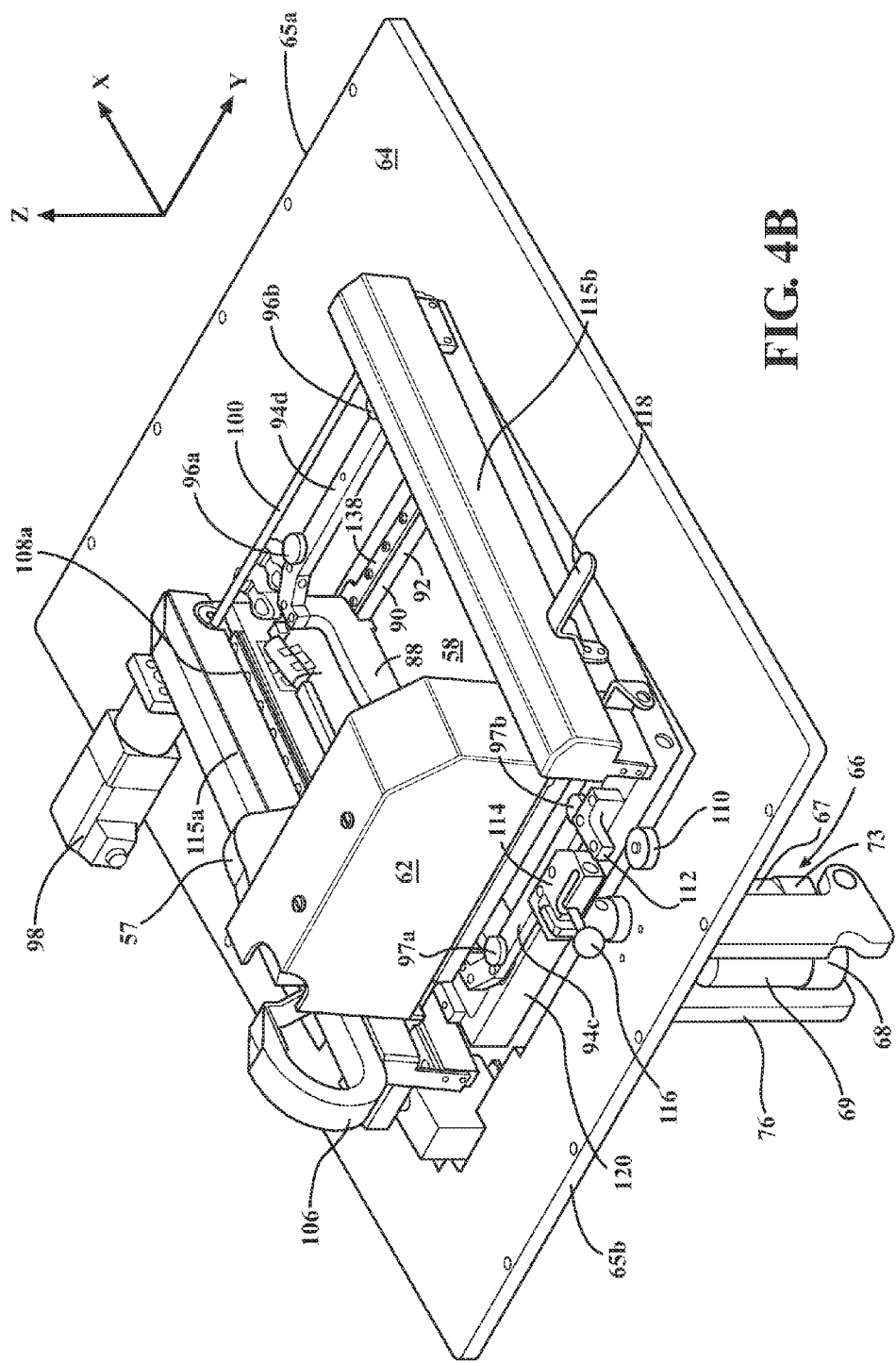
FIG. 4B depicts the apparatus of FIG. 4B with the solidification substrate assembly in a tilted configuration.
Figure 4C:
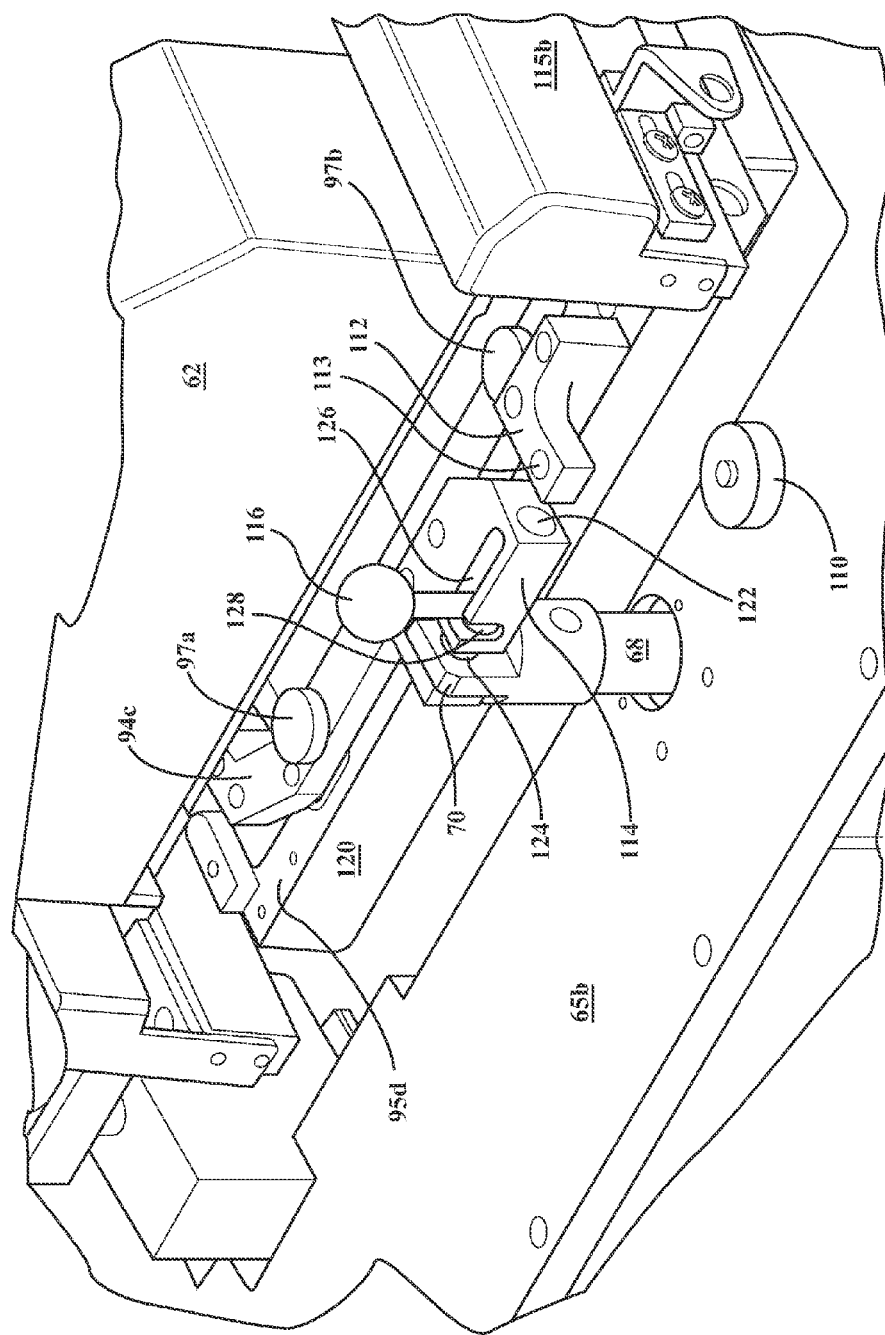
FIG. 4C is a close-up detailed view of a portion of the apparatus of FIGS. 4A-4B used to illustrate the connection between an actuator shaft and a load frame and the relationship between the load frame and a pressure (or force) sensor on the work table when the solidification substrate assembly is in a tilted configuration.
Figure 4D:
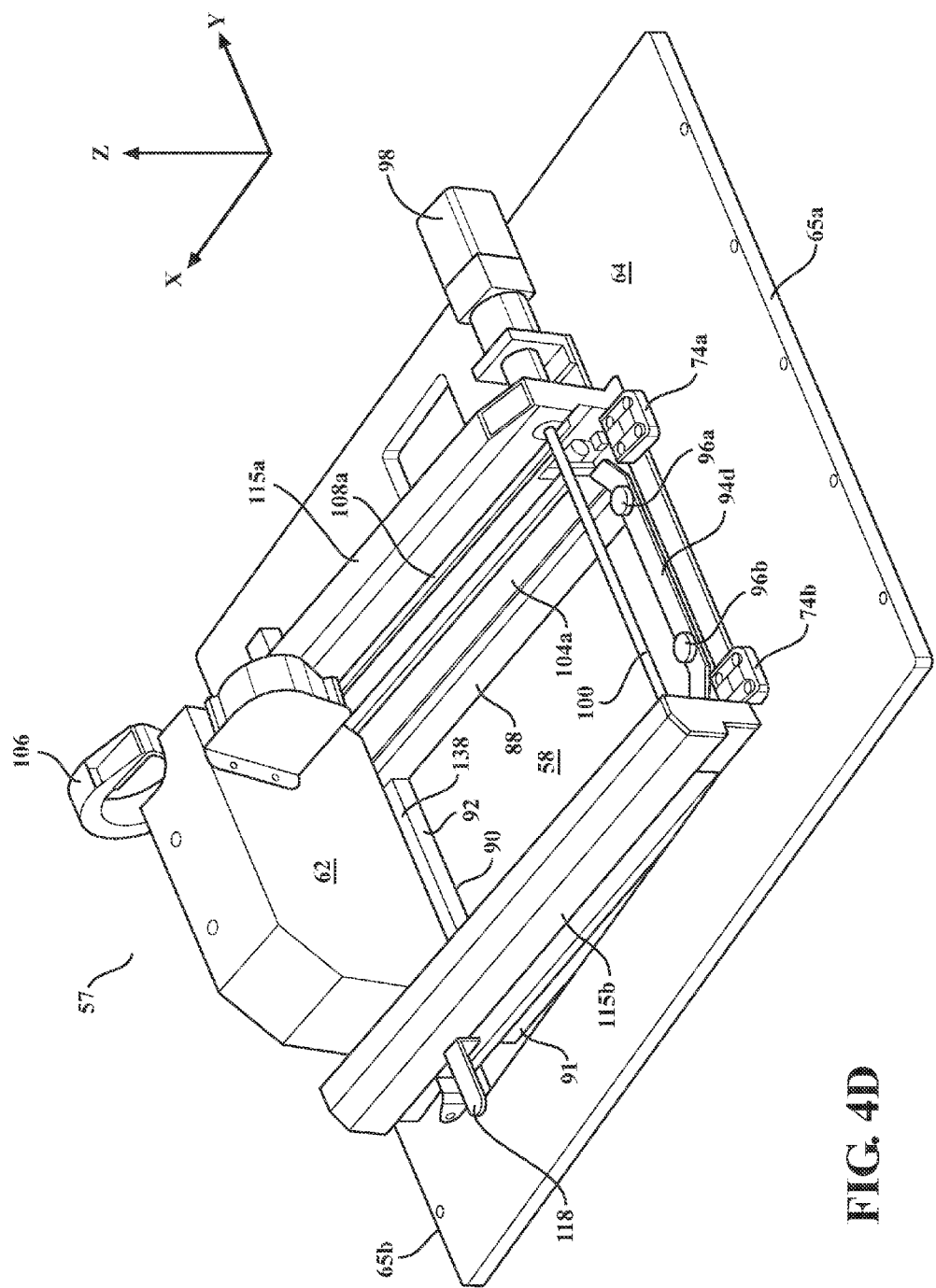
FIG. 4D is a detailed second perspective view of the apparatus of FIG. 4A with the solidification substrate assembly in a tilted configuration.

The solidification substrate assembly 57 includes a rigid or semi-rigid solidification substrate 58, a rigid or semi-rigid solidification substrate frame 88, load frame 120, film assembly 90, and linear solidification device 62. The work table 64 includes a central opening in which the solidification substrate assembly 57 is disposed. The solidification substrate assembly 57 is tiltable about a tilting axis that is defined by hinges 74a and 74b (FIG. 4D) and which is parallel to the y-axis. Hinges 74a and 74b are attached to the load frame 120 and the work table 64 as shown in FIG. 4D. A stop 118 comprising a substantially flat member extending along the y-axis is provided to restrain the tilting of the solidification substrate assembly 57 in a direction toward the build platform (not shown). A wire conduit 106 is provided to connect at least one controller 184 to the linear solidification device 62.

Figure 5A:
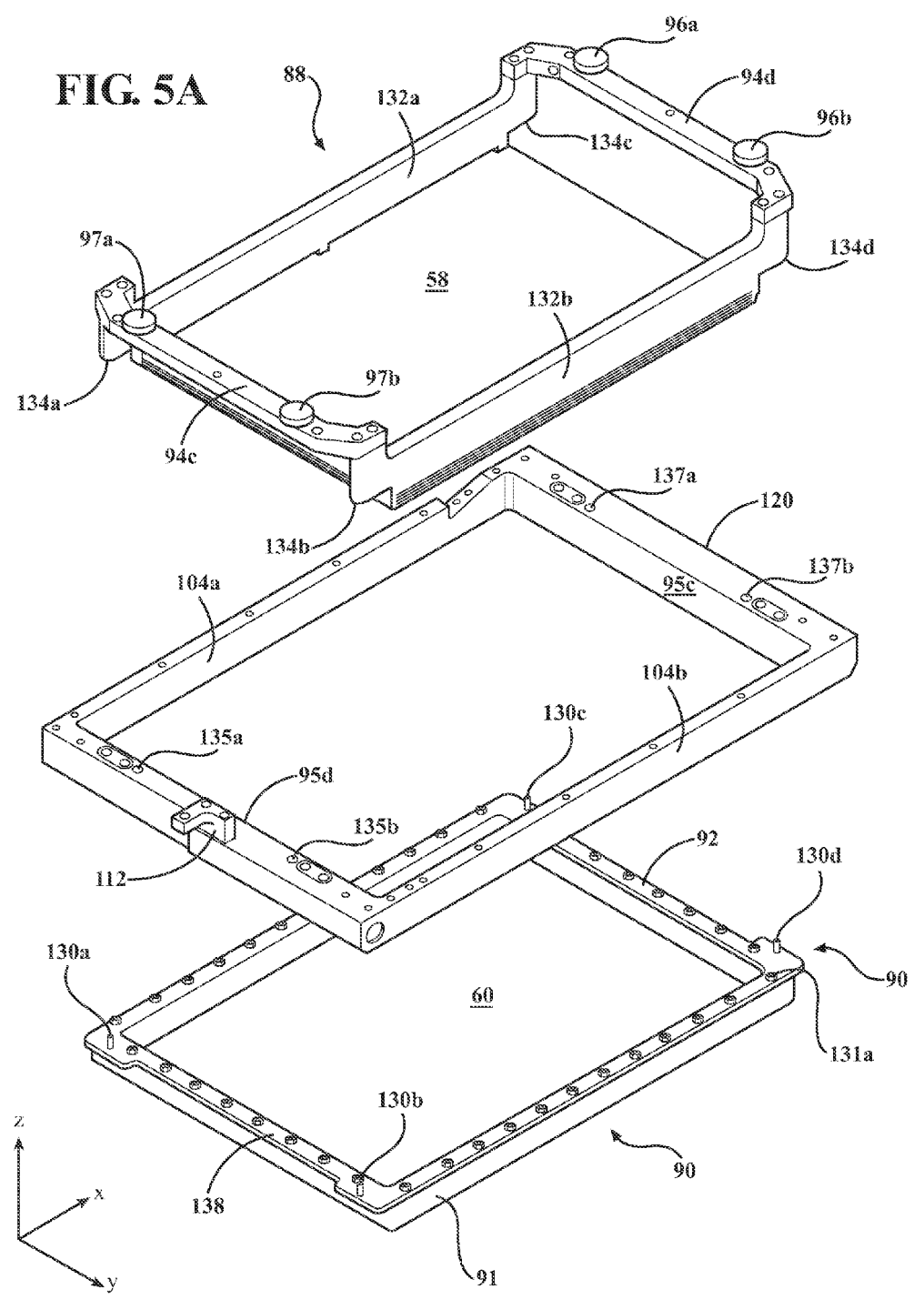
Figure 5B:
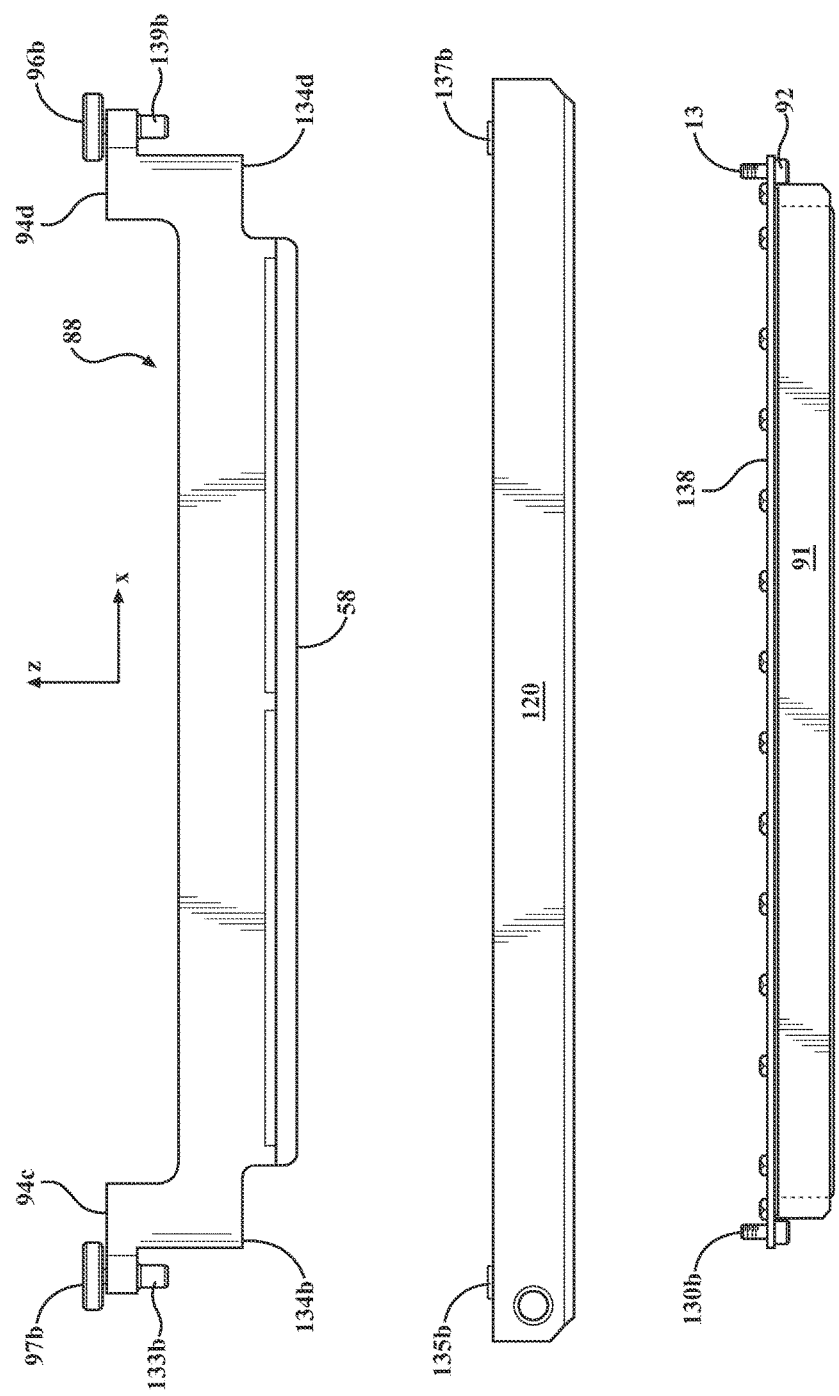
FIG. 5B is a side elevation view of FIG. 5A.

An exemplary solidification substrate assembly 57 (without the linear solidification device 62 attached) is depicted in FIGS. 5A-5C. Rigid or semi-rigid solidification substrate 58 is attached to a solidification substrate frame 88 and projects beneath (along the build (z) axis) the sidewalls 132a (not shown) and 132b. Frame 88 is generally rigid structure which is preferably metal. Solidification substrate frame 88 includes first and second sidewalls 132a and 132b which are spaced apart along the y-axis, and cross-members 94c and 94d spaced apart along the x-axis. The solidification substrate 58 has a bottom surface that projects beneath (along the z-axis) the lower surfaces of sidewalls 132a and 132b. The solidification substrate 58 is positioned inward of crossmembers 94c and 94d along the x-axis and is attached to sidewalls 132a and 132b, which are spaced apart from one another along the y-axis.

Film assembly 90 includes a transparent and/or translucent film 60 and a frame assembly. The frame assembly comprises an inner frame 92 and an outer frame 91. The inner frame 92 includes an outwardly projecting lip 138. A peripheral portion of the film 60 is sandwiched between the lip 138 and the upper surface of the outer frame 91. The film 60 is preferably stretched tautly within the frames 92 and 91. In certain examples, film 60 may have a plurality of small grooves in its upward facing surface. In certain examples, the grooves minimize the likelihood of a vacuum forming between downward (build (z) axis) surface of the rigid or semi-rigid solidification substrate 58 and the upward (build (z) axis) facing surface of the film 60. However, such grooves are not necessary in many implementations.

Load frame 120 is a generally rectangular structure with side walls 104a and 104b spaced apart along the y-axis, and side walls 95c and 95d spaced apart along the x-axis. Actuator 66 includes actuator housing 67 and shaft 68. As best seen in FIGS. 4B-4C, shaft 68 has a distal end 70. Actuator housing 67 has a proximal end 73. Thus, the distance from the proximal housing end 73 to the shaft distal end 70 along an axis defined by the length of shaft 68 defines the length of the actuator 66. The actuator length is adjustable from a retracted configuration to an extended configuration. In the extended configuration, the distal end 70 of shaft 68 is spaced apart along the shaft 68 length axis and along the build (z) axis from the actuator housing proximal end 73 by a distance that is greater than the shaft 68 length axis and build (z) axis spacings between the distal end 70 and actuator proximal housing end 73 in the refracted configuration. In the extended configuration, the distal shaft end 70 is also spaced apart from a build platform (not shown) 46 by a distance along the build (z) axis that is greater than when the actuator 66 is in the retracted configuration. The length axis of actuator shaft 68 is generally parallel to the build (z) axis and is substantially parallel to the build (z) axis when the solidification substrate assembly 57 is in a level configuration (FIG. 4A). However, the actuator shaft 68 length axis will tilt relative to the build (z) axis during a solidification substrate assembly tilt operation because the solidification substrate assembly 57 traverses a circular path when viewed along the y-axis during a tilting operation. The actuator shaft 68 will exhibit its maximum degree of tilt relative to the build (z) axis when the shaft distal end 70 reaches its fully extended position.

In the example of FIGS. 4A-4E, the position of the proximal end 73 of actuator housing 67 is fixed relative to the work table 64, and the position of the distal shaft end 70 relative to the work table 64 varies as the actuator 66 is adjusted from the retracted configuration to the extended configuration and vice-versa.

In FIG. 4A, the solidification substrate assembly 57 is in a level (untilted) configuration relative to work table 64. Actuator 66 is in a retracted configuration in which distal shaft end 70 is relatively closer (along the build (z) axis) to work table 64 and a build platform 46 (not shown) than when actuator 66 is in an extended configuration. In FIGS. 4B-4E, solidification substrate assembly 57 is in a tilted configuration relative to work table 64. When solidification substrate assembly 57 is in the tilted configuration, actuator 66 is in an extended configuration in which the distal shaft end 70 is relatively farther (along the build (z) axis) from work table 64 and the build platform 46 (not shown) than when the actuator 66 is in a retracted configuration.

The apparatus for making three-dimensional objects of FIGS. 4A-4E includes the solidification substrate assembly 57 of FIGS. 5A-5C. As with the example of FIGS. 1A and 1E, and as shown in FIG. 4A, when attached to work table 64, the film 60 and rigid or semi-rigid solidification substrate 58 are spaced apart from the work table 64 in the negative build (z) axis direction when the solidification substrate assembly 57 is in a level configuration. This arrangement allows the film 60 or substrate 58 (if film 60 is not provided) to be placed in contact with the exposed surface of the solidifiable material without subjecting the work table 64 or the load frame 120 to contact with the solidifiable material. Although not shown in FIGS. 4A-4E, film 60 includes an object contacting surface 61 that faces the closed bottom 45 of solidifiable material container 44 as illustrated in FIGS. 1A-1E. In addition, the build platform 46 of FIGS. 1A-1E would be provided, and the object build surface 48 would face the object contacting surface 61 of the film 60, the open top 47 of solidifiable material container 44 and the linear solidification device 62.

The solidification substrate frame 88 and the film assembly 90 are attachable to one another to define an assembled unit. Fasteners 130a-130d (FIGS. 5A-5B) are provided around the periphery of the outwardly extending lip 138 of the inner frame 92 and engage corresponding threaded holes 134a-134d in the bottom surfaces of the corners of the solidification substrate frame 88. In addition, the load frame 120 is attachable to the solidification substrate frame 88. Solidification substrate frame 88 includes knobs 96a-96b and 97a-97b. Knobs 96a-96b include threaded shafts 139a (not shown) and 139b (FIG. 5B) which engage threaded holes 137a (not shown) and 137b formed in the top surface of side 95c of load frame 120. Knobs 97a-97b include threaded shafts 133a (not shown) and 133b which engage corresponding holes 135a and 135b formed in the top surface of side 95d of load frame 120.

When solidification substrate frame 88 is attached to film assembly 90 and to load frame 120 as described above, the three components define an assembled solidification substrate assembly 57 as shown in FIG. 5C (the linear solidification device 62 is not shown in FIGS. 5A-5C). In the assembled condition of FIG. 5C, the film assembly frames 92 and 91 and film 60 are disposed beneath (along the z-axis) the load frame 120. The solidification substrate 58 is disposed beneath (along the z-axis) the load frame 120 and the outwardly extending lip 138 of the film assembly inner frame 92. The downward (along the z-axis) facing surface of solidification substrate 58 abuttingly engages the upward (along the z-axis) facing surface of film 60. Knobs 96a-96d and 97a-97b can be loosened to separate and lift the solidification substrate frame 88 and film assembly 90 as a unit from load frame 120, which is useful for maintenance operations such as replacing film 60 and/or the solidification substrate 58, if necessary.

Referring again to FIGS. 4A-4E, the depicted apparatus includes a linear solidification device motor 98 which is operable to traverse the linear solidification device 62 along the travel (x) axis. Linear solidification device 62 slidably engages linear slides 108a and 108b (not shown) which extend along the x-axis and are spaced apart from one another along the y-axis. The linear solidification device 62 is connected to linear bearings (not shown) that are spaced apart from one another along the y-axis, each of which engages a respective one of the linear slides 108a and 108b (not shown). Linear solidification device motor 98 is connected to a rotating shaft 100 with a length along the y-axis. Pulleys 102a and 102b (not shown) are spaced apart from the motor shaft 100 along the x-axis and from one another along the y-axis. The Respective timing belts 101a and 101b (not shown) are spaced apart from one another along the y-axis and engage the motor shaft 100 on one end and one of the two pulleys 102a and 102b on the other end. The pulleys 102a and 102b and timing belts are located in housings 115a and 115b, respectively.

The linear solidification device 62 is connected to each timing belt 101a and 101b. Thus, operation of motor 98 causes the shaft 100 to rotate about its longitudinal axis, which in turn causes the timing belts 101a and 101b to circulate. The circulation of the timing belts 101a and 101b traverses the linear solidification device 62 along the x-axis with its attached linear bearings slidably engaging the linear slides 108a and 108b (not shown). Suitable configurations of a linear solidification device motor, pulleys, timing belts, and linear slides are provided in FIGS. 3-4 and 7-8 of Applicant's co-pending U.S. patent application Ser. No. 13/534,638 and the corresponding text at paragraphs 84-85 and 124-125, the contents of which are hereby incorporated by reference.

As mentioned previously, load frame 120 includes first and second side walls 104a and 104b which are spaced apart along the y-axis. Load frame 120 also includes third and fourth side walls 95c and 95d which are spaced apart along the x-axis. Hinges 74a and 74b are attached to side 95d of the load frame 120, as shown in FIG. 4D. Load frame 120 also includes a latch 114 (not shown in FIGS. 5A-5C) that is used to releasably secure the load frame 120 to the distal end 70 of the tilting actuator shaft 68. Latch 114 includes a knob 116 attached to a sliding latch shaft 122. A user can grip the knob 116 and slide it within y-axis groove 126 to slide the latch shaft 122 along the y-axis direction. A first end of the shaft 122 can be selectively inserted into and retracted from an opening 124 in the distal end 70 of the tilting actuator shaft 68. The engagement of the latch shaft 122 and the actuator shaft distal end opening 124 connects the load frame 120 to the actuator shaft 68. Once the latch shaft 122 is engaged in the opening 124, a user can rotate the knob 116 in the x-z plane within vertical groove 128. Vertical groove 128 is dimensioned to substantially prevent the latch shaft 122 from moving along the y-axis. Thus, the rotation of the knob 116 locks the load frame 120 and the actuator shaft 68 into engagement with one another, thereby operatively connecting the actuator 66 to the solidification substrate assembly 57 so that movement of the actuator shaft 68 causes the solidification substrate assembly 57 to tilt about the tilting axis defined by hinges 74a and 74b. As best seen in FIG. 4C, the engagement between the latch shaft 122 and the opening 124 in the distal end 70 of the actuator shaft 68 allows the distal shaft end 70 to rotate relative to the latch 114 as the solidification substrate assembly 57 is tilted. The rotation allows for rotation of the solidification substrate assembly 57 about hinges 74a and 74b such that the distal end 70 of the actuator shaft 68 will traverse a circular path (when viewed along the y-axis) during tilting operations.

Figure 4E:
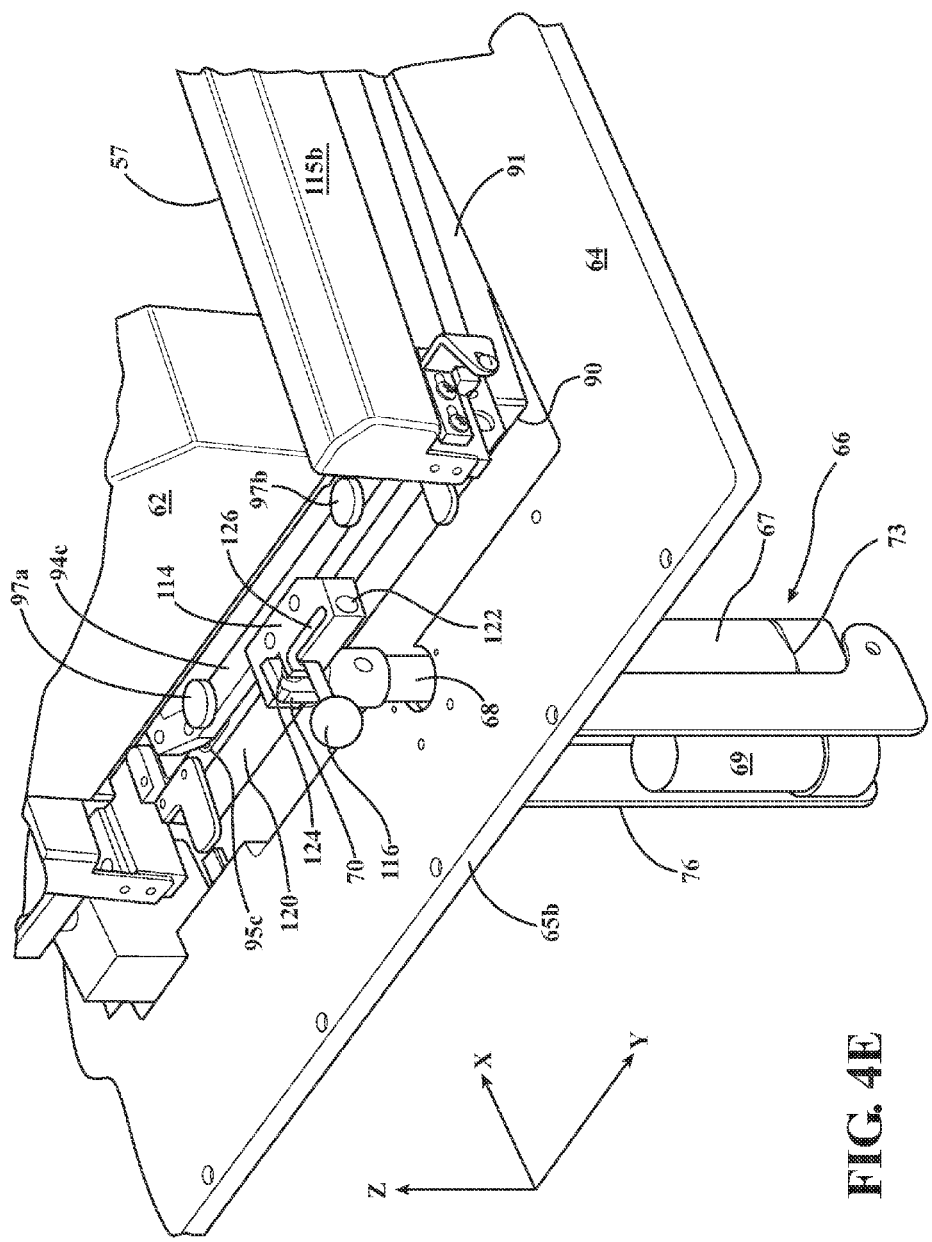
FIG. 4E is a detailed perspective view of the apparatus of FIG. 4B illustrating the connection between the distal end of the actuator and a load frame latch.

As discussed previously with respect to the example of FIGS. 1A-1E, in certain implementations a pressure (or force) sensor may be provided and used to determine when a squeezing operation is complete (i.e., to determine when the squeezing of solidifiable material between an exposed object surface and the film 60/substrate 58 is complete). In FIGS. 4A, 4B, and 4E, a pressure sensor 110 in the form of a load cell is attached to work table 64 on work table side 65b. A load bracket 112 is disposed on the load frame 120 and engages the load cell 110 when the solidification substrate assembly 57 is in a level configuration (FIG. 4A) and disengages from the load cell 110 when the solidification substrate assembly 57 is in a tilted configuration. An adjustment screw 113 is provided, and its length of extension from load bracket 112 can be adjusted to engage the load bracket 112 and the load cell 110. The length of extension of screw 113 from load bracket 112 can be adjusted to calibrate the orientation of the solidification substrate assembly 57 relative to the x-y plane when the solidification substrate assembly 57 is in the level or "home" position. In preferred examples, the length of extension of screw 113 from load bracket 112 is adjusted so that the rigid or semi-rigid solidification substrate 58 and/or film 60 are substantially or completely parallel to the x-y plane when the solidification substrate assembly is in the level (home) position.

Pressure (or force) sensor 110 is configured to operate in the same manner described previously with respect to pressure (or force) sensor 86 of FIG. 2. In examples wherein pressure (or force) sensor 110 is provided, it is preferably connected to controller 184 so that the pressure (or force) sensor 110 signal can be used by computer executable instructions executed by processor 188 to determine when a leveling operation is complete and an object solidification operation for a new layer of solidifiable material can begin.

The actuator 66 depicted in FIGS. 4A-4E is an electromechanical linear actuator that includes a motor 69 connected to shaft 68. Controller 184 is preferably connected to motor 69 or to a source of current supplied to motor 69 to operatively connect the controller 184 and the actuator 66. In certain examples, during peeling and/or leveling operations, the controller 184 generates an actuator activation signal having a value that corresponds to a desired tilting parameter. For example, in one implementation, the controller 184 is connected to a source of variable current which is used to energize motor 69, and the current can be modulated to obtain a desired peeling and/or leveling velocity. As with the example of FIGS. 1A-1E, one or more limit switches may be provided to generate a signal when the actuator shaft distal end 70 has reached a fully extended and/or fully retracted position. The limit switch signal(s) may then be used by the computer executable instructions resident in the controller memory 186 to carry out subsequent operations. In one example, the computer executable instructions cause controller 184 to begin transmitting a build platform activation signal to a build platform motor (not shown) to move the build platform 46 down by one layer thickness Δz along the build (z) axis once the limit switch generates a signal indicating that the actuator shaft 68 is fully extended (or at some specified time after the limit switch generates the signal). In another example or at the same time, the computer executable instructions cause the controller 184 to generate an actuator activation signal that tilts the rigid or semi-rigid solidification substrate 58 and film 60 about the tilting axis and toward the build platform 46 when the limit switch generates a signal indicating that the actuator shaft 68 is fully extended (or at some specified time after the limit switch generates the signal). In certain exemplary implementations, the actuator 66 applies a constant force against the solidification substrate assembly 57 during an object peeling operation. In other exemplary implementations, the actuator 66 applies a constant force against the solidification substrate assembly 57 during a leveling operation. In further exemplary implementations, the actuator 66 applies a constant force against the solidification substrate assembly 57 during both an object peeling operation and a leveling operation (albeit in opposite directions). In a preferred method, the same constant force is applied to the solidification substrate assembly 57 during an object peeling and a leveling operation (in opposite directions) and the constant force (in the negative build (z) axis direction) used in the leveling operation remains after the solidification substrate assembly 57 is level, which stabilizes the assembly 57 against the upward pressure of the solidifiable material. In one example, a constant force of 80 psi is applied to the solidification substrate assembly 57 during both an object peeling and a leveling operation.

In general, during leveling operations it is preferable to use a leveling wait time that ensures the squeezing of solidifiable material between the exposed object surface 82 and the solidification substrate assembly 57 is substantially or entirely complete before beginning a solidification operation. However, in some cases, when the solidification substrate assembly 57 is in the level configuration (FIG. 1E) and solidification of the next layer of solidifiable material has not yet begun, it may be desirable to operate the actuator 66 to apply a force that opposes the force of the solidifiable material 50 against the solidification substrate assembly. This force may be referred to as the "level configuration force". Applying a level configuration force to the solidification substrate assembly 57 better ensures that if there are any fluid disturbances or other hydrodynamic phenomena, they do not move the solidification substrate assembly 57. In the case of actuator 66 in FIGS. 1A-E and 4A-4E, the opposing actuator force is applied in the downward build (z) axis direction to oppose the force applied by the solidifiable material 50 in the upward build (z) axis direction (see FIG. 2). For actuator 66, the opposing force is applied by applying a downward build (z) axis force to actuator shaft 68 because it is connected to the load frame 56 of solidification substrate assembly 57.

When actuator 66 is an electromechanical actuator, repeatedly applying an opposing level configuration force to the solidification substrate assembly 57 can shorten the life of the motor 69 used to operate the actuator 66. Thus, in certain examples, the motor 69 is operated in a modified mode when the solidification substrate assembly 57 is in a level configuration and solidification of the next layer of solidifiable material 50 has not yet begun. In one example, during at least a portion of the time in which the solidification substrate assembly 57 is in a level configuration and solidification of the next object layer has not yet begun, the motor 69 is operated at less than 100 percent of the load applied during a leveling operation so that the level configuration force is correspondingly reduced relative to the force applied as the solidification substrate assembly 57 is being tilted during a leveling operation (the "leveling operation force") prior to reaching a level configuration. In certain examples, the level configuration force is no more than about 90 percent, preferably no more than about 80 percent, and still more preferably no more than about 70 percent of the leveling operation force, and the motor 69 electrical load is correspondingly no more than about 90 percent, preferably no more than about 80 percent, and still more preferably no more than about 70 percent of the electrical load during a leveling operation. When a solidification operation begins by traversing the linear solidification device along the travel (x) axis and supplying solidification energy to the solidifiable material along the scanning (y) axis, the electrical load applied to motor 69 is restored to 100 percent of the load applied during a leveling operation and remains there until solidification of the current layer is complete.

In another example, when the solidification substrate assembly 57 is in a level configuration and a solidification operation has not yet begun, the motor 69 electrical load is pulsed with alternating pulses of different magnitudes. In one implementation, the alternating pulses include 100 percent of the load used during a leveling operation and a value less than that load, which is preferably not more than about 70 percent, more preferably not more than about 60 percent, and still more preferably not more than about 50 percent of the load used during a leveling operation. When a solidification operation begins by traversing the linear solidification device along the travel (x) axis and supplying solidification energy to the solidifiable material along the scanning (y) axis, the electrical load applied to motor 69 is restored to 100 percent of the load applied during a leveling operation and remains there until solidification of the current layer is complete.

Referring to FIGS. 14A and 14B, examples of methods of operating the motor 69 to apply a leveling operation force and a level configuration force are depicted. In each of the figures the letter "A" refers to a leveling operation during which the solidification substrate assembly 57 is tilted toward the level configuration. In FIGS. 1A-1E, the actuator 66 retracts from an extended position to a retracted position during the leveling operation, and thus applies a downward force along the build (z) axis to the solidification substrate assembly 57. The letter "B" refers to a level solidification substrate assembly 57 configuration in which a level configuration force is applied by the actuator 66 to the solidification substrate assembly 57 but during which solidification of the solidifiable material 50 is not taking place. The letter "C" refers to a level solidification substrate assembly 57 configuration during which solidification has begun. Thus, in phase C the linear solidification device 62 travels along the travel (x) axis while selectively supplying solidification energy along the scanning (y) axis in a pattern that corresponds to a portion of the three-dimensional object being built.

In FIG. 14A, during phase B the motor 69 electrical load drops to a value that is less than 100 percent of the electrical load during phases A and C. However, the load remains substantially constant or constant during the entirety of phase B. In FIG. 14B, during phase B the motor 69 electrical load is pulsed in alternating pulses of 100% and 50% of the loads during phases A and C. In the methods illustrated by FIGS. 14A and 14B, during phase B there is at least some period of time during which the motor 69 load and the level configuration force are less than the motor 69 load and the force during a leveling operation (phase A) and a solidification operation (phase C). The motor 69 load and force during phase B may be constant, variable, pulsed, or irregular. However, at some point during phase B the motor 69 load and actuator 66 force are less than during phases A and C.

Figure 6:
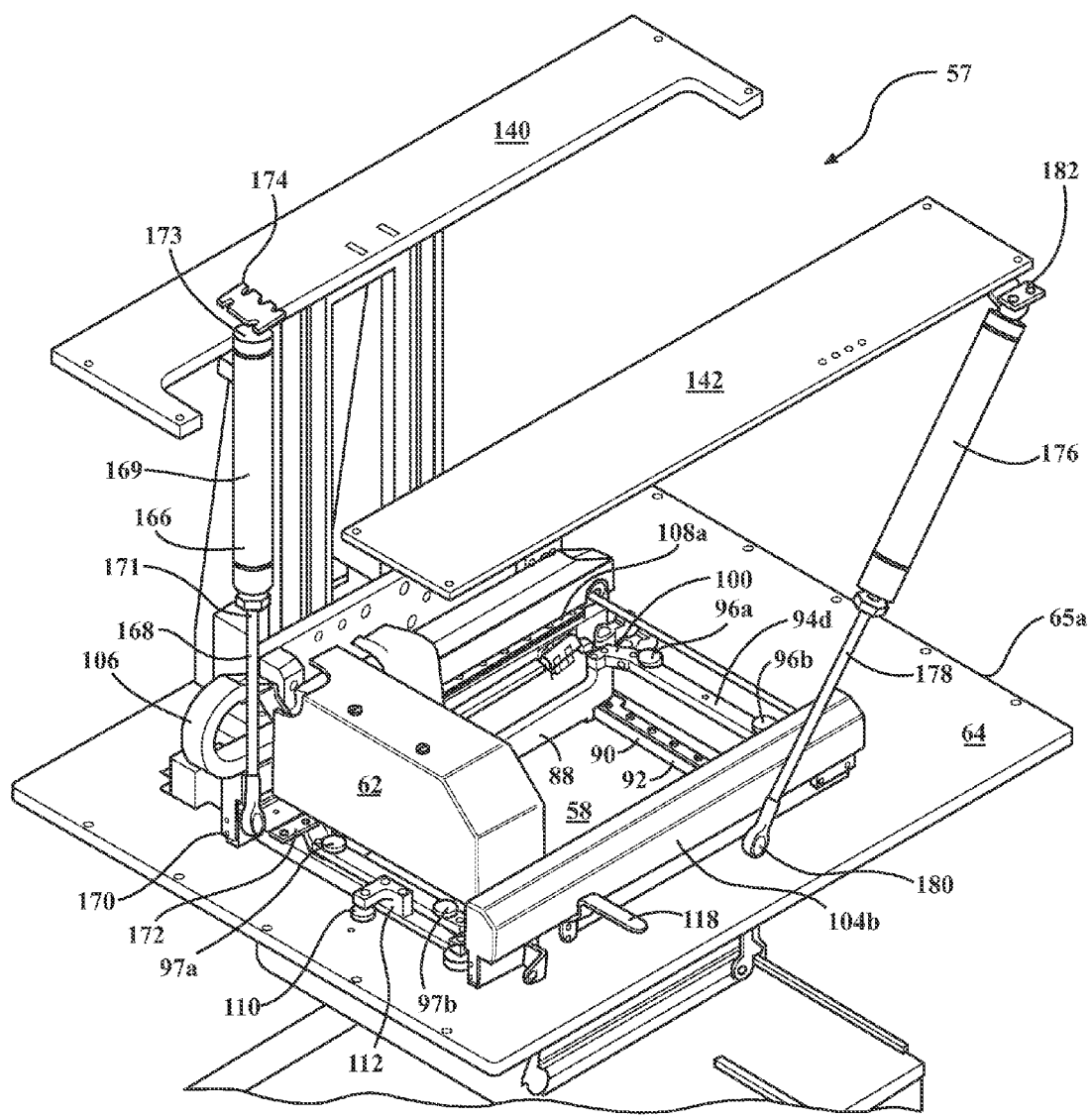
FIG. 6 is a detailed perspective view of an exemplary solidification substrate assembly and work table used in an apparatus for making a three-dimensional object from a solidifiable material with the solidification substrate assembly in a level configuration.

Referring to FIG. 6, another exemplary solidification substrate assembly 57 and work table 64 apparatus for forming a three-dimensional object from a solidifiable material is depicted. The apparatus is similar to that of FIGS. 4A-4E in several respects and like numerals refer to like parts. However, in the apparatus of FIG. 6 the actuator is a pneumatic actuator 166 that is attached in the opposite vertical (build axis) orientation of actuator 66. Pneumatic actuator 166 comprises a hydraulic fluid cylinder 169 and a shaft 168. Cylinder 169 includes a proximal end 173 of the pneumatic actuator 166, and shaft 168 includes a distal end 170 which is the distal end of the actuator 166. Thus, actuator 166 has a length defined by a distance along the shaft 168 length axis between the cylinder proximal end 173 and the shaft distal end 170. The length axis of actuator shaft 168 is generally parallel to the build (z) axis and is substantially parallel to the build (z) axis when the solidification substrate assembly 57 is in a level configuration shown in FIG. 6. However, the actuator shaft 168 length axis will tilt during a solidification substrate assembly tilt operation because the solidification substrate assembly 57 traverses a circular path when viewed along the y-axis during a tilting operation. The actuator shaft 168 will exhibit its maximum degree of tilt relative to the build (z) axis when the shaft distal end 170 reaches its fully retracted position. The actuator length is adjustable from a retractable configuration to an extended configuration and vice-versa. When the actuator 166 is in the extended configuration, the actuator distal end 170 is spaced apart (along the shaft 168 length axis and the build (z) axis) from the cylinder proximal end 173 by a distance that is greater than the distance by which the actuator distal end 170 is spaced apart (along the shaft 168 length axis and the build (z) axis) from the cylinder proximal end 173 when the actuator 166 is in the retracted configuration. When actuator 166 is in the extended configuration, the actual distal end 170 is spaced apart along the build (z) axis from the build platform (not shown in FIG. 6, but shown in FIGS. 1A-1E) by a distance that is shorter than when the actuator 166 is in the retracted configuration.

The shaft 168 is partially and selectively retractable into and extendable from the interior of hydraulic fluid cylinder 169. Distal end 170 of shaft 168 is connected to an upper surface of load frame 120 via bracket 172. Proximal end 173 of the cylinder 169 is attached to a stationary mounting platform 140 via bracket 174. The stationary mounting platform 140 is connected to a housing (not shown). The connection between the distal end 170 of the shaft and the bracket 172 allows the distal end 170 to rotate in the x-z plane relative to the bracket 172 to facilitate tilting about the tilting axis defined by the hinges 74a and 74b (not visible in FIG. 6). As a result, distal shaft end 170 will traverse a circular path when viewed along the y-axis during solidification substrate assembly 57 tilting operations.

The position of the proximal end 173 of actuator 166 remains fixed with respect to stationary mounting platform 140. However, the distal end 170 of actuator shaft 168 is movable relative to the stationary mounting platform 140 and relative to build platform 46 (not shown). Thus, extending the actuator 166 from the retracted configuration to the extended configuration causes the solidification substrate assembly 57 (including the solidification substrate frame 88, solidification substrate 58, film assembly 90, and linear solidification device 62) to tilt about the tilting axis defined by hinges 74a and 74b (not visible in FIG. 6) in a direction toward the build platform (not shown but would be positioned underneath the film assembly 90 along the build (z) axis) and away from stationary mounting platform 140 until load frame bracket 112a reaches abutting engagement with load cell 110. Solidifiable material located between the film 60 of film assembly 90 and the build platform (not shown) would exert an upward force (and pressure) along the build (z) axis that will diminish as solidifiable material is squeezed out of the space between the exposed object surface 82 (FIGS. 1A-1E) and object contacting surface 61 of film 60. As explained below, the signal generated by pressure (or force) sensor 110 can be used by controller 184 to determine when to supply solidification energy from the linear solidification device 62 to the solidifiable material. In one example, the pressure (or force) sensor 110 provides a pressure signal to the controller 184 via inputs 192 and once the pressure signal reaches a predetermined value (or within a fixed or variable time thereafter), solidification may begin. In another example, the controller 184 may determine the rate of change of the pressure signal (dP/dt), and solidification may begin once the rate of change of the pressure signal reaches a predetermined value (or within a fixed or variable time thereafter).

Hydraulic fluid cylinder 169 comprises an interior volume of hydraulic fluid that engages a piston (not shown) on one end of shaft 168 that is contained in the interior of the cylinder 169. As hydraulic fluid is supplied to the cylinder 169, the piston is displaced along the length of the cylinder 169 in the negative build (z) axis direction, causing the distal end 170 of the shaft 168 to extend in the negative build (z) axis direction. Conversely, as hydraulic fluid is withdrawn from cylinder 169, the piston moves in the positive build (z) axis direction, causing the distal end 170 of the shaft 168 to retract in the positive build (z) axis direction. Thus, in the apparatus of FIG. 6, when the distal end 170 of the actuator shaft 168 is in its fully extended position along the build (z) axis, the solidification substrate assembly 57 is in a level configuration, with the rigid or semi-rigid solidification substrate 58 and film 60 substantially parallel to the upward facing surface 48 of the build platform 46 (FIGS. 1A-1E). During an object peeling operation, hydraulic fluid is withdrawn from the cylinder 169, causing the distal end 170 of the actuator shaft 168 to retract from an extended position to a refracted position. A vertical stop 171 comprising an annular ring is tightly engaged with the shaft 168 and limits the retraction of the shaft 168 within the interior of hydraulic fluid cylinder 169. The engagement of the piston (not shown) with the distal interior wall (not shown) of the cylinder 169 limits the extension of the shaft 168. A source of hydraulic fluid is also provided but is not shown in FIG. 6. Controller 184 (FIG. 3) is operatively connected to the source of hydraulic fluid to selectively supply and withdraw hydraulic fluid from the cylinder 169. In certain examples, controller 184 is operatively connected to a hydraulic fluid pump and generates an actuator activation signal having a value that corresponds to the flow rate of hydraulic fluid into the cylinder, which in turn corresponds to the speed of movement of the actuator shaft 168. When the shaft 168 is refracting into the cylinder 169, the speed of movement of the actuator shaft 168 is the peeling velocity. When the shaft 168 is extending from the cylinder 169, the speed of movement of the actuator shaft 168 is the leveling velocity.

In certain exemplary implementations, the actuator 166 applies a constant force against the solidification substrate assembly 57 during an object peeling operation. In other exemplary implementations, the actuator 166 applies a constant force against the solidification substrate assembly 57 during a leveling operation. In further exemplary implementations, the actuator 166 applies a constant force against the solidification substrate assembly 57 during both an object peeling operation and a leveling operation (albeit in opposite directions). In a preferred method, the same constant force is applied during an object peeling and a leveling operation, and the constant force (in the negative build (z) axis direction) applied during the leveling operation remains after the solidification substrate assembly 57 is level (the level configuration force), which stabilizes the assembly against the upward pressure of the solidifiable material 50.

In the illustrated example of FIG. 6, the level configuration force is applied by extending the actuator 166 from a retracted configuration to an extended configuration, which applies a downward build (z) axis force to solidification substrate assembly 57 to oppose the upward build (z) axis force of the solidifiable material (FIG. 2). For actuator 166 the opposing downward build (z) force is applied by applying a downward build (z) axis force to actuator shaft 168 because it is connected to the load frame 56 of the solidification substrate assembly 57.

Actuator 166 is hydraulic but could also be motor-driven. If a motor-driven actuator 166 were used, level configuration forces may be applied as described previously with respect to the apparatuses of FIGS. 1A-1E and 4A-4E and as further illustrated in FIGS. 14A-B.

In the apparatus of FIG. 6, a second hydraulic actuator 176 is provided. The second hydraulic actuator 176 is used to tilt the entire solidification substrate assembly 57 out of the central opening in the work table 64 and into a substantially upright condition. The second hydraulic actuator 176 is not used for peeling or leveling operations. A proximal end of the second hydraulic actuator 176 is connected to a second stationary mounting platform 142 via bracket 182. A distal end of the second hydraulic actuator shaft 178 is connected to the load frame 120 via bracket 180.

Figure 7:
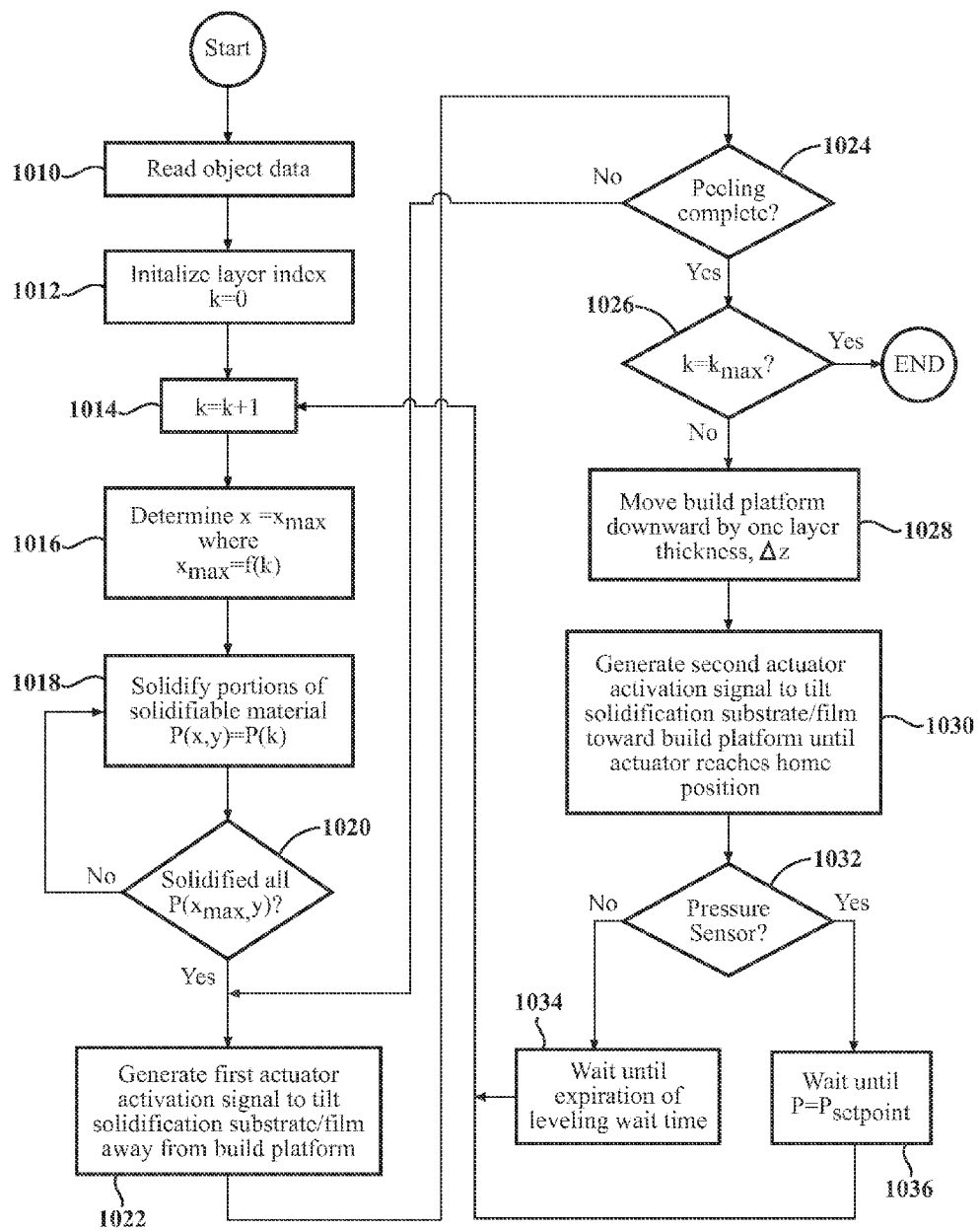
FIG. 7 is a flow chart depicting a first method of making a three-dimensional object using an apparatus with a tiltable solidification substrate assembly.

Referring to FIG. 7, a first method of making a three-dimensional object using a tilting solidification substrate assembly will now be described. Apparatuses useful for carrying out the method include, but are not limited to, the apparatuses of FIGS. 1A-6, 10-13, and 16A-16F.

The steps described in FIG. 7 may be embodied as a set of computer executable instructions stored in memory 186 of controller 184. In step 1010, object data which is representative of the three-dimensional object is read. The object data may be provided for the entire object at once or just for one or more layers of the object. A layer index k is initialized in step 1012 and incremented by one in step 1014. Based on the object data for the current layer, a determination is made as to the farthest x-axis coordinate for the layer in step 1016. The term "farthest" indicates that the location is the farthest from the actuator 66, 166 and closest to the hinges 74a and 74b in a direction along the x-axis. The coordinate $x_{max}$ will correspond to the last x-axis position of the linear solidification device 62 at which solidification will occur for a given layer. For example, in the apparatuses of FIGS. 1-6, the linear solidification device 62 will travel in two directions along the x-axis. However, object solidification operations will only be carried out while the linear solidification device 62 travels in one of the x-axis two directions. When viewing the apparatus of FIGS. 1A-1E along the y-axis and in the depicted orientation, solidification operations are carried out when the linear solidification device 62 travels away from actuator 66 and towards the tilting axis defined by the hinges 74a and 74b. The linear solidification device 62 also travels back in the opposite direction along the x-axis, but no object solidification operations are carried out. Similarly, in the apparatuses of FIGS. 4A-6, object solidification operations are performed when the linear solidification device 62 travels along the x-axis in a direction away from the actuator 66, 166 and toward the hinges 74a and 74b. However, solidification operations are not carried out when the linear solidification device 62 moves along the x-axis in a direction toward the actuator 66, 166 and away from the hinges 74a and 74b. In apparatuses that use spatial light modulation techniques such as digital light projectors, all locations on the exposed solidifiable material surface 51 which are to be solidified will be solidified simultaneously. Thus, $x_{max}$ in FIGS. 1A-6 will be the x-axis location closest to the hinges 74a and 74b and farthest from the actuator 66, 166 but because a spatial light modulation technique is used, there will be no moving solidification energy source having a position along the x-axis that defines $x_{max}$. If a two-dimensional laser drawing technique is used, the galvanometer mirrors will move in a pattern that defines the exposure pattern on the solidifiable material. For each layer, the pattern will have a value of $x_{max}$.

In step 1018 the exposed surface 51 (FIGS. 1A-1E) of the solidifiable material 50 is exposed to solidification energy. In the case of a spatial light modulated system, the exposed surface 51 will receive one or more two-dimensional energy patterns projected in the x-y plane as static images. In the case of a linear solidification device 62, the device 62 will travel along the x-axis and supply linear patterns of solidification energy with lengths along the y-axis in step 1018. The expression P(x,y) in step 1018 refers to the set of all x, y coordinates at which solidification occurs. Since those x, y values will vary with the layer, step 1018 indicates that P(x, y) is a function of the layer, i.e., P(k).

In step 1020 a determination is made as to whether each y-axis location at the farthest x-axis location $x_{max}$ has been solidified. In the case of spatial light modulated systems, this step will be unnecessary because each y-axis location at a given x-axis location will simultaneously receive solidification energy from the solidification energy source. However, in the case of linear solidification devices 62 that use linear scanning devices, solidification energy will be progressively supplied along the y-axis at a given x-axis location. Thus, the layer solidification will not be complete until each y-axis location where solidification will occur at the farthest x-axis location $x_{max}$ has been solidified. If all such y-axis locations have not been solidified, control returns to step 1018 and solidification along the y-axis continues. Otherwise, solidification of the layer is complete and control transfers to step 1022.

Referring to FIG. 3, if controller 184 is provided, in step 1018 the controller 184 will provide a signal to operate the linear solidification device motor 98 to move linear solidification device 62 along the x-axis. As the linear solidification device 62 moves along the x-axis, the controller 184 will also provide appropriate signals to the solidification energy source 204 (e.g., a laser diode, such as laser diode 90 shown and described in FIGS. 3, 4, and 5A-5D of Applicant's co-pending U.S. patent application Ser. No. 13/534,638, filed on Jun. 27, 2012 and the corresponding text, including at paragraphs 60-79 and 86-104) and a linear scanning device (e.g., motor that rotates a polygonal mirror, such as motor 118 which rotates polygonal mirror 92 in U.S. patent application Ser. No. 13/534,638) to carry out a layer solidification operation. Even with linear solidification device 62, step 1020 will not be necessary if peeling is deferred until the linear solidification device 62 completes its traversal of the entire build envelope (the x-y area of the resin that is subject to solidification) in the x-axis direction. However, step 1020 beneficially makes use of the dynamic assessment of object layer data to initiate peeling operations as soon as possible, which further reduces overall object build times.

In step 1022 at least one controller (e.g., controller 184 of FIG. 3) generates a first actuator activation signal to carry out a peeling operation by tilting the solidification substrate assembly 57 away from the build platform 46. In the case of actuator 66, the first actuator activation signal will cause the shaft 68 to extend from a fully retracted configuration to a fully extended configuration (unless variable actuator peeling distances are used, in which case the actuator shaft 68 would not necessarily extend to a fully extended position). In the case of actuator 166, the first actuator activation signal will cause the shaft 168 to retract from a fully extended configuration to a retracted configuration. In certain preferred implementations, step 1022 begins about one (1) second after the completion of a layer solidification operation in step 1018. In certain exemplary implementations, step 1022 is carried out using a peeling velocity of at least about 0.1, preferably at least about 0.2, and more preferably at least about 0.3 mm/seconds. At the same time, the peeling velocity is no more than about one (1) mm/second, more preferably no more than about 0.8 mm/second and still more preferably no more than about 0.7 mm/second. In one exemplary implementation, a peeling velocity of 0.5 mm/seconds is used. As mentioned previously, the peeling velocity refers to the linear speed of travel of the distal end 70, 170 of the actuator shaft 68, 168 during a peeling operation.

A determination is made in step 1024 as to whether peeling is complete. If it is, control transfers to step 1026. Otherwise, control returns to step 1024 and peeling continues. In certain implementations, a constant actuator peeling distance Δa is used and a limit switch is provided to determine when the actuator shaft 68, 168 has reached the actuator peeling distance Δa. In other implementations, however, a variable actuator peeling distance Δg (FIG. 1C) may be calculated from object data and a desired minimum object peeling travel distance. In such cases, other techniques may be used to determine whether the calculated actuator peeling distance has been reached. In the case of hydraulic actuators, the total amount of hydraulic fluid that is supplied to or withdrawn from the cylinder 169 may be used indicate the distance of travel of the distal shaft end 70, 170. In the case of electromechanical actuators, motor parameters such as activation time or both activation time and current may be used to indicate the distance of travel of distal shaft end 70, 170.

In step 1026 the method determines if the final layer has been solidified, as indicated by the value of the current layer index k relative to the index of the last object layer $k_{max}$. If the last layer has been reached, the method ends. Otherwise, control transfers to step 1028 to begin the process of providing a new layer of solidifiable material.

In step 1028 the build platform 46 (FIGS. 1A-1E) is moved downward in the negative build (z) axis direction by one layer thickness Δz. In certain exemplary implementations herein, the layer thickness Δz is preferably no more than about 250 microns, still more preferably no more than about 200 microns, more preferably no more than about 150 microns, even more preferably no more than about 100 microns, and yet more preferably no more than about 60 microns. At the same time, the layer thickness Δz is preferably no less than about 10 microns, still more preferably no less than about 20 microns, even more preferably no less than about 30 microns, and yet more preferably no more than about 40 microns. In one example, a layer thickness Δz of about 50 microns is used. Step 1028 may be carried out during all or part of steps 1022-1026. However, in preferred examples, step 1028 is carried out after step 1024 indicates that peeling is complete. In many known processes, the build platform 46 must be moved downward by greater than the desired layer thickness to separate the exposed object surface 82 from the film 60. However, the method of FIG. 7 avoids the need for manipulating the build platform 46 to effect peeling. In the known processes, the position of the build platform 46 when solidifying the last object layer is necessarily limited by the requirement to drop the platform 46 by an amount greater than the desired layer thickness. As a result, solidifiable material is trapped in the container 44 at a height equal to the distance beneath the layer thickness which the platform 46 must be dropped to effect object separation from the film 60. This trapped solidifiable material cannot be used to form the object 78. Among other advantages, the method of FIG. 7 eliminates this trapping and maximizes the amount of solidifiable material available for forming three-dimensional object 78.

In certain implementations, controller 184 receives a signal from the build platform motor indicating when the platform 46 has stopped in its descent. In such implementations, the leveling operation of step 1030 is carried out either when the signal is received or within a fixed time thereafter. In such embodiments, the fixed time is preferably selected to ensure that the descent of the build platform for the next layer solidification operation is complete. In other implementations, the leveling operation is carried out within a fixed time after an object peeling operation is complete.

Following the completion of step 1028, a leveling operation is commenced. In step 1030 the controller (e.g., controller 184) will generate a second actuator activation signal to tilt the solidification substrate assembly toward the build platform until the actuator shaft 68, 168 reaches its "home" or "level" position. In the case of actuator 66, the controller's issuance of the second actuator activation signal will cause the distal end 70 of actuator shaft 68 to retract from a fully extended to a fully retracted position (unless variable actuator peeling distances Δa are used in which case the actuator shaft 68 would not necessarily start from a fully extended position). As described previously with respect to FIG. 1E, once the leveling object is complete, solidifiable material may continue to "squeeze out" of the space between the exposed object surface 82 and the film 60/rigid or semi-rigid solidification substrate 58. It is preferable to defer the beginning of another layer solidification operation until the squeezing operation is complete. In step 1032 a determination is made as to whether a pressure sensor is present for use in determining when squeezing is complete. Suitable pressure sensors include sensors 86 (FIGS. 1A-1E) and 110 (FIGS. 4A, 4B, 4E, and 6) described previously. If a pressure sensor is present, in step 1034 the method waits until the pressure (or rate of change of pressure, dP/dt) indicated by the sensor 86, 110 reaches a desired set point (step 1036). As explained previously, the set point may comprise a value selected based on the nature of the solidifiable material. Once the sensed pressure reaches the set point in step 1036 (or once the change in pressure with respect to time dP/dt reaches a certain threshold), control transfers to step 1014 to increment the layer index and begin solidifying another layer.

In certain exemplary implementations, step 1028 is carried out using a leveling velocity of at least about 0.1, preferably at least about 0.2, and more preferably at least about 0.3 mm/seconds. At the same time, the leveling velocity is no more than about one (1) mm/second, more preferably no more than about 0.8 mm/second and still more preferably no more than about 0.7 mm/second. In one exemplary implementation, a leveling velocity of 0.5 mm/seconds is used. As mentioned previously, in the apparatuses of FIGS. 1A-1E, 4A-4E, 6, and 16A-16F) the leveling velocity is the linear speed of travel of the distal end 70, 170 of the actuator shaft 68, 168 during a leveling (squeezing) operation. In certain examples, multiple leveling velocities may be used. In one implementation, higher leveling velocities are used at the beginning of leveling, and lower leveling velocities are used toward the end of leveling. The higher velocities are used while the solidification substrate frame 88, load frame 120, and film assembly 90 tilt toward the build platform 46 before appreciable material squeezing beings and lower velocities are used after squeezing begins. The beginning of appreciable squeezing may be determined using pressure sensor 110, when the solidification substrate assembly 57 reaches a particular tilt angle relative to work table 64, or after a particular initial leveling period has expired.

If no pressure sensor is present in step 1032 (see the apparatus of FIG. 4E), the method waits until a leveling wait time expires (step 1034). Once the leveling wait time expires, control transfers to step 1014 to increment the layer index k and begin the solidification of another layer. The leveling wait time and the pressure sensor setpoint (or dP/dt setpoint) may comprise tilting parameters stored in the tilting parameter database 196 (FIG. 3). In certain implementations, the controller 184 receives data indicating the identity of a solidifiable material selected by a user and uses the identified solidifiable material to query the tilting parameter database 196 and retrieve a set of tilting parameters corresponding to the identified solidifiable material. Illustrative examples of database records in the tilting parameter database 196 will be described further below with reference to FIG. 9. Leveling wait times of no more than about five (5), preferably no more than about three (3), and still more preferably not more than about two (2) seconds are preferred. At the same time, leveling wait times of at least about 0.25, preferably at least about 0.5, and more preferably at least about 0.8 seconds are preferred. In one implementation, a leveling wait time of about one (1) second is used.

In certain implementations of the method of FIG. 7, it has been found that during the first several layers of an object solidification operation, it may not be possible to obtain sufficient solidifiable material above the exposed object surface to develop a new layer of solidifiable material of the desired layer thickness. In such implementations, the deep dipping process described with respect to FIGS. 1A-1E is preferably implemented for the first several layers of the object. Thus, in accordance with this variation, step 1028 is modified during the formation of the first several layers of the object such that the build platform is dipped in the negative build (z) axis direction by an amount greater than the desired layer thickness $\Delta z$ and is subsequently elevated in the positive build (z) axis direction until the exposed object surface 82 is spaced apart from the exposed solidifiable material surface by the desired layer thickness $\Delta z$. In preferred implementations of this variation, the deep dipping step is carried out during the formation of at least layer 2, more preferably during layers 2-3, still more preferably during layers 2-4, even more preferably during layers 2-5, still more preferably during layers 2-6, yet more preferably during layers 2-7, even more preferably during layers 2-8, and still more preferably during layers 2-9, and yet more preferably during layers 2-10. The deep dipping process is preferably carried out for no more than the first 30 layers, even more preferably no more than the first 20 layers, and still more preferably no more than the first 15 layers. When this deep dipping variation is used, the depth of the deep dipping is preferably at least about 2×, more preferably at least about 10×, more preferably at least about 40×, still more preferably at least about 50×, and yet more preferably at least about 100× the desired layer thickness $\Delta z$. At the same time, the depth of the deep dipping is preferably no more than about 400×, still more preferably no more than about 350×, even more preferably no more than about 300×, and even more preferably no more than about 200× the desired layer thickness $\Delta z$. Thus, in one example using a desired layer thickness $\Delta z$ of 50 microns, the deep dipping depth ranges from 5-10 mm, which is 100-200 times the layer thickness. In preferred examples, when deep dipping is used, solidification of the next object layer is deferred (step 1034) until the leveling wait time expires after the solidification substrate assembly 57 is in the level configuration and the build platform 46 has been elevated so that the exposed object surface 82 is spaced apart from the solidification substrate assembly 57 by a distance along the build (z) axis equal to the desired layer thickness $\Delta z$.

In accordance with the deep dipping variation, there is preferably a waiting period between the completion of the deep dipping step and the elevation of the build platform 46 to a build (z) axis location at which the exposed object surface 82 (FIGS. 1B-1E) is spaced apart from the exposed solidifiable material surface 51 (FIG. 1D) by the desired layer thickness $\Delta z$. In preferred examples, the waiting period is preferably at least about one (1) second, more preferably at least about 1.5 seconds, and still more preferably at least about 2 seconds. At the same time, the waiting period is preferably no more than about 10 seconds, still more preferably no more than about 8 seconds, and even more preferably no more than about 5 seconds. The deep dipping variation can be performed with or without tilting the solidification substrate assembly or performing the leveling operation described above. However, if tilting is not used to perform an object peeling operation, the speed of descent of the build platform 46 in the negative build (z) axis direction must be reduced because object separation from the film 60 will occur during the descent and without tilting, the separation forces per unit area will generally be higher across the exposed object surface.

Figure 8A:
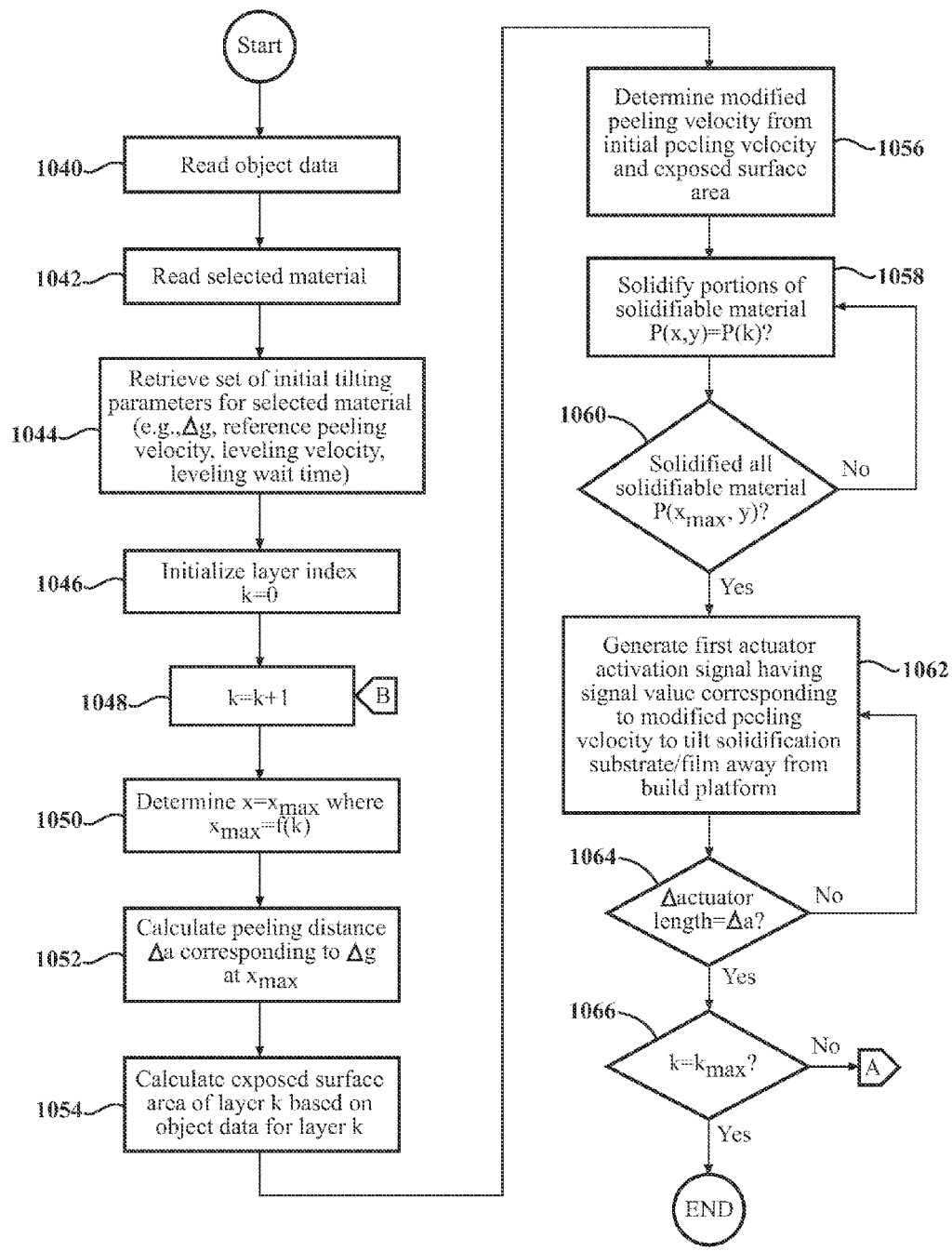
FIGS. 8A and 8B are a flow chart depicting a second method of making a three-dimensional object using an apparatus with a tiltable solidification substrate assembly.
Figure 8B:
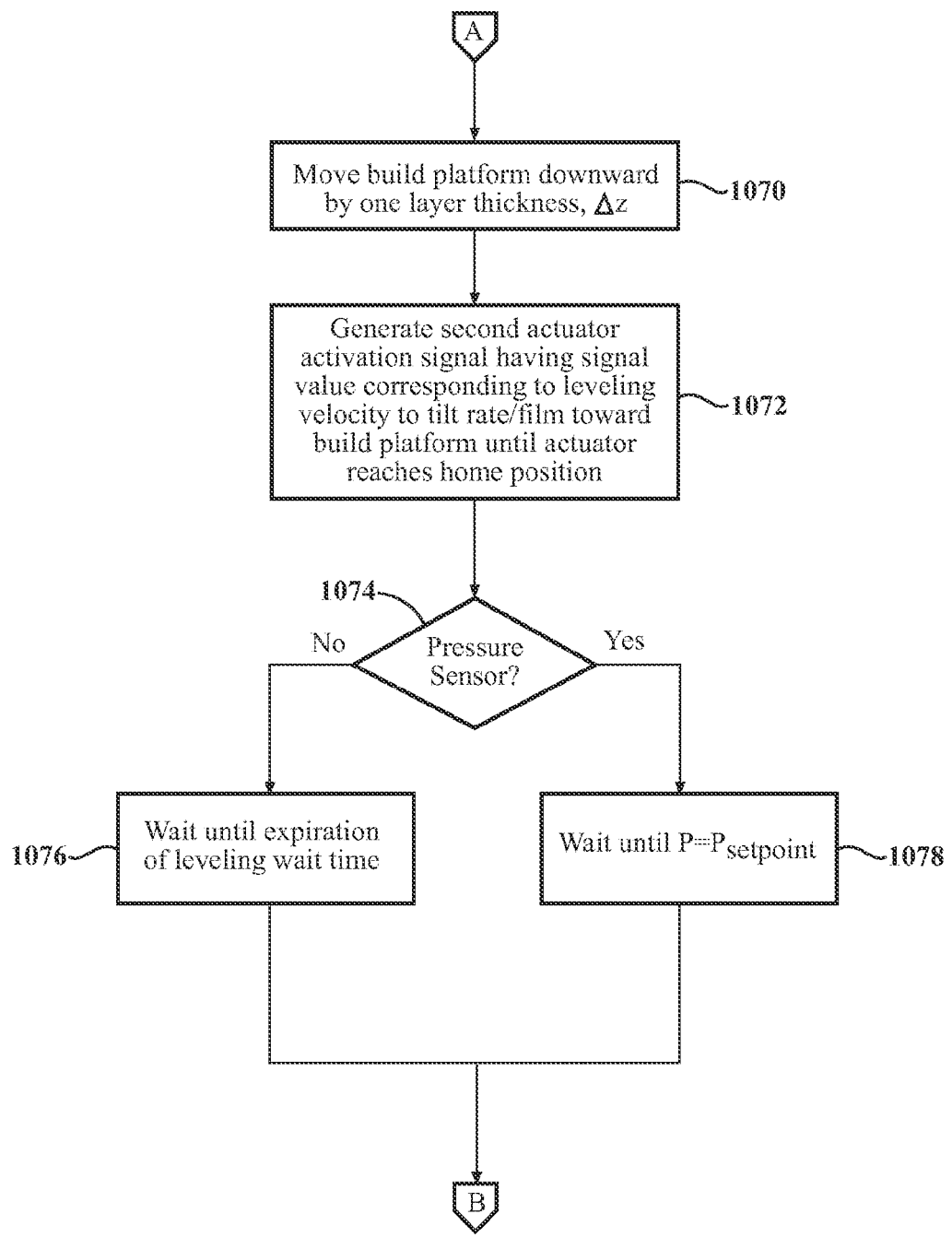

Referring to FIGS. 8A-8B, a second method of making a three-dimensional object using a tilting solidification substrate assembly 57 will now be described. Apparatuses useful for carrying out the method include but are not limited to the apparatuses of FIGS. 1A-6 and 10-13. As with the method of FIG. 7, the method of FIGS. 8A-8B may be carried out by a computer executable process steps stored in the non-transitory memory of the controller and executed by the controller's processor. Leveling wait times of no more than about five (5), preferably no more than about three (3), and still more preferably not more than about two (2) seconds are preferred. At the same time, leveling wait times of at least about 0.25, preferably at least about 0.5, and more preferably at least about 0.8 seconds are preferred. In one implementation, a leveling wait time of about one (1) second is used.

In step 1040, object data representative of the three-dimensional object is read. In step 1042 a user's selection of a solidifiable material identifier is read (e.g., "Envisiontec E-Denstone"). The material identifier is used as a database query key to retrieve a set of tilting parameters comprising one or more tilting parameters from a tilting parameter database such as the tilting parameter database 196 of FIG. 3. In step 1044, the set of tilting parameters corresponding to the selected solidified material is retrieved. The set of tilting parameters includes one or more of the following, alone or in combination: an actuator peeling distance Δa, a minimum object peeling travel distance Δg, a reference peeling velocity, a reference leveling velocity, a peeling velocity, a leveling velocity, a leveling wait time, and a leveling pressure sensor set point. In addition to or in lieu of the leveling pressure set point, a rate of pressure change (dP/dt) threshold may be provided as a tilting parameter.

To begin an object building operation, a layer index k is next initialized (step 1046) and then incremented by one (1) (step 1048). In step 1050, the object data is used to identify an x-axis location of solidification that is closest to the tilting axis (i.e., the hinges 74a and 74b in FIGS. 1A-1E, 4A-4E and 6) and farthest from the actuator 66, 166. The expression f(k) in step 1050 refers to the fact that the value of $x_{max}$ depends on the particular layer, and therefore, the value of the layer index k.

In the method of FIG. 8A, one or more tilting parameter values are calculated based on object data representative of the object. Step 1052 exemplifies such a technique. In this step, the value of the actuator peeling distance Δa is determined for the current layer by determining the peeling distance Δa that would cause the part of the film 60 in contact with the exposed object surface 82 at $x_{max}$ to travel by a linear distance of Δg. In general, points on the film 60 in contact with the exposed object surface 82 at $x_{max}$ will travel in a circular path during peeling operations. The starting location and ending location of the points will define linear vectors between the starting and ending locations, and the value of Δa is selected so that the lengths of these linear vectors are equal to Δg. This technique tunes the amount of peeling to the particular x-axis profile of each object layer, thereby minimizing the amount of peeling and reducing peeling times. In certain examples, equation (1) may be used to calculate Δa. In an alternative implementation of step 1052, the x-axis coordinate of the build platform location that is closest to the tilting axis and farthest from the actuator is used as $x_{max}$. In this implementation, the actuator peeling distance Δa is not adjusted based on the object data but may be adjusted based on the solidifiable material by providing values of Δg in a tilting parameter database that vary depending on the material used.

Step 1054 provides another example of calculating a tilting parameter based on object data. In step 1054 the area of the exposed object surface 82 is calculated from object data representative of the three-dimensional object using known techniques. It is believed that certain tilting parameters are beneficially adjusted based on the exposed surface area of a three-dimensional object. In step 1056 a modified peeling velocity is calculated from a reference (or initial) peeling velocity in the tilting parameter database 196. In one implementation, the reference peeling velocity is based on a reference exposed object surface area, and the modified peeling velocity is calculated by dividing the determined value of the exposed object surface area 82 for the current layer by the reference surface area and multiplying that ratio by the reference peeling velocity. A modified leveling velocity may also be calculated in this manner. However, in general, it is believed that adjusting the peeling velocity based on the exposed object surface area is more beneficial than adjusting the leveling velocity based on it.

In step 1058 the portions of the exposed solidifiable material surface that are to be solidified (P(x,y)) are solidified. The set of P(x,y) will vary with the particular layer, and therefore, with the value of the layer index k. If each y-axis position at $x_{max}$ has been solidified, the layer solidification operation is complete and control transfers to step 1062. Otherwise, control returns to step 1058 to continue solidification.

A peeling operation is commenced in step 1062. A controller such as controller 184 generates a first actuator activation signal having a signal value that corresponds to the modified peeling velocity. In one example, the first actuator activation signal is a variable current, the value of which causes the actuator 66 to extend the distal end 70 of the actuator shaft 68 at the modified peeling velocity. Using the apparatus of FIG. 6, hydraulic fluid is withdrawn from cylinder 169 at a rate that causes actuator 166 to retract the distal end 170 of actuator shaft 168 at the modified peeling velocity.

In step 1062 the solidification substrate assembly 57 tilts away from the build platform 46 as shown in FIGS. 1C and 1D. Because the actuator peeling distance Δa is variable in the method of FIGS. 8A and 8B, in step 1064 a determination is made as to whether the actuator distal end 70 has reached the modified actuator peeling distance Δa. If it has, control transfers to step 1066. Otherwise, step 1062 is continued until the modified actuator peeling distance Δa is reached. In certain preferred implementations, step 1062 begins no more than about one (1) second after the completion of a layer solidification operation in step 1058.

In certain exemplary implementations, step 1062 is carried out using a peeling velocity of at least about 0.1, preferably at least about 0.2, and more preferably at least about 0.3 mm/seconds. At the same time, the peeling velocity is no more than about one (1) mm/second, more preferably no more than about 0.8 mm/second and still more preferably no more than about 0.7 mm/second. In one exemplary implementation, a peeling velocity of 0.5 mm/seconds is used.

In step 1066 the layer index k is compared to the maximum layer index for the entire object $k_{max}$. If the maximum index $k_{max}$ has been reached, the object is complete and the method ends. Otherwise, control transfers to step 1070 to begin the process of forming a new layer of solidifiable material. In step 1070 the build platform 46 (FIGS. 1A-1E) is moved away from the rigid or semi-rigid solidification substrate 58 and the film 60 by one layer thickness Δz. As illustrated in FIG. 3, this step may be carried out by having controller 184 issue a signal to the build platform motor to cause it to operate and move the build platform downward by the desired amount. In certain variations of the method of FIGS. 8A and 8B, steps 1070 and 1062 are carried out concurrently. In preferred implementations, the time between the completion of peeling as determined in step 1064 and the commencement of leveling in step 1072 is no more than one (1) second.

The controller then generates a second actuator signal having a signal value that corresponds to the leveling velocity (or modified leveling velocity if one is calculated from the object data for the layer) (step 1072). Step 1072 causes the solidification substrate assembly 57 to tilt about the tilting axis toward the build platform 46 until reaching the "home" or "level" position. In certain implementations, controller 184 receives a signal from the build platform motor (not shown) indicating when the platform 46 has stopped in its descent. The leveling operation of step 1030 is carried out either when the signal is received or within a fixed time thereafter. Alternatively, leveling may begin after the expiration of a fixed time from the beginning of the build platform movement or after the expiration of a fixed time after the completion of peeling if the time is selected to ensure that build platform movement is complete before leveling begins. In certain exemplary implementations, step 1072 is carried out using a leveling velocity of at least about 0.1, preferably at least about 0.2, and more preferably at least about 0.3 mm/seconds. At the same time, the leveling velocity is no more than about one (1) mm/second, more preferably no more than about 0.8 mm/second and still more preferably no more than about 0.7 mm/second. In one exemplary implementation, a leveling velocity of 0.5 mm/seconds is used.

In step 1074 a determination is made as to whether a leveling pressure sensor such as sensors 86 and 110 is present. If one is present, control transfers to step 1078. In step 1078 the method compares the current pressure (or force) sensor reading to the setpoint to determine if the squeezing of solidifiable material is complete. Once the pressure reaches a reference set point, squeezing is considered to be complete and control transfers to step 1048 to begin another layer solidification operation. In another implementation, step 1074 may be carried out by determining the rate of change of the pressure (dP/dt) or force (dF/dt) and comparing it to a threshold value that indicates when squeezing of solidifiable material is complete.

If step 1074 indicates that no leveling pressure sensor is present, control transfers to step 1076. In step 1076 the next layer solidification operation is deferred until the expiration of the leveling wait time. Once the leveling wait time expires, control transfers to step 1048 to begin another layer solidification operation. Leveling wait times of no more than about five (5), preferably no more than about three (3), and still more preferably not more than about two (2) seconds are preferred. At the same time, leveling wait times of at least about 0.25, preferably at least about 0.5, and more preferably at least about 0.8 seconds are preferred. In one implementation, a leveling wait time of about one (1) second is used.

In certain implementations of the method of FIGS. 8A-8E, it has been found that during the first several layers of an object solidification operation, it may not be possible to obtain sufficient solidifiable material above the exposed object surface to develop a new layer of solidifiable material of the desired layer thickness. In such implementations, the deep dipping process described with respect to FIGS. 1A-1E is preferably implemented for the first several layers of the object. Thus, in accordance with this variation, step 1070 is modified during the formation of the first several layers of the object such that the build platform is dipped in the negative build (z) axis direction by an amount greater than the desired layer thickness $\Delta z$ and is subsequently elevated in the positive build (z) axis direction until the exposed object surface 82 is spaced apart from the exposed solidifiable material surface by the desired layer thickness $\Delta z$. In preferred implementations of this variation, the deep dipping step is carried out during the formation of at least layer 2, more preferably during layers 2-3, still more preferably during layers 2-4, even more preferably during layers 2-5, still more preferably during layers 2-6, yet more preferably during layers 2-7, even more preferably during layers 2-8, and still more preferably during layers 2-9, and yet more preferably during layers 2-10. The deep dipping process is preferably carried out for no more than the first 30 layers, even more preferably no more than the first 20 layers, and still more preferably no more than the first 15 layers. When this deep dipping variation is used, the depth of the deep dipping is preferably at least about 2×, more preferably at least about 10×, more preferably at least about 40×, still more preferably at least about 50×, and yet more preferably at least about 100× the desired layer thickness $\Delta z$. At the same time, the depth of the deep dipping is preferably no more than about 400×, still more preferably no more than about 350×, even more preferably no more than about 300×, and even more preferably no more than about 200× the desired layer thickness $\Delta z$. Thus, in one example using a desired layer thickness $\Delta z$ of 50 microns, the deep dipping depth ranges from 5-10 mm, which is 100-200 times the layer thickness. In preferred examples, when deep dipping is used, solidification of the next object layer is deferred (step 1076) until the leveling wait time expires after the solidification substrate assembly 57 is in the level configuration and the build platform 46 has been elevated so that the exposed object surface 82 is spaced apart from the solidification substrate assembly 57 by a distance along the build (z) axis equal to the desired layer thickness $\Delta z$.

In accordance with the deep dipping variation, there is preferably a waiting period between the completion of the deep dipping step and the elevation of the build platform 46 to a build (z) axis location at which the exposed object surface 82 (FIG. 1D) is spaced apart from the exposed solidifiable material surface 51 by the desired layer thickness $\Delta z$. In preferred examples, the waiting period is preferably at least about one (1) second, more preferably at least about 1.5 seconds, and still more preferably at least about 2 seconds. At the same time, the waiting period is preferably no more than about 10 seconds, still more preferably no more than about 8 seconds, and even more preferably no more than about 5 seconds. The deep dipping variation can be performed with or without tilting the solidification substrate assembly 57 or performing the leveling operation described above. However, if tilting is not used to perform an object peeling operation, the speed of descent of the build platform 46 in the negative build (z) axis direction must be reduced because object separation from the film 60 will occur during the descent and without tilting, the separation forces per unit area will generally be higher across the exposed object surface.

As discussed previously, in certain implementations of the apparatuses and methods described herein, one or more tilting parameters are provided in a tilting parameter database 196 (FIG. 3). The tilting parameter database 196 preferably associates a set of tilting parameters comprising at least one tilting parameter with one of several various solidifiable materials. A user may then select a material identifier on a computer user interface provided with the apparatus. Computer executable program instructions stored in the controller memory 186 then use the selected material to query the tilting parameter database 196. The query returns the set of tilting parameters associated with the selected material identifier which is then used to carry out tilting operations. FIG. 9 depicts three exemplary records of a tilting parameter database 196. In the depicted example, three solidifiable material identifiers are provided 214a-214c. Each record associates a minimum object peeling travel distance 216b (Δg), a peeling velocity 216c, a leveling velocity 216d, a leveling wait time 216e, and a reference squeezing pressure 216f with one of the solidifiable material identifiers 215a-215c. Thus, a user wishing to build an object with Envisiontec E-Denstone would make a corresponding entry into a user interface provided with the apparatus for making a three-dimensional object. The selected entry would be transmitted to the controller 184 and used by the computer executable process instructions to perform a database query and retrieve the tilting parameter values in the first row of the table (FIG. 9). In certain variations of the tilting parameter database 196, the peeling velocity is a reference peeling velocity based on a particular exposed object surface area and is used by the computer executable program instructions stored in the controller memory 186 to calculate a modified peeling velocity based on a determined exposed object surface area for the layer of interest. In another variation, a fixed actuator peeling distance Δa is used in lieu of one calculated from a minimum object peeling distance Δg.

The use of the tilting parameter database 196 allows tilting parameters to be adjusted based on the particular materials used to make a solidifiable object. This tuning of the tilting process to the solidifiable material avoids the need for setting fixed tilting parameters that should function for all potential solidifiable materials which can result in excessive object build times.

Referring to FIGS. 10-13, another exemplary solidification substrate assembly 57 and work table 64 are depicted for use in an apparatus for making at three-dimensional object such as apparatus 40 of FIGS. 1A-1E. Like numerals in FIGS. 10-13 refer to like components in FIGS. 1A-1E, 4A-4E, 5A-5C and 6. Unlike the other apparatuses, however, in the example of FIGS. 10-13 two actuators 266a and 266b are providing for tilting the solidification substrate assembly 57 about a tilt axis defined by hinges 74a and 74b (not shown in FIGS. 10-13, but shown in FIG. 4D on side 65a of work table 64.

Actuators 266a and 266b are spaced apart along the y-axis. Actuator 266a includes a housing 267a and a shaft 268a (not visible in the figures). Actuator housing 267a includes a proximal end 220a, and shaft 268a includes a distal end 270a. A portion of shaft 268a is disposed in actuator housing 267a and guide bushing 206a. Guide bushing 206a is fixedly attached to and stationary with respect to actuator housing 267a. However, the spacing between the guide bushing 206a and the distal end 270a of shaft 268a is adjustable when the actuator 266a is adjusted between an extended configuration and a refracted configuration (and vice-versa). Guide bushing 206a is provided to facilitate the adjustment of the actuator 266a from a retracted configuration to an extended configuration and reduces the amount of vibration occurring during the adjustment process. In the retracted configuration, the actuator length defined by the distance between the actuator housing proximal end 220a and the distal shaft end 270a is smaller than the distance between the actuator housing proximal end 220a and distal shaft end 270a when actuator 266a is in the extended configuration.

Figure 12A:
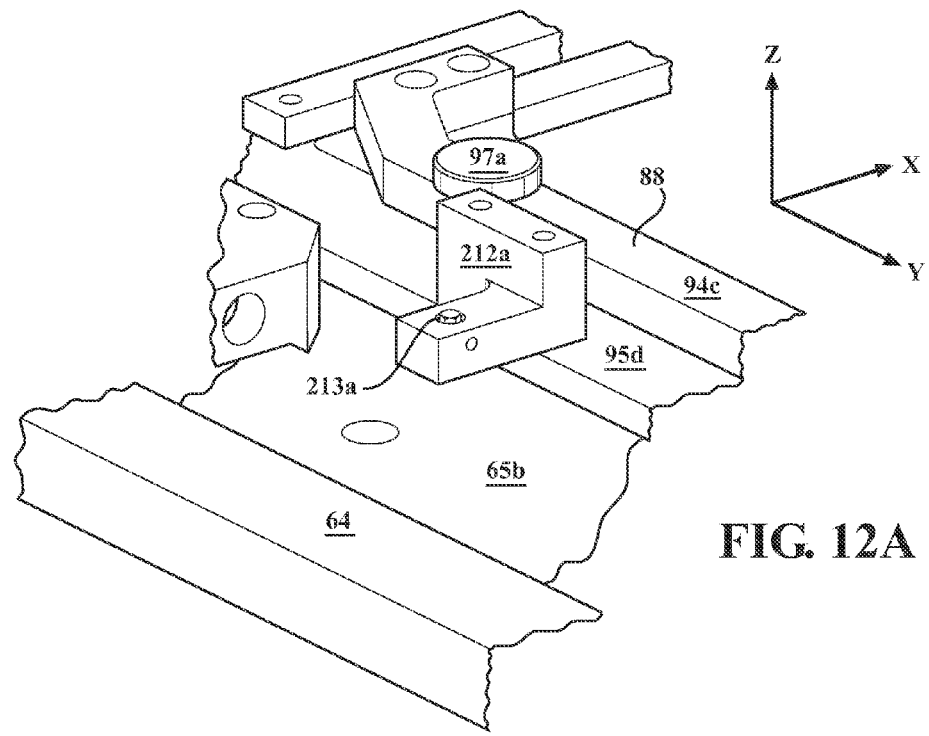
FIG. 12A is a detailed view of a left side of the work table, load frame, and solidification substrate of the apparatus of FIG. 10 showing a load frame bracket engaging the work table.
Figure 12B:
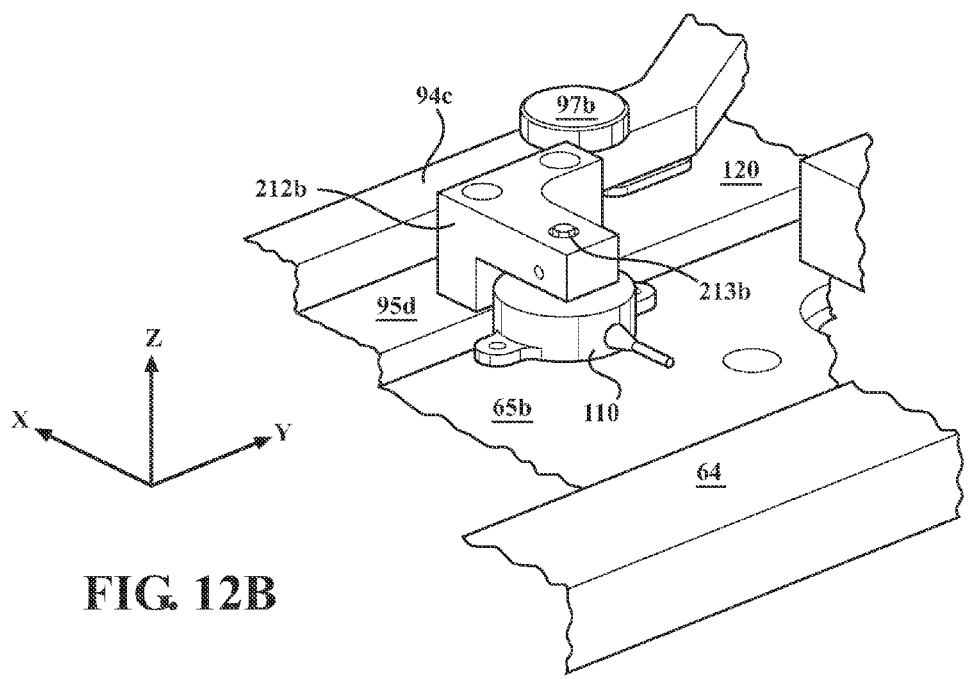
FIG. 12B is a detailed view of a right side of the work table, load frame, and solidification substrate of the apparatus of FIG. 12A showing a load frame bracket engaging a load cell used to indicate the force or pressure applied by the solidification substrate assembly against the work table.
Figure 13:
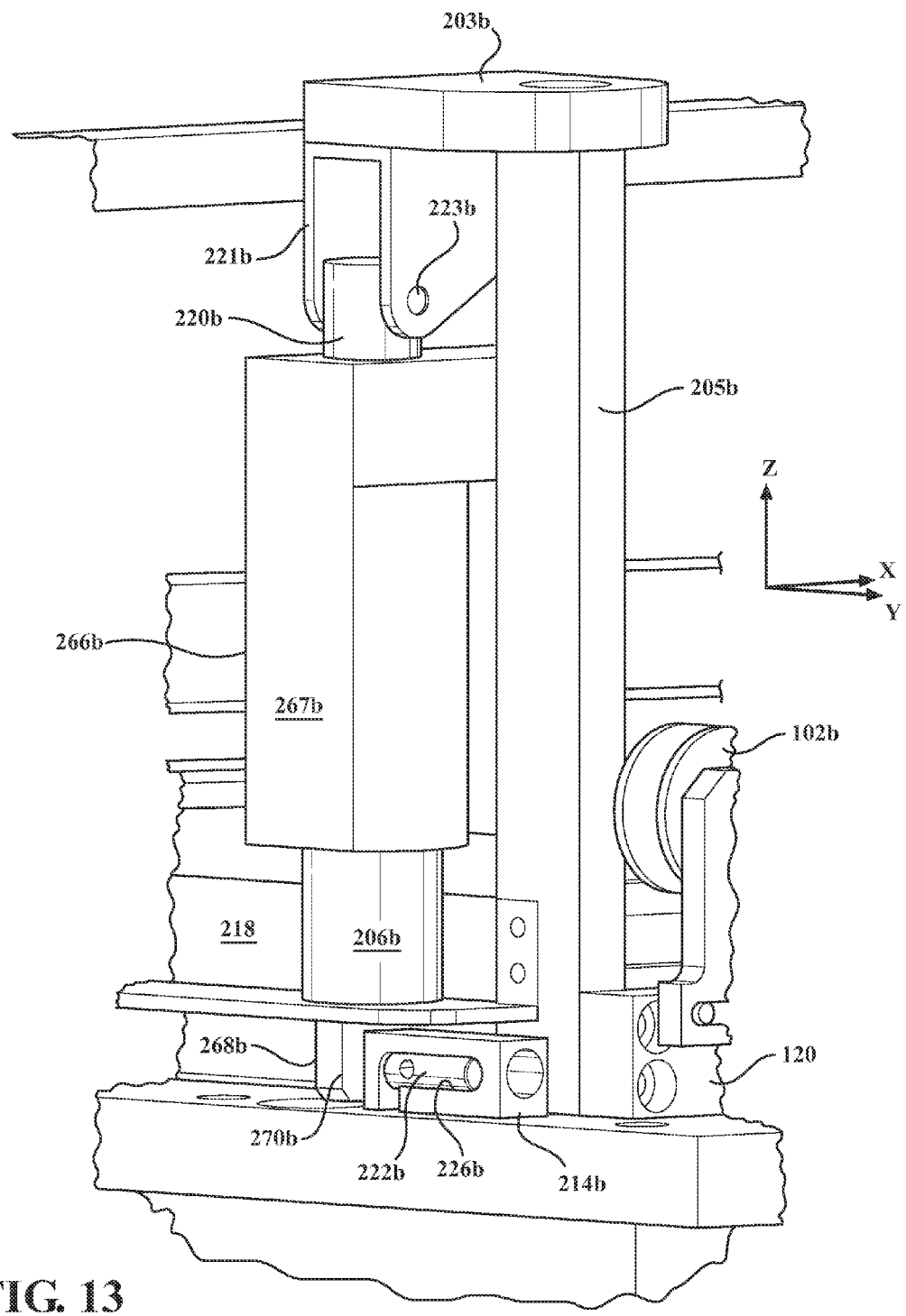
FIG. 13 is a detailed view of an actuator and actuator support of the apparatus of FIG. 10 with a modified horizontal support structure.

Similarly, actuator 266b includes a housing 267b and a shaft 268b (visible in FIG. 13). Actuator housing 267b includes a proximal end 220b, and shaft 268b includes a distal end 270b. A portion of shaft 268b is disposed in actuator housing 267b and guide bushing 206b. Guide bushing 206b is fixedly attached to and stationary with respect to actuator housing 267b. However, the spacing between guide bushing 206b and the distal end 270b of shaft 268b is adjustable when the actuator 266b is adjusted between an extended configuration and a retracted configuration (and vice-versa). Guide bushing 206b is provided to facilitate the adjustment of the actuator 266b from a retracted configuration to an extended configuration (and vice-versa) and reduces the amount of vibration occurring during the adjustment process. In the retracted configuration, the actuator length defined by the distance between the actuator housing proximal end 220b and the distal shaft end 270b is smaller than the distance between the actuator housing proximal end 220b and distal shaft end 270b when actuator 266b is in the extended configuration. In the extended configuration, the distance along the build (z) axis from the actuator proximal ends 220a, 220b to the build platform (not shown in FIGS. 10-13, but shown in FIGS. 1A-1E) is greater than in the retracted configuration.

Figure 10:
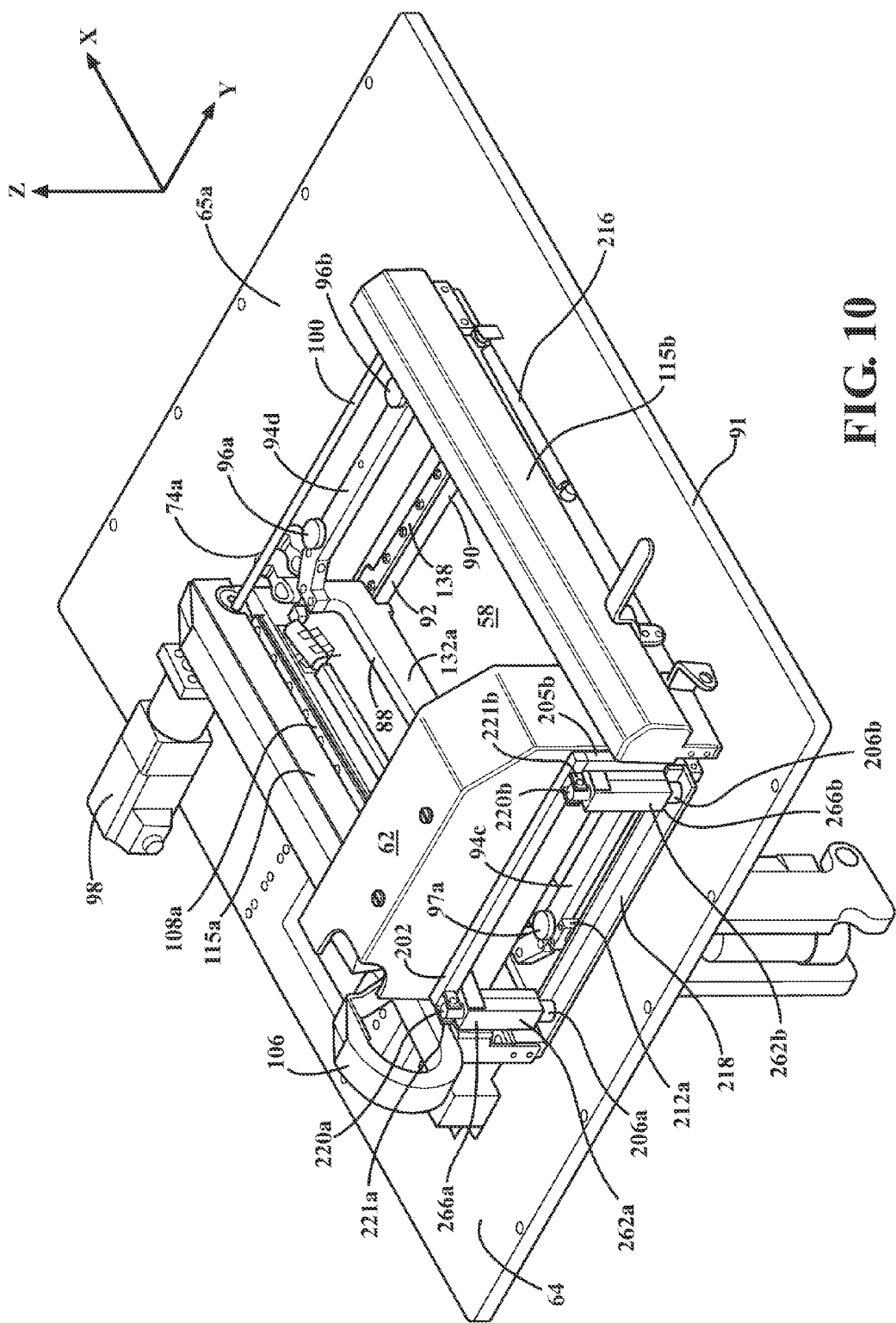
FIG. 10 is a detailed perspective view of an alternative exemplary solidification substrate assembly and work table used in an apparatus for making a three-dimensional object from a solidifiable material with the solidification substrate assembly in a level configuration.

In FIG. 10 the solidification substrate assembly 57 is shown in a level configuration as would be the case following a leveling operation. The linear solidification device 62 may solidify solidifiable material underneath film assembly 90 as it moves in either or both directions along the x-axis. In FIG. 11 the solidification substrate assembly 57 is shown in an open configuration that is not used during the manufacture of a three-dimensional object.

Unlike the examples of FIGS. 1A-1E, 4A-4E, and 6, in the example of FIGS. 10-13, the actuator distal ends 270a and 270b remain fixed with respect to work table 64 while making a three-dimensional object from a solidifiable material. However, the actuator housings 267a and 267b and their respective proximal ends 220a and 220b are movable along the build (z) axis relative to work table 64. Thus, in the example of FIGS. 10-13, the actuator peeling distance Δa, for each actuator is equal to the distance of travel of each actuator proximal end 220a and 220b along the length axis of its respective shaft 268a and 268b during an object peeling operation. The length axes of actuator shafts 268a and 268b are generally parallel to the build (z) axis and are substantially parallel to the build (z) axis when the solidification substrate assembly 57 is in a level configuration (as shown in FIG. 10). However, the actuator shaft 268a and 268b length axes will tilt during a solidification substrate assembly 57 tilt operation because the solidification substrate assembly 57 traverses a circular path when viewed along the y-axis during a tilting operation. The actuator shafts 268a and 268b will exhibit their maximum degree of tilt relative to the build (z) axis when their respective actuator proximal housing ends 273a and 273b reach their fully extended positions.

To provide the foregoing configuration, latches 214a and 214b are mounted on the work table 64. A detailed view of latch 214b and its related components is shown in FIG. 13. Latch 214a is configured and operates similarly with analogous components. Referring to FIG. 13, latch shaft 222b is slidable in groove 226b within latch 214b to selectively attach distal shaft end 270b to work table 64 or detach distal shaft end 270b from work table 64, as desired. Latch shaft 222*b* preferably has a knob such as knob 116 in FIGS. 4B and 4C, but the knob is not shown in FIG. 13. The distal end 270*b* of actuator shaft 268*b* includes an opening that can selectively receive latch shaft 222*b* to attach distal end 270*b* to the latch 214*b*, thereby attaching distal shaft end 270*b* to the work table 64. In FIG. 13, latch 214*b* is in a latched condition, with latch shaft 222*b* extending through an opening in shaft distal actuator end 270*b* and an opening in latch 214*b*. Although not visible in the figures, latch 214*a* is configured similarly to allow distal shaft end 270*a* to be selectively attached to or detached from the work table 64. In FIG. 11, latches 214*a* and 214*b* are shown in an unlatched condition.

Actuators 266*a* and 266*b* may be energized by motors or by hydraulic power. In either case, during an object peeling operation, the actuator housings 267*a* and 267*b* move upward along their respective shaft length axes and along the build (z) axis relative to work table 64 and build platform 46 (FIGS. 1A-1E). During a leveling operation, the actuator housings 267*a* and 267*b* move downward along their respective shaft length axes and the build (z) axis relative to work table 64 and build platform (FIGS. 1A-1E). The movement of the actuator housings 267*a* and 267*b* along the build (z) axis causes the load frame 120 to tilt about the tilt axis defined by hinges 74*a*-74*b* (not shown in FIGS. 10-13, but shown in FIG. 4D) which also causes the remainder of the solidification substrate assembly 57 to tilt about the tilt axis.

As best seen in FIG. 13, actuator housing 267*b* is connected to the load frame 120 via vertical actuator support 205*b* and horizontal support 203*b*. Bracket 221*b* is connected to proximal actuator end 220*b* at a pivot axis 223*b* which allows the actuator 266*b* to pivot relative to bracket 221*b*, horizontal actuator supports 203*b*, and vertical actuator support 205*b*. This pivoting action allows the actuators 266*a* and 266*b* to tilt such that their respective length axes tilt relative to the build (z) axis during solidification substrate assembly 57 tilting operations as the solidification substrate assembly traverses a circular path when viewed along the y-axis.

As actuator 266*b* is adjusted from a retracted configuration to an extended configuration (during an object peeling operation), the actuator proximal end 220*b* exerts an upward (build (z) axis) force against bracket 221*b*, which in turn exerts an upward force against horizontal actuator support 203*b*. The horizontal actuator support 203*b* exerts an upward (build (z)) axis force against the vertical actuator support 205*b*, which in turn exerts an upward (build (z)) axis force against the side 95*d* (FIGS. 12A and 12B) of load frame 120 to tilt the load frame 120 about the tilt axis defined by hinges 74*a*-74*b* (FIG. 4D). Actuator housing 267*a* is connected to load frame 120 in a similar manner by a bracket 221*a* and actuator supports 203*a* and 205*a* which are not shown in FIG. 13.

In FIG. 10, the actuator proximal end brackets 221*a* and 221*b* are configured somewhat differently from those shown in FIG. 13. In addition, the actuators 266*a* and 266*b* in FIG. 10 do not have individual horizontal supports 203*a* and 203*b* connecting the actuators 266*a* and 266*b* to vertical actuator supports 205*a* and 205*b*, respectively. Instead, a cross-beam 202 is provided and is attached to brackets 221*a* and 221*b*, respectively, and to the actuator vertical supports 205*a* and 205*b*, respectively. The guide bushings 206*a* and 206*b* are fixedly attached to their respective actuators 266*a* and 266*b*. The guide bushing holder 218 is connected to the vertical actuator supports 205*a* and 205*b*. Thus, during an object peeling or leveling operation, the guide bushing holder 218 and the guide bushings 206*a* and 206*b* preferably move along the build (z) axis relative to the work table 64, build platform 46 (FIGS. 1A-1E) and relative to the distal actuator ends 270*a* and 270*b*.

As best seen in FIGS. 12A and 12B, load frame brackets 212*a* and 212*b* are provided on side 95*d* of load frame 120 and are sized to overlap with work table side 65*b* along the x-axis. The load frame brackets 212*a* and 212*b* act as stops to restrain the downward build (z) axis movement of the solidification substrate assembly 57. In addition, load frame bracket 212*b* is positioned to engage pressure (or force) sensor 110 attached to work table side 65*b*. As with the examples of FIGS. 4A-4E, and 6, the solidification substrate assembly 57 and work table 64 of FIGS. 10-13 may be used in apparatus 40 of FIGS. 1A-1E, in which case each new layer of solidifiable material will be provided between an exposed object surface (such as surface 82 in FIGS. 1B-1D) and film 60 of film assembly 90. The solidifiable material 50 in the space between the exposed object surface 82 and film 60 will exert an upward force and pressure that will decrease the force or pressure sensed by the pressure (or force) sensor 110. The upward force exerted by the solidifiable material 50 will decrease as solidifiable material is squeezed out of the space between the exposed object surface 82 and the film 60 until reaching an equilibrium value.

As shown in FIGS. 12A and 12B, bracket 212*a* includes a screw 213*a* with an adjustable length along the build (z) axis which allows the stop position of the load frame 120 along the build (z) axis on a first y-axis side of the load frame 120 to be selectively adjusted. Correspondingly, bracket 212*b* includes a screw 213*b* with an adjustable length along the build (z) axis which allows the stop position of the load frame 120 on a second y-axis side of the load frame 120 to be selectively adjusted. In certain examples, the screws 213*a* and 213*b* are adjusted to ensure that the solidification substrate 58 defines a plane that is substantially or completely perpendicular to the build (z) axis and parallel to the x-y plane.

Controller 184 of FIG. 3 may be used with the solidification substrate assembly 57 and work table 64 of FIGS. 10-13 and may be configured with the same inputs and outputs. However, outputs 194 are preferably configured to provide outputs to both actuators 266*a* and 266*b*. In the case of hydraulic actuators, separate hydraulic pumps and conduits may be provided for each actuator 266*a* and 266*b* (in which case the housings 267*a* and 267*b* would be hydraulic cylinders), and the controller outputs 194 may include separate outputs for each pump or a common output provided to each pump. Alternatively, a single pump may supply fluid to both actuators 266*a* and 266*b*. In the case of motor-driven actuators, separate motors may be provided for each actuator 266*a* and 266*b*, and outputs 194 may include separate outputs for each motor or a common output provided to each motor. In either case, the controller 184 and the source of motive power for actuators 266*a* and 266*b* are preferably configured so that the actuator housings 267*a* and 267*b* move along the build (z) axis at the same rate relative to one another to avoid the exertion of uneven forces against load frame 120 along the y-axis.

The two actuator design of FIGS. 10-13 is particularly useful for larger build envelope machines to ensure that the solidification substrate assembly 57 may be stably tilted about the tilting axis. It is also sometimes useful to use two linear solidification devices positioned adjacent one another along the y-axis for larger build envelope machines instead of linear solidification device 62. An example of such a dual linear solidification device configuration is provided in FIG.

36 and paragraphs 266-271 of U.S. patent application Ser. No. 13/774,355, the entirety of which is hereby incorporated by reference.

The methods of FIGS. 7, 8A and 8B may be readily adapted for use with the apparatus of FIGS. 10-13. In certain examples, the actuator activation signals are provided to a source of motive power (e.g., an electric motor or hydraulic fluid pump) used to adjust the length of the actuators 266a and 266b along the build (z) axis as the actuators 266a and 266b are adjusted from a refracted to an extended configuration (and vice-versa). For example, the method of FIG. 7A may be carried out as described previously. However, step 1022 would be modified to generate two first actuator activation signals for each of actuator 266a and 266b (or by supplying the same signal to each actuator). The determination of whether peeling is complete in step 1024 may be made by using a limit switch associated with either or both actuators 266a and 266b or based on the operation of the respective motors or hydraulic pumps. Step 1030 would be modified to generate two second actuator activation signals for each of actuator 266a and 266b or to generate a single actuator activation signal provided to each actuator 266a and 266b. Pressure (or force) sensor 110 may be used to carry out step 1032, or alternatively, a leveling wait time may be used.

Referring to FIGS. 8A and 8B, in step 1052 the calculated actuator peeling distance Δa used may be used to determine the extent that the respective actuator housings 267a and 267b will move along the length axes of their respective actuator shafts 268a and 268b relative to their respective distal shaft ends 270a and 270b and the work table side 65b (as well as relative to a build platform such as the build platform 46 of FIGS. 1A-1E). In step 1062, respective actuator activation signals (or a common actuator activation signal) may be provided to the sources of motive power (e.g., motors or hydraulic pumps) to adjust the rate at which the lengths of the actuators 266a and 266b change to correspond to the modified peeling velocity determined in step 1056. Step 1064 may be carried out by determining whether the change in the lengths of either or both actuators 266a and 266b have reached the calculated peeling distance Δa. Step 1072 may be carried out by generating two actuator activation signals for the respective sources of motive power used to adjust the lengths of actuators 266a and 266b from the extended configuration to the retracted configuration. Alternatively, a common actuator activation signal may be supplied to the source of motive power for each actuator 266a and 266b.

In certain exemplary implementations, the actuators 266a and 266b apply a constant force against the solidification substrate assembly 57 (by virtue of their connection to vertical actuator supports 205a and 205b) during an object peeling operation. In other exemplary implementations, the actuators 266a and 266b apply a constant force against the solidification substrate assembly 57 during a leveling operation. In further exemplary implementations, the actuators 266a and 266b apply a constant force against the solidification substrate assembly 57 during both an object peeling operation and a leveling operation (albeit in opposite directions). In a preferred method, the same constant force is applied to the solidification substrate assembly 57 during an object peeling and a leveling operation (in opposite directions) and the constant force (in the negative build (z) axis direction) used in the leveling operation remains after the solidification substrate assembly 57 is level, which stabilizes the assembly 57 against the upward pressure of the solidifiable material. In one example, a constant force of 80 psi is applied to the solidification substrate assembly 57 during both an object peeling and a leveling operation.

In certain preferred examples, when solidification substrate assembly 57 is in a level configuration and solidification of the next layer of solidifiable material 50 has not yet begun, actuators 266a and 266b apply a level configuration force, as described previously with the examples of FIGS. 1A-1E, 4A-4E, and 6 and as illustrated in FIGS. 14A and 14B. In the case of actuators 266a and 266b, the level configuration force is applied by applying a downward force in the build (z) axis direction against the brackets 221a and 221b, which in turn applies an downward force in the build (z) axis direction against the vertical actuator supports 205a and 205b, each of which is connected to the load frame 56.

In certain examples, the tiltable solidification substrate assemblies 57 described herein and illustrated in FIGS. 1A-1E, 4A-4E, 6, 10-13, and 16A-16F are particularly beneficial when the solidifiable material 50 is of a relatively higher viscosity than a relatively lower viscosity. Preferred solidifiable material 50 viscosities (at 25° C.) are at greater than 1500 cp, more preferably at least about 1800 cp, still more preferably at least about 2000 cP, even more preferably at least about 2500 cp, and yet more preferably at least about 2800 cP. As explained previously, during a leveling operation, solidifiable material 50 is "squeezed out" of the space between the most recently formed object surface 82 (FIG. 1E) and the solidification substrate assembly 57. In some examples, it is preferable to wait until the flow and movement of solidifiable material 50 between the exposed object surface 82 and the solidification substrate assembly 57 has substantially or completely stopped following a leveling operation. In some embodiments, the solidification of a next layer of solidifiable material 50 is deferred until the expiration of a leveling wait time (FIG. 9) to better ensure that the localized flow and movement of the solidifiable material 50 between the exposed object surface 82 and the solidification substrate assembly 57 has substantially or completely stopped. Without wishing to be bound by any theory, it is believed that the flow and movement of higher viscosity solidifiable materials tends to stabilize more rapidly than that of lower viscosity materials following a leveling operation. In certain preferred examples, the flow and movement of higher viscosity solidifiable materials with viscosities in the range described above between the exposed object surface 82 and the solidification substrate assembly substantially or completely stops at leveling wait times that are no more than about 20 seconds, preferably no more than about 15 seconds, and still more preferably no more than about 10 seconds.

In certain examples, controller 184 (FIG. 3) includes a program that comprises a set of computer executable steps stored in non-transitory medium 186 that operates the tiltable solidification substrate assemblies 57 described herein in two different modes, depending on the viscosity of the solidifiable material 50. In one example, a viscosity threshold is selected and used to classify solidifiable material 50 has a "low viscosity material" or a "high viscosity material." When executed by processor 188, the computer executable steps receive data indicating whether the solidifiable material 50 is a low viscosity material or a high viscosity material. If the solidifiable material 50 is a low viscosity material, the controller 184 operates in a "low viscosity mode", in which computer executable steps cause the actuator (66, 166, 266) to apply a level locking force to the solidification substrate assembly 57 that locks the solidification substrate assembly 57 in a level configuration. The level locking force may be constant or variable. In certain examples, the level locking force is higher during an object solidification operation (e.g., when linear solidification device 62 is traveling along the travel (x) axis and projecting solidification energy along the scanning (y) axis) than during all or part of the period when an object solidification operation is not occurring. In other examples, the level locking force follows one of the patterns shown in phase B in FIGS. 14A and 14B when an object solidification operation is not occurring and follows the pattern shown in phase C during an object solidification operation.

In some examples of the low viscosity mode, "deep dipping" operations may be required to supply a sufficient amount of solidifiable material between the most recently formed exposed object surface 82 and the solidification substrate assembly 57. In certain cases in which the actuator 66, 166, 266a/b is motor-driven, the level locking force is preferably higher during all or part of the time during which the build platform 46 is moved upward along the build (z) axis toward the solidification substrate assembly 57 than after the build platform 46 has reached a position at which the most recently formed exposed object surface 82 is spaced apart from the solidification substrate assembly 57 by the desired layer thickness Δz.

In certain low viscosity operation examples wherein the actuators 66, 166, 266a/b are motor-driven, the actuator motor electrical loads may follow the load patterns depicted in FIGS. 14A and 14B. In such cases, phase "A" represents the period during which the build platform 46 is moving upward along the build (z) axis toward the solidification substrate assembly 57, phase "B" represents the period during which (1) no solidification is occurring and (2) the build platform 46 has stopped moving and is positioned so that the exposed object surface 82 (FIG. 1E) is spaced apart from the solidification substrate assembly 57 by the desired layer thickness Δz, and phase "C" represents the period during which an object solidification operation is occurring and the build platform 46 remains spaced apart from the solidification substrate assembly by the desired layer thickness Δz.

In accordance with the foregoing, when controller 184 receives data indicating that the solidifiable material 50 is a "high viscosity material," the processor 188 will execute a set of computer executable steps stored in non-transitory memory 186 which will cause the actuators 66, 166, and 266a/b to carry out object peeling and leveling operations as described previously herein. The controller 184 may also apply a level configuration force to solidification substrate assembly 57 when the substrate 58 is level and no object solidification is occurring such that the level configuration force differs from the force applied during a leveling operation and during an object solidification operation. In certain examples, controller 184 executes the computer executable process steps applicable to a low viscosity material when the controller 184 receives data indicating that the viscosity of the solidifiable material (at 25° C.) is no more than 1500 cp, more preferably less than about 1200 cp, and still more preferably less than about 1000 cp. The controller 184 may receive actual viscosity data or may instead may be programmed to select the low viscosity mode of operation or the high viscosity mode of operation based on a material identifier of the type shown in FIG. 9. In certain examples, the "low viscosity mode" of operation is used for those materials that still experience appreciable flow and movement more than about 20 seconds, more preferably more than about 15 seconds, and still more preferably more than about 10 seconds after a leveling operation is complete. Otherwise, the "high viscosity" mode of operation is used.

Figure 15:
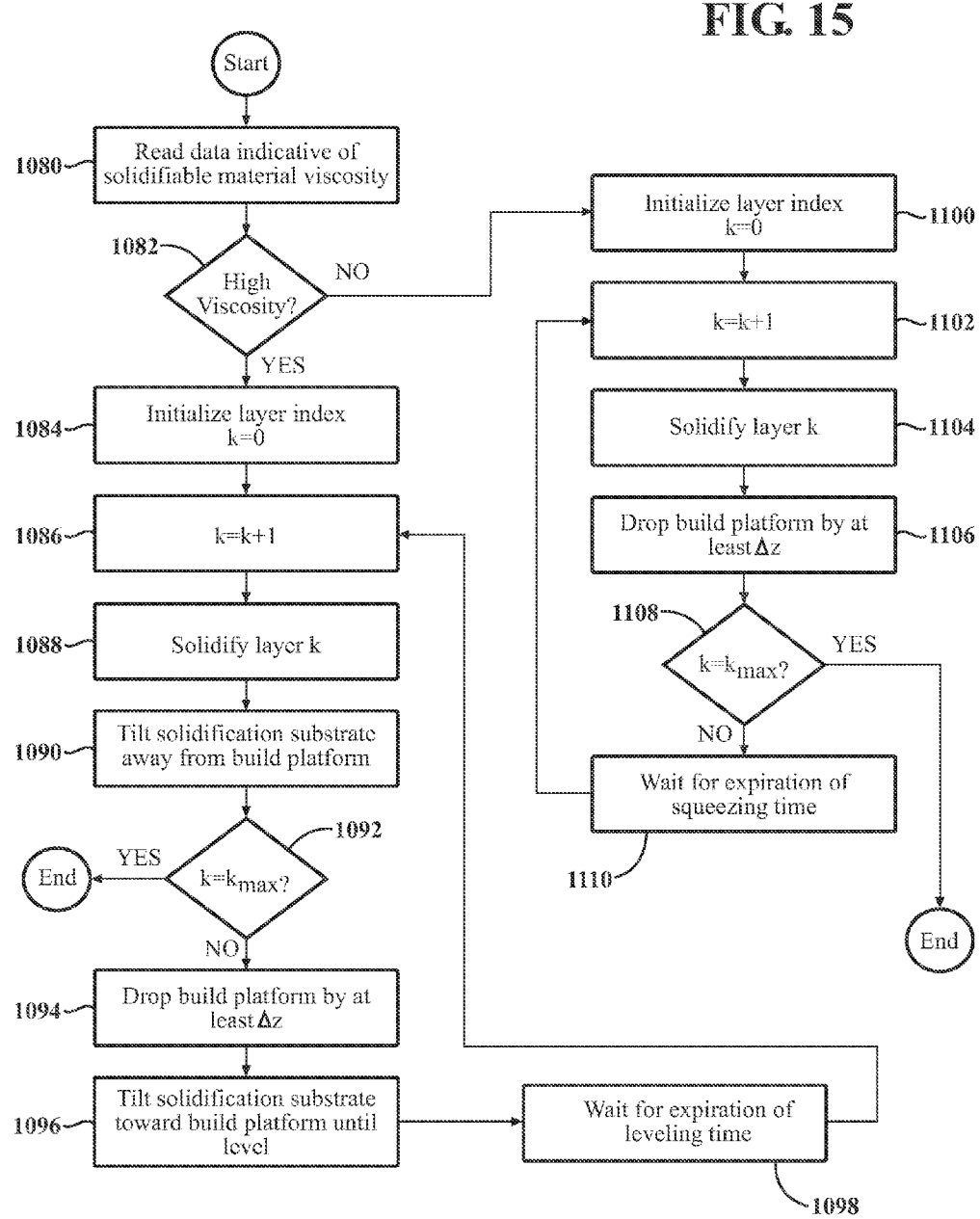
FIG. 15 is a flow chart depicting a dual-mode method of making a three-dimensional object from an apparatus comprising a tiltable solidification substrate assembly.

Referring to FIG. 15, a dual-mode method of making a three-dimensional object from a solidifiable material using an apparatus with a tiltable solidification substrate assembly is depicted. The method of FIG. 15 includes two modes of operation, one for "high viscosity" solidifiable materials and one for "low viscosity" solidifiable materials. The method may be used, for example, with any of the tiltable solidification substrate assemblies 57 shown in FIGS. 1A-1E, 4A-4E, 10-13, and 16A-16F. In certain examples, "high viscosity" materials are those that substantially stabilize so that no localized flow occurs between the exposed object surface 82 and the solidification substrate assembly 57 within a specified leveling wait time after the solidification substrate assembly 57 assumes a level configuration. In certain examples, the specified leveling wait time is no more than about 20 seconds, preferably no more than about 15 seconds, and still more preferably not more than about 10 seconds.

In the same or other examples, "high viscosity" materials are those with a viscosity at 25° C. that is greater than 1500 cp, more preferably at least about 1800 cp, still more preferably at least about 2000 cP, even more preferably at least about 2500 cp, and yet more preferably at least about 2800 cP. In step 1082 a determination is made as to whether the solidifiable material 50 is high viscosity. In certain examples, controller 184 (FIG. 3) is provided and receives data indicative of the viscosity of the solidifiable material 50. The data may be viscosity data. It may also be a solidifiable material identifier such as those shown in field 216a of FIG. 9, which is then identified as a high or low viscosity material via another database accessed by controller 184.

In step 1082 if the solidifiable material 50 is a high viscosity material, control transfers to step 1084 to initialize the layer index k. In step 1084 the layer index k is incremented. In step 1088 a layer of thickness Δz (FIG. 1E) is solidified. In examples where a linear solidification device 62 is provided, the solidification of a layer is carried out by traversing the linear solidification device 62 along the travel (x) axis while supplying solidification energy along the scanning (y) axis. For SLM based methods, one or more two-dimensional solidification energy patterns will be projected as an image onto the exposed surface 51 of the solidifiable material to carry out step 1088.

In step 1090 an object peeling operation is carried out by tilting the solidification substrate assembly 57 about the tilting axis (e.g., hinges 74a and 74b in FIGS. 1A-1E, 4A-4E, 6 and 10) in a direction away from build platform 46. Step 1090 will separate the solidification substrate assembly 57 from the exposed object surface 82. Thus, in step 1092 the method determines if the last layer of the object has been solidified by comparing the current value of the layer index k to the maximum value $k_{max}$. If solidification is complete, the method ends. Otherwise, control transfer to step 1094.

In step 1094 build platform 46 is moved away from solidification substrate assembly 57 in direction along the build (z) axis by an amount that is at least equal to the next desired layer thickness Δz. In certain cases, it may be desirable to use "deep dipping" for all or part of the object building process, in which case the build platform 46 will initially move away from the solidification substrate assembly 57 by along the build (z) axis by an amount that is greater than the next desired layer thickness Δz and then moved back toward the build (z) axis to a position where the exposed object surface is spaced apart from the level configuration position of the solidification substrate assembly 57 by the desired layer thickness Δz. Step 1094 may be carried out concurrently with step 1090, but is preferably carried out after step 1090. In step 1096 a leveling operation is carried out by tilting the solidification substrate assembly about the tilting axis toward the build platform 46.

In step 1098 the method waits for the expiration of a "leveling wait time" so that the flow of solidifiable material 50 between the exposed object surface 82 and the solidification substrate assembly 57 substantially or completely stops. Step 1098 preferably begins when the solidification substrate assembly 57 is in the level configuration and the exposed object surface 82 is spaced apart from the solidification substrate assembly 57 by the desired layer thickness and ends after the leveling wait time has elapsed. Following step 1098, control transfers to step 1086 and the layer index k is incremented to begin the solidification of the next layer. If a motor driven actuator (or actuators) is used, during step 1098, level configuration forces may be applied as described previously with respect to the apparatuses of FIGS. 1A-1E and 4A-4E and as further illustrated in FIGS. 14A-B.

If step 1082 returns a value of NO ("N"), the solidifiable material is a "low viscosity material" and control transfers to step 1100 to initialize the layer index k. In step 1102 the layer index k is incremented. In step 1104 the current layer is solidified as described previously for step 1088. In step 1106 the build platform 46 is moved away from the solidification substrate assembly 57 in a direction along the build (z) axis as in step 1092. For low viscosity materials, since object peeling operations are not used, the most recently formed exposed object surface 82 is separated from the solidification substrate assembly 57 (e.g., from the film 60 or rigid/semi-rigid substrate 58) during step 1106. In general, the speed of descent of the build platform 46 in the negative build (z) axis direction in step 1106 must be reduced relative to step 1094 because object separation from the film 60 will occur during the descent and without tilting, the separation forces per unit area will generally be higher across the exposed object surface. Step 1106 may be carried out using the deep dipping techniques described previously for some or all of the object layers.

In step 1108 the method determines whether the last layer has been solidified, in which case the layer index k will equal the maximum value $k_{max}$ of the layer index k. If the last layer has been reached, the method ends. Otherwise, control transfers to step 1110.

Step 1110 begins when the build platform 46 is positioned so that the exposed object surface 82 is spaced apart from the solidification substrate assembly 57 by a distance along the build (z) axis equal to the layer thickness Δz. The step ends once the squeezing time (comparable to a leveling wait time when tilting is not used) expires. During all or part of step 1110, a level locking force may be applied to the solidification substrate assembly 57 in step 1110 which is less than the level locking force used during step 1104, as described previously with respect to FIGS. 14A and 14B.

In certain examples of the apparatuses for manufacturing three-dimensional objects described herein, the solidification substrate assembly 57 may include a solidification substrate laminate 298 instead of a film assembly 90. Certain types of solidifiable materials 50 have a degree of brittleness (when solidified) which causes them to break when separating from film 60 of film assembly 90. This is particularly the case for finely dimensioned structures such as removable object supports used to connect the object 78 to build platform 46 (FIGS. 1A-1E). In the example of FIGS. 1A-1E, 4A-4E, 6, and 10-13, film 60 is supported by a frame but is not bonded to the rigid or semi-rigid solidification substrate 58. As a result, during an object peeling operation, the film 60 will deform along the build (z) axis and then quickly and resiliently separate from the object 78 in an abrupt manner which can damage the object 78, and in particular, finely dimensioned object structures.

Referring to FIGS. 16A-16F, a modified version of the apparatus for making three-dimensional objects of FIGS. 4A-4E is depicted. Like numerals in FIGS. 16A-16F and 4A-4E refer to like parts. The apparatus of FIGS. 16A-16F includes the actuator 66 and latch 114 configuration of FIGS. 4A-4E, and the load frame 120 is hinged to the work table 64 in the same manner. The apparatus of FIGS. 16A-16F would also be provided with a solidifiable material container 44 and build platform 46 as shown in FIGS. 1A-1E as well as the controller 184 and associated inputs and outputs shown in FIG. 3.

In FIGS. 16A-16F, the solidification substrate assembly 57 includes a solidification substrate laminate 298 but does not include the film assembly 90 of FIGS. 4A-4E. The solidification substrate laminate 298 includes a rigid or semi-rigid solidification substrate 58 that is transparent and/or translucent. However, one or more films or coatings are adhered to the rigid or semi-rigid solidification substrate to create a layered or laminate structure. The solidification substrate laminate 298 is operatively connected to at least one actuator and is tiltable within the open top 47 of solidifiable material container 44 about a tilting axis defined by hinges 74a and 74b (FIG. 4D).

Figure 17A:
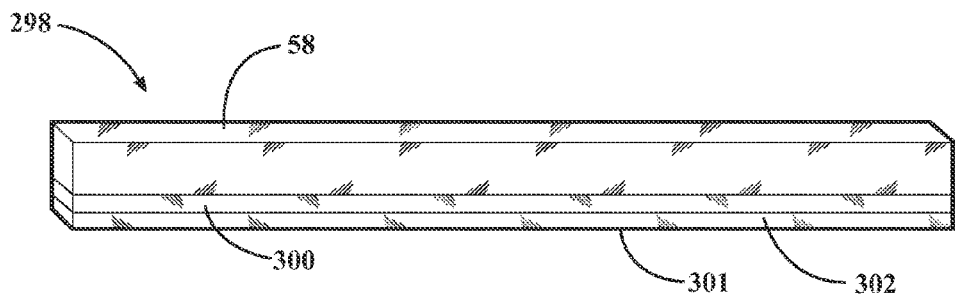
FIG. 17A is a first exemplary solidification substrate laminate.
Figure 17B:
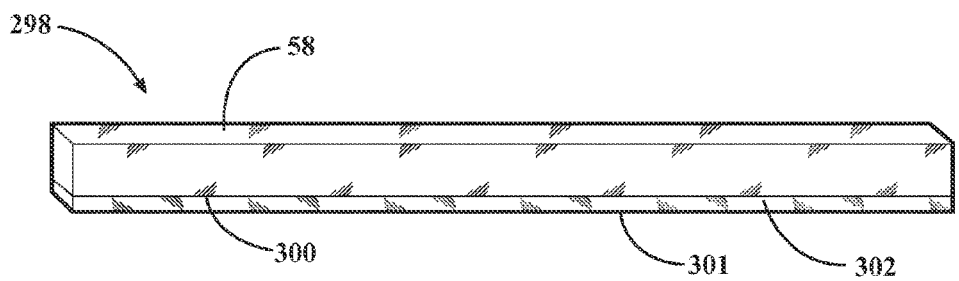
FIG. 17B is a second exemplary solidification substrate laminate.
Figure 17C:
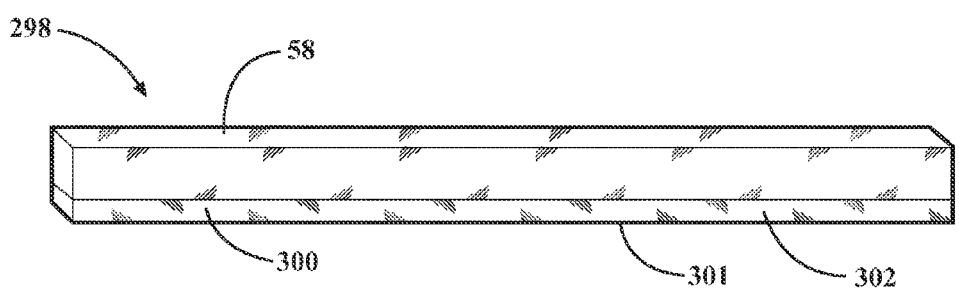
FIG. 17C is a third exemplary solidification substrate laminate.

Exemplary illustrations of solidification substrate laminate 298 are provided in FIGS. 17A-17C. Solidification substrate laminate 298 is depicted in an exaggerated perspective view to better illustrate layers 58, 300, and 302. A typical exemplary laminate 298 will be significantly thinner and flatter than shown in the figure. In each of the examples of FIGS. 17A-17C, solidification substrate laminate 298 comprises rigid or semi-rigid solidification substrate 58, which is described above. Each solidification substrate laminate 298 includes an object contacting surface 301 that faces the closed bottom 45 of solidifiable material container 44. However, the materials comprising object contacting surface 301 may vary as described below.

In certain examples, solidification substrate laminate 298 is provided with a localized area of resiliency proximate the exposed surface 51 (FIGS. 1C and 1D) of solidifiable material 501. Referring to FIGS. 17A and 17C, a transparent and/or translucent resilient layer 300 is provided. A variety of different translucent and/or transparent resilient materials may be used for layer 300. When provided as a 10 mm layer, the resilient layer 300 preferably transmits at least about 60 percent of received light in the 325-700 nm range. The resilient layer 300 preferably has a 10 mm layer transmission percentage of at least about 70 percent, more preferably at least about 80 percent, and even more preferably at least about 88 percent for light in the 325-700 nm range. The resilient layer 300 preferably also has a percent elongation at break (according to ISO 37) that is at least about 80 percent, more preferably at least about 90 percent, even more preferably at least about 95 percent, and still more preferably at least about 100 percent. In addition, resilient layer 300 preferably has a tensile strength (according to DIN ISO 37) that is at least about 3.0 N/mm$^2$, more preferably at least about 5.0 N/mm$^2$, even more preferably at least about 6.0 N/mm$^2$, and still more preferably at least about 7.0 N/mm$^2$.

Resilient layer 300 may be formed from one or more elastomeric polymers. In one example, silicone elastomers are provided. One particular example of a suitable silicone elastomer is Elastosil® RT 601, which is supplied by Wacker Silicones. Elastosil® RT 601 is a transparent, addition-curing silicone rubber having greater than 88 percent transmission of light in the 325-700 nm range (for a 10 mm layer). The material has an elongation at break of about 100 percent (ISO 37), and a tensile strength of about 7.0 N/mm2 (DIN ISO 37) tear strength (ASTM D 624B) of about 3.0 N/mm$^2$. Resilient layer 300 may be connected to rigid or semi-rigid solidification substrate 58 (FIG. 17A) using known techniques. In one example, an adhesive such as a pressure sensitive adhesive is used to bond resilient layer 300 and rigid or semi-rigid solidification substrate 58 together. The adhesive preferably does not significantly alter the wavelengths of intensities of electromagnetic radiation transmitted through substrate 58.

Certain solidifiable materials 50 may include components that chemically degrade resilient layer 300. For example, when certain photoinitiators are used to cure polymeric resins, the solidification process may be damage layer 300. Accordingly, in certain examples and as shown in FIG. 17A, a translucent and/or transparent protective layer 302 is provided. Translucent protective film 302 is preferably a homopolymer or copolymer formed from ethylenically unsaturated, halogenated monomers. Fluoropolymers are preferred. Examples of suitable materials for protective film 302 include polyvinylidene fluoride (PVDF), ethylenchlorotrifluoroethylene (ECTFE), ethylenetetrafluoroethylene (ETFE), polytetrafluoroethylene (PTFE), perfluoroalkoxy (PFA), and modified fluoroalkoxy (a copolymer of tetrafluoroethylene and perfluoromethylvinylether, also known as MFA). Examples of suitable protective film 302 materials include PVDF films sold under the Kynar® name by Arkema, ECTFE films sold under the Halar® name by SolvaySolexis, ETFE films sold under the Tefzel® name by DuPont, PFA films sold under the Teflon®-PFA name by DuPont, and MFA films sold under the name Nowofol.

In one example, solidification material 50 (FIGS. 1A-1E) comprises a 1,6 hexanediol diacrylate and/or trimthelolpropane triacrylate (TMPTA) with an acylphosphine oxide initiator, such as Irgacure 819. Without wishing to be bound by any theory, it is believed that the photopolymerization/photocrosslinking reaction that occurs generates an amount of heat that can damage resilient layer 300. Accordingly, in such examples an MFA protective film layer 302 is provided to reduce the effect of the generated heat on translucent resilient layer 300. In another example, solidification material 50 comprises 1,6 hexanediol diacrylate and/or TMTPA with a Darocur TPO initiator. Again, it is believed that the photopolymerization/photocrosslinking reaction generates an amount of heat that may damage elastomeric translucent layer 300. Accordingly, in such examples, an MFA protective film layer 302 is provided. Protective layer 302 may be bonded to resilient layer 300 with an adhesive, such as a pressure sensitive adhesive. The adhesive preferably does not significantly alter the wavelengths of intensities of electromagnetic radiation transmitted through solidification substrate laminate 298.

In certain cases, the force required to separate a solidified section of object 78 from solidification substrate laminate 298 will be low enough that the resiliency provided by resilient layer 300 will not be required. However, protective film 302 may still be used to protect the rigid or semi-rigid solidification substrate 58. Referring to FIG. 17B, a solidification substrate laminate 298 is provided which comprises rigid or semi-rigid solidification substrate 58 and translucent and/or transparent protective film 302. In certain examples a slipping agent is included in the composition of solidifiable material 50, allowing for better release of solidified object 80 from solidification substrate 58, eliminating the need for a resilient layer. Suitable slipping agents include TEGO-RAD 2250 from the Degussa Company and silicone agent EFKA 7454 from the EFKA Company. In certain other cases, the photopolymerization/photocrosslinking reaction proceeds without damaging the resilient translucent and/or transparent layer 300 or rigid or semi-rigid solidification substrate 58 through the generation of excess heat or otherwise. In such cases, protective film 302 is not required. Referring to FIG. 17C, a solidification substrate laminate 298 is provided which comprises a rigid or semi-rigid translucent and/or transparent solidification substrate 58 and an elastomeric translucent and/or transparent layer 300. In one example, a resin such as TMPTA, IBOA, or Ebecryl 3500 is used with an Irgacure 784 initiator and no protective film is required.

Figure 16A:
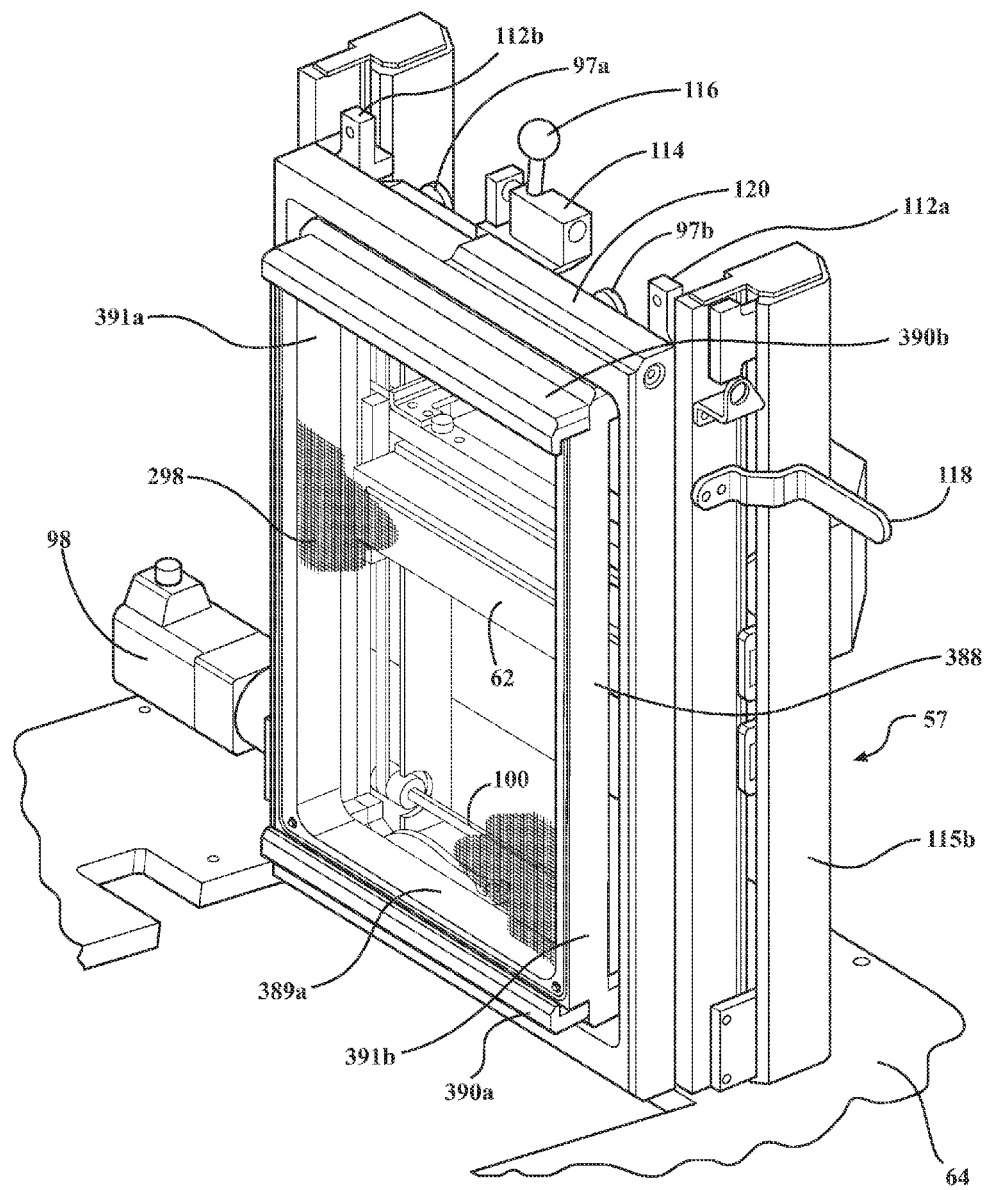
FIG. 16A is a detailed perspective view of a modified version of the solidification substrate assembly and work table of FIGS. 4A-4E in which the film assembly has been replaced with a removable solidification substrate laminate, and the solidification substrate assembly is in an open configuration with the tilting actuator is disconnected from the work table latch.
Figure 16B:
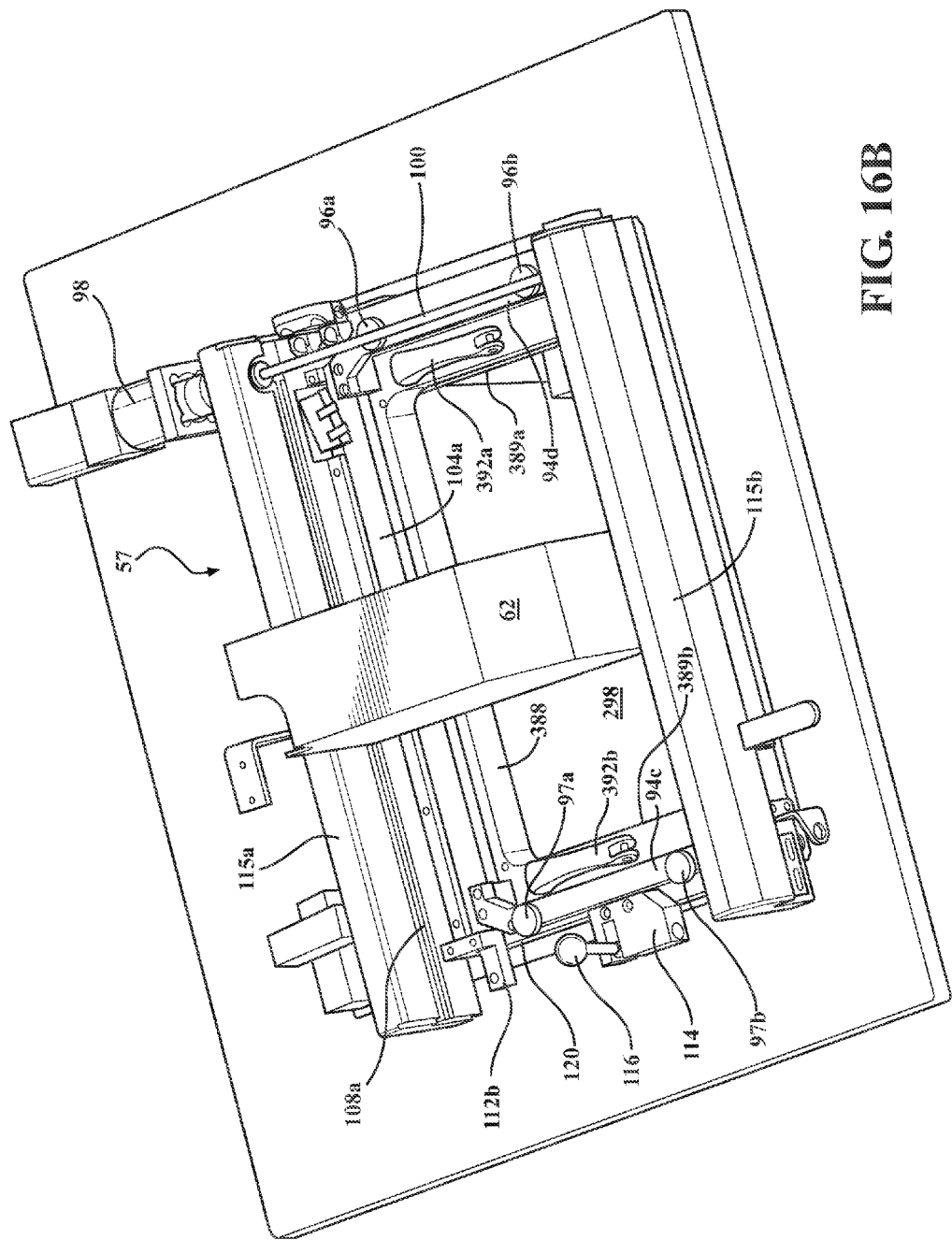
FIG. 16B is a top perspective view of the apparatus of FIG. 16B with the solidification substrate assembly in a level condition during an object solidification operation.
Figure 16C:
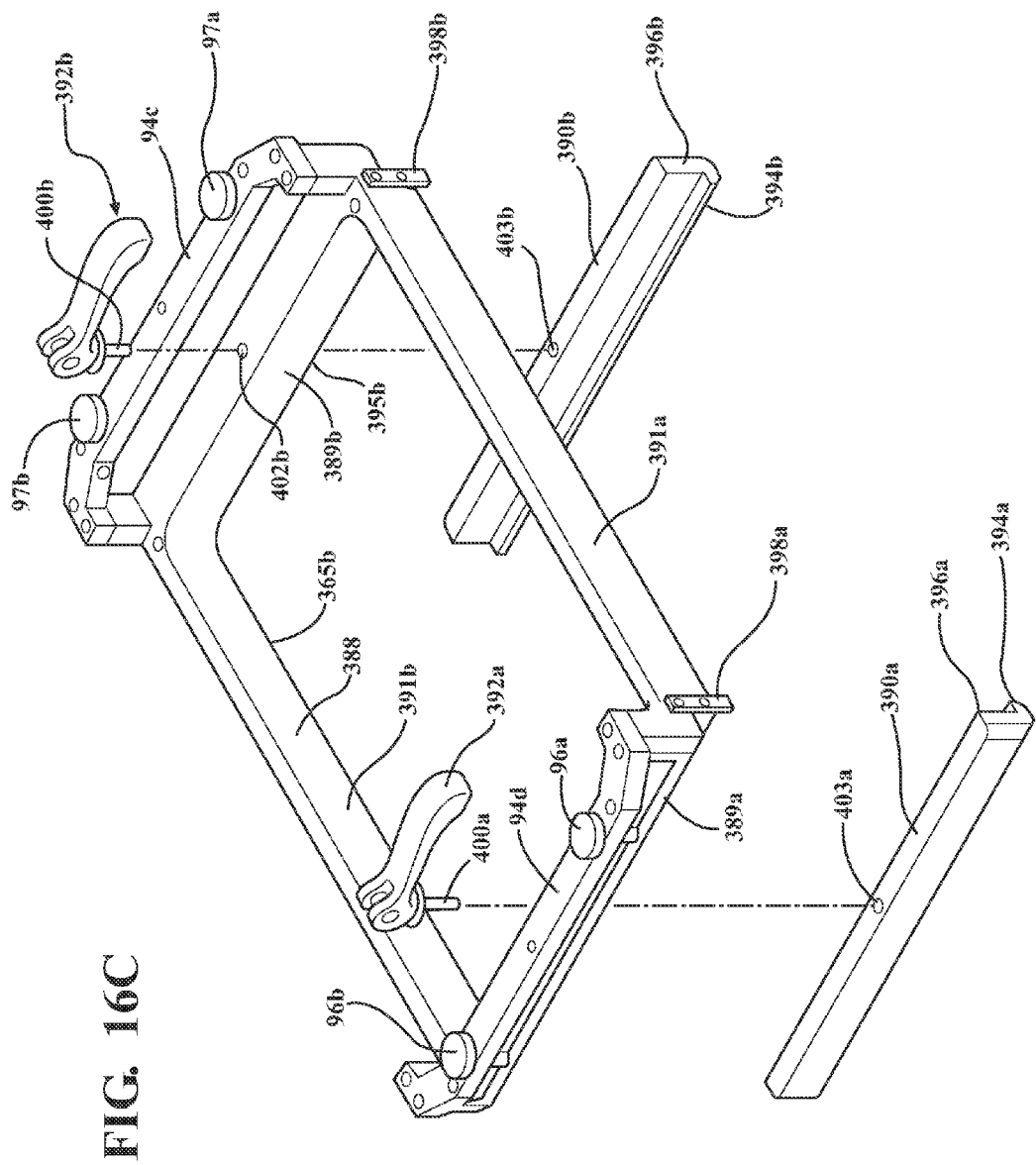
FIG. 16C is an exploded assembly view of the solidification substrate laminate frame of FIG. 16A.

Referring again to FIGS. 16A-16F, solidification substrate laminate frame 388 is provided and releasably secures solidification substrate laminate 298 to the solidification substrate assembly 57. The solidification substrate laminate frame 388 is shown in greater detail in FIGS. 16C and 16D. Solidification substrate laminate frame 388 is generally rectangular and made from a rigid metal or plastic. Sidewalls 391a and 391b are spaced apart along the y-axis, and sidewalls 389a and 389b are spaced apart along the x-axis. Cross members 94c and 94d are spaced apart along the x-axis and also include knobs 97a-97b and 96a-96b for securing the solidification substrate laminate frame 388 to the load frame 120 (FIGS. 16A-16B). Latches 392a and 392b are attached to solidification substrate laminate frame sidewalls 389a and 389b, respectively, via respective openings 402a (not shown) and 402b (FIG. 16C). Each latch 392a and 392b is also connected to a corresponding clamp member 390a and 390b. The clamp members 390a and 390b each have respective openings 403a and 403b which receive and secure latch fastener members 400a and 400b. The latch fastener member 400a extends through solidification substrate laminate frame side wall opening 402a (not shown) and into clamp member opening 403a. Latch fastener member 400b extends through solidification substrate laminate frame side wall opening 402b and into clamp member opening 403b.

As shown in FIG. 16C, each clamp member 390a and 390b has respective horizontal lip 394a and 394b and a respective vertical wall 396a and 396b. The sidewalls 389a and 389b each have a respective lower surfaces 395a and 395b (FIGS. 16C-16F). Each lip 394a and 394b and its corresponding side wall lower surface 395a and 395b defines an adjustable spacing Δh along the build axis for receiving the solidification substrate laminate 298 (FIG. 16F). The latches 392a and 392b have a securing position and a releasing position. When the latches 392a and 392b are in a securing position, the adjustable spacing Δh is at a minimum to securely retain solidification substrate laminate 298 to solidification substrate laminate frame 388. When the latches 392a and 392b are in a releasing position, the adjustable spacing Δh is at a maximum to allow the solidification substrate laminate 298 to be removed from or inserted into the solidification substrate laminate frame 388. Solidification substrate laminate stops 398a and 398b are connected to solidification substrate laminate frame member 391a and are spaced apart from one another along the x-axis to limit the y-axis movement of the solidification substrate laminate 298 as it is inserted along the y-axis from the solidification substrate laminate side 391b to the solidification substrate laminate frame side 391a. FIG. 16A shows the solidification substrate laminate 298 secured to solidification substrate laminate frame 388 (the laminate 298 is not shown in In FIGS. 16B and 16D). Latches 392*a* and 392*b* are in the secured position, in which the latches are oriented parallel to their respective frame side members 389*a* and 389*b*. To release the solidification substrate laminate 298 from the frame 388, the latches 392*a* and 392*b* are lifted into an orientation in which they are perpendicular to their respective frame members 389*a* and 389*b*. Thus, the rigid or semi-rigid solidification substrate laminate 298 may be removed from the solidification substrate laminate frame 388 while the frame 388 remains secured to the load frame 120. Thus, if necessary, the solidification substrate laminate 298 may be readily replaced by lifting latches 392*a* and 392*b* into the releasing configuration to increase the spacing Δh between the clamp lips 394*a* and 394*b* and their respective frame member bottom surfaces 395*a* and 395*b*.

Figure 16E:
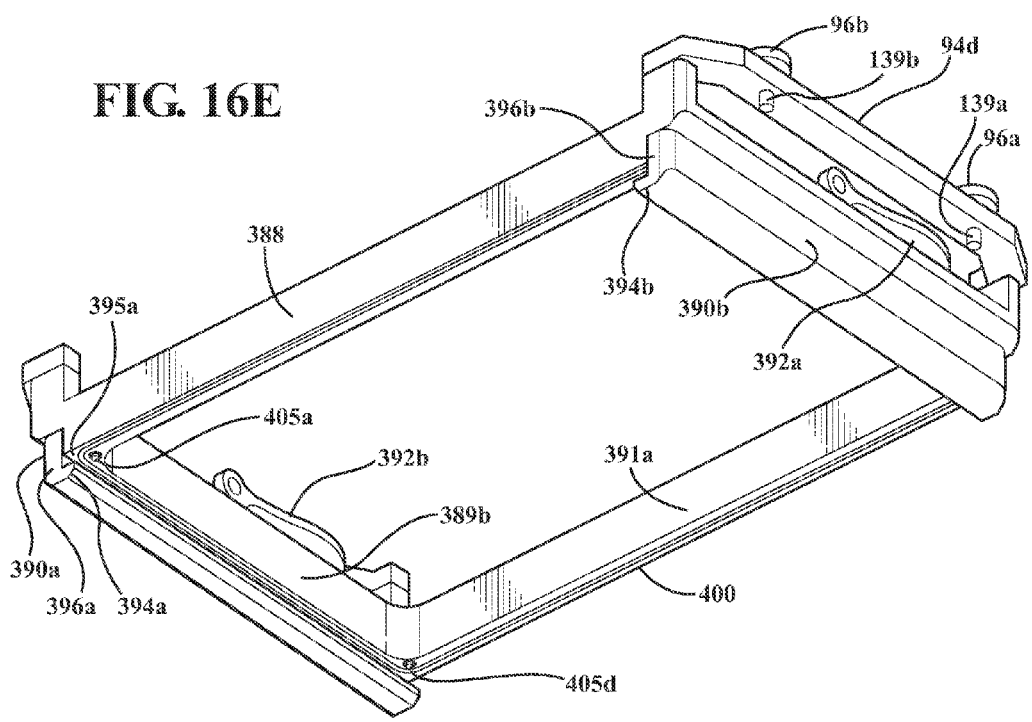
FIG. 16E is a bottom perspective view of the solidification substrate laminate frame of FIG. 16C.
Figure 16F:
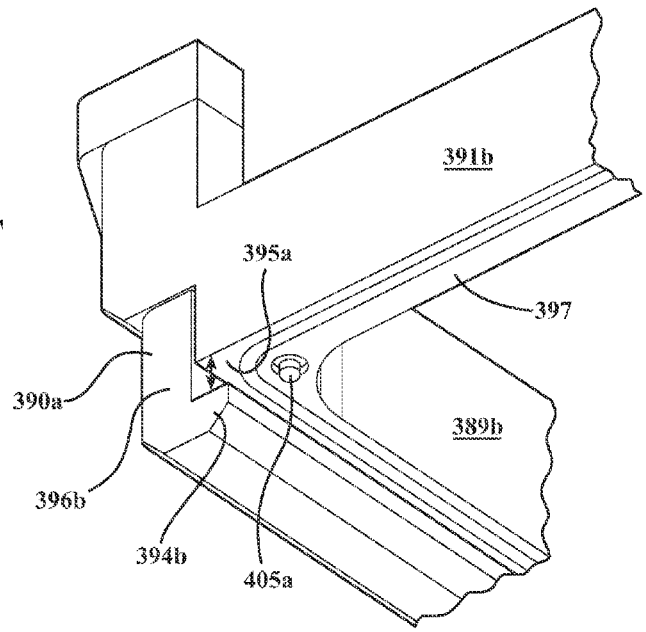
FIG. 16F is a close-up of a portion of the bottom of the solidification substrate laminate frame of FIG. 16C.

In certain examples, and as shown in FIGS. 16E-16F, plungers 405*a*-405*d* are provided so that the upper surface of the rigid or semi-rigid solidification substrate 58 does not adhere to the underside of the solidification substrate laminate frame 388. A sealing member 400 may also be provided on the underside 397 of the frame 388 to prevent solidifiable material 50 from flowing between upper surface of the rigid or semi-rigid solidification substrate laminate 298 and the underside 397 of frame 388 into the inner portion of frame 388 between the sidewalls 389*a*, 389*b*, 391*a*, and 391*b*.

The solidification substrate laminate 298 is not shown in FIGS. 16D and 16E. As FIG. 16D indicates the solidification substrate laminate frame 388 and the laminate 298 can be removed as an integral unit from the solidification substrate assembly 57. However, in the example of FIGS. 16A-16F, the laminate 298 can be removed from the assembly 57 without also removing the solidification substrate laminate frame 388.

The apparatus of FIGS. 16A-16E is designed for "right-side up" build processes such as the one depicted in FIGS. 1A-1E. In such processes, the volume of solidifiable material held in container 44 is typically much greater than in "upside down" build processes that use a shallow tray to hold the solidifiable material. In right-side up build processes, the larger volume of solidifiable material 50 creates larger pressure forces against the solidification substrate laminate 298 than would be the case if laminate 298 were used a part of a shallow tray in an upside down build process. For example, during a leveling operation, solidifiable material 50 will exert an upward (z-axis) force against the solidification substrate laminate 298. Once the laminate 298 is level, solidifiable material 50 will exert a dynamically varying pressure against the lower side of laminate 298 as solidifiable material 50 is squeezed out of the space between the exposed, upper object surface 82 and the laminate 298 (FIG. 1E). As explained previously, the actuator 66 may be operated to provide a level configuration force in the downward build (z) axis direction to resist the upward build (z) axis forces exerted by the solidifiable material 50 against the laminate 298. In certain examples, the ability to provide a level configuration force is particularly beneficial for ensuring that hydrodynamic transients in the solidifiable material 50 to not disturb the orientation of the laminate 298 relative to the x-y plane.

A solidification substrate assembly 57 with a solidification substrate laminate 298 used in lieu of film assembly 90 may be used in any of the apparatuses described herein, including those of FIGS. 6 and 10-13 in addition to the apparatus of FIGS. 4A-4E. As discussed previously, the use of a solidification substrate laminate 298 in place of a film assembly 90 can be beneficially used when solidifiable material 50 is brittle to prevent the breakage of fine structures, such as object supports. In preferred examples, solidification substrate assemblies 57 with solidification substrate laminate 298 are used when the solidifiable material (once solidified) has a percent elongation at break of greater than about three (3) percent, preferably greater than about five (5) percent, and even more preferably greater than about ten (10) percent. The term "percent elongation" refers to the elongation of a sample under a tensile load using the test procedure of ASTM D-638.

The apparatus of FIGS. 16A-16F and the solidification substrate laminates of FIGS. 17A-17C may be used with any of the methods of making a three-dimensional object from a solidifiable material described herein, including without limitation the methods of FIGS. 7, 8A-8B, and 15. Thus, the use of actuator 66 beneficially allows object peeling operations and leveling operations to be carried out with solidification substrate laminate 298 in right-side up build processes.

EXAMPLE

A 4 inch (x-axis) by 4 inch (y-axis) part is prepared using Envisiontec E-Denstone Peach on an apparatus that is configured similarly to the apparatus of FIGS. 4A-4E but for which the solidification substrate assembly 57 is not tilted. Peeling operations are carried out by moving the build platform 46 sufficiently downward to cause peeling and leveling (squeezing) operations are carried out by moving the build platform 46 upward to a distance of one layer thickness Δz from film 60. The object is built in 50 micron layers. Using the same materials and the dimensions, the object is also built on the apparatus of FIGS. 4A-4E with tilting. The time required to complete a squeezing operation (i.e., the time until the pressure measured by sensor 110 stabilizes at the reference value) is 45 seconds with the non-tilting implementation and 10 seconds with tilting. The full cycle for the solidification of a layer (including dropping the build platform, performing the "squeezing" or leveling operation, curing, and peeling) is 60 seconds for the non-tilting implementation and 12 seconds for the tilting implementation. Thus, the apparatuses and methods described herein are believed to provide significant reductions in object build times relative to known apparatuses.

What is claimed is:

1. A method of making a three-dimensional object from a solidifiable material, comprising:
    solidifying a portion of the solidifiable material to create an exposed solidified object surface in contact with a solidification substrate;
    tilting the solidification substrate about a first axis in accordance with at least one tilting parameter, wherein the at least one tilting parameter is based on at least one of object data representative of the three-dimensional object and the solidifiable material.

2. The method of claim 1, wherein the at least one tilting parameter is based on both object data representative of the three-dimensional object and the solidifiable material.

3. The method of any of claim 1, wherein the at least one tilting parameter is a minimum object peeling travel distance of a location on the exposed solidified object surface that is closest to the first axis in a direction along a second axis.

4. The method of claim 3, further comprising providing object data representative of the three-dimensional object, determining a position of an exposed object surface along the second axis that is closest to the first axis based on the object data, and determining an actuator peeling distance corresponding to the minimum object peeling travel distance starting from the determined position of the exposed surface along the second axis.

5. The method of claim 1, further comprising querying a tilting parameter database using a specified solidifiable material identifier, wherein the tilting parameter database comprises a plurality of solidifiable material identifiers, and each solidifiable material identifier is associated with a set of tilting parameters comprising the at least one tilting parameter.

6. The method of claim 5, further comprising activating an actuator in accordance with the set of tilting parameters, wherein the step of activating the actuator tilts the solidification substrate about the first axis.

7. The method of claim 1, wherein the at least one tilting parameter is at least one of a peeling velocity and a leveling velocity.

8. The method of claim 7, wherein the at least one tilting parameter includes a peeling velocity, and the step of tilting the solidification substrate about the first axis comprises tilting the solidification substrate about the first axis in a direction away from a build platform at a peeling velocity corresponding to the specified solidifiable material identifier.

9. The method of claim 7, wherein the at least one tilting parameter includes a leveling velocity, and the step of tilting the solidification substrate about the first axis comprises tilting the solidification substrate about the first axis in a direction toward a build platform at a leveling velocity corresponding to the specified solidifiable material identifier.

10. The method of claim 7, further comprising calculating an object exposed surface area and determining a value of the at least one tilting parameter based on the object exposed surface area.

11. The method of claim 1, wherein the solidifiable material has a viscosity at 25° C. that is greater than 1500 cp.

12. A method of making a three-dimensional object from a solidifiable material, comprising:
    solidifying a first layer of the solidifiable material in a first pattern corresponding to a first portion of the three-dimensional object to form a first solidified exposed object surface in contact with a solidification substrate, wherein the first layer of the solidifiable material is located between a build platform and the solidification substrate along a build axis;
    first tilting the solidification substrate about a tilting axis in a direction away from the build platform;
    moving the build platform away from the solidification substrate within a volume of the solidifiable material to provide a second layer of solidifiable material between the solidified exposed object surface and the solidification substrate;
    second tilting the solidification substrate about the tilting axis in a direction toward the build platform; and
    solidifying the second layer of the solidifiable material in a second pattern corresponding to a second portion of the three-dimensional object, wherein the step of first tilting the solidification substrate about a tilting axis in a direction away from the build platform comprises determining a tilt angle based on a selected solidifiable material identifier and tilting the solidification substrate about the tilting axis in the direction away from the build platform by the determined tilt angle.

13. The method of claim 12, further comprising providing an actuator operatively connected to the solidification substrate, wherein the actuator has an extended configuration and a retracted configuration, and the step of first tilting the solidification substrate about the tilting axis comprises adjusting the actuator from the retracted configuration to the extended configuration.

14. The method of claim 12, further comprising providing an actuator operatively connected to the solidification substrate, wherein the actuator has an extended configuration and a retracted configuration, and the step of second tilting the solidification substrate about the tilting axis comprises adjusting the actuator from the extended configuration to the retracted configuration.

15. The method of claim 12, further comprising providing an actuator operatively connected to the solidification substrate, wherein the actuator has an extended configuration and a retracted configuration, and the step of first tilting the solidification substrate about the tilting axis comprises adjusting the actuator from the extended configuration to the retracted configuration.

16. The method of claim 12, further comprising providing an actuator operatively connected to the solidification substrate, wherein the actuator has an extended configuration and a retracted configuration, and the step of second tilting the solidification substrate about the tilting axis comprises adjusting the actuator from the retracted configuration to the extended configuration.

17. The method of claim 12, wherein the solidification substrate is a rigid or semi-rigid solidification substrate.

18. The method of claim 12, wherein the solidification substrate is a film.

19. The method of claim 12, wherein the step of first tilting the solidification substrate about a tilting axis away from the build platform comprises first tilting a solidification substrate assembly comprising the solidification substrate and a film about the tilting axis in a direction away from the build platform.

20. The method of claim 12, wherein the step of first tilting the solidification substrate about a tilting axis in a direction away from the build platform comprises first tilting a solidification substrate assembly comprising the solidification substrate and a source of solidification energy about the tilting axis in the direction away from the build platform.

21. A method of making a three-dimensional object from a solidifiable material, comprising:
    solidifying a first layer of the solidifiable material in a first pattern corresponding to a first portion of the three-dimensional object to form a first solidified exposed object surface in contact with a solidification substrate, wherein the first layer of the solidifiable material is located between a build platform and the solidification substrate along a build axis;
    first tilting the solidification substrate about a tilting axis in a direction away from the build platform;
    moving the build platform away from the solidification substrate within a volume of the solidifiable material to provide a second layer of solidifiable material between the solidified exposed object surface and the solidification substrate;
    second tilting the solidification substrate about the tilting axis in a direction toward the build platform; and
    solidifying the second layer of the solidifiable material in a second pattern corresponding to a second portion of the three-dimensional object, wherein the step of second tilting the solidification substrate about a tilting axis toward the build platform comprises determining a leveling velocity based on a selected solidifiable material identifier and tilting the solidification substrate about the tilting axis in the direction toward the build platform at the determined leveling velocity.

22. The method of claim 21, further comprising providing an actuator operatively connected to the solidification substrate, wherein the actuator has an extended configuration and a retracted configuration, and the step of first tilting the solidification substrate about the tilting axis comprises adjusting the actuator from the retracted configuration to the extended configuration.

23. The method of claim 21, further comprising providing an actuator operatively connected to the solidification substrate, wherein the actuator has an extended configuration and a retracted configuration, and the step of second tilting the solidification substrate about the tilting axis comprises adjusting the actuator from the extended configuration to the retracted configuration.

24. The method of claim 21, further comprising providing an actuator operatively connected to the solidification substrate, wherein the actuator has an extended configuration and a retracted configuration, and the step of first tilting the solidification substrate about the tilting axis comprises adjusting the actuator from the extended configuration to the retracted configuration.

25. The method of claim 21, further comprising providing an actuator operatively connected to the solidification substrate, wherein the actuator has an extended configuration and a retracted configuration, and the step of second tilting the solidification substrate about the tilting axis comprises adjusting the actuator from the retracted configuration to the extended configuration.

26. The method of claim 21, wherein the solidification substrate is a rigid or semi-rigid solidification substrate.

27. The method of claim 21, wherein the solidification substrate is a film.

28. The method of claim 21, wherein the step of first tilting the solidification substrate about a tilting axis away from the build platform comprises first tilting a solidification substrate assembly comprising the solidification substrate and a film about the tilting axis in a direction away from the build platform.

29. The method of claim 21, wherein the step of first tilting the solidification substrate about a tilting axis in a direction away from the build platform comprises first tilting a solidification substrate assembly comprising the solidification substrate and a source of solidification energy about the tilting axis in the direction away from the build platform.

* * * * *